US005880883A

United States Patent [19]

Sudo

[11] Patent Number: 5,880,883

[45] Date of Patent: Mar. 9, 1999

[54] APPARATUS FOR DISPLAYING IMAGE RECOGNIZED BY OBSERVER AS STEREOSCOPIC IMAGE, AND IMAGE PICK-UP APPARATUS

[75] Inventor: Toshiyuki Sudo, Kawasaki, Japan

[73] Assignee: Canon Kabushiki Kaisha, Tokyo, Japan

[21] Appl. No.: 567,562

[22] Filed: Dec. 5, 1995

[30] Foreign Application Priority Data

Dec. 7, 1994 [JP] Japan .................................... 6-331108
Mar. 3, 1995 [JP] Japan .................................... 7-070726

[51] Int. Cl.[6] .......................... G02B 27/22; H04N 13/04; H04N 13/02; G09G 5/00

[52] U.S. Cl. ............................ 359/462; 359/464; 348/51; 348/52; 348/47; 345/7

[58] Field of Search .................................... 359/462, 464, 359/466, 470, 472, 473, 477; 348/51, 52; 352/60, 61; 395/119, 127; 345/7, 8

[56] References Cited

U.S. PATENT DOCUMENTS

| | | | |
|---|---|---|---|
| 2,084,795 | 6/1937 | Donle . | |
| 5,020,878 | 6/1991 | Brokenshire et al. | 359/466 |
| 5,327,284 | 7/1994 | Kuester . | |
| 5,486,948 | 1/1996 | Imai et al. | 359/462 |
| 5,499,051 | 3/1996 | Suda et al. | 359/462 |
| 5,612,707 | 3/1997 | Sudo et al. | 359/462 |

FOREIGN PATENT DOCUMENTS

WO 93/22699 11/1993 WIPO .

OTHER PUBLICATIONS

Butterfield, "Three Dimensional Television," SPIE 15th Annual Technical Symposium: Photo–optical Instrumentation for the 1970's, Sep. 14–17, 1970, pp. 3–9.

Sugie et al., "Notes on Vision Research V: A Model of Binocular Depth Perception Suggested by Neurophysiological Evidence," Bulletin of the Electrotechnical Laboratory, vol. 40, No. 11, 1976, Japan, pp. 890–921.

*Primary Examiner*—Paul M. Dzierzynski
*Assistant Examiner*—Audrey Chang
*Attorney, Agent, or Firm*—Morgan & Finnegan, L.L.P.

[57] ABSTRACT

This invention relates to a stereoscopic image display apparatus which allows an observer to recognize a stereoscopic image, comprising right eye image display member for displaying an image for a right eye by irradiating light, left eye image display member for displaying an image for a left eye by irradiating light, and tilt member for tilting a central line, in a vertical direction, of an observation image which is formed based on the image for the right eye and is to be observed by the right eye of the observer, and a central line, in the vertical direction, of an observation image which is formed based on the image for the left eye and is to be observed by the left eye of the observer, relative to each other within a range from an angle larger than 0° to an angle not more than 3°.

13 Claims, 63 Drawing Sheets

IMAGE SIGNAL GENERATING PORTION

HALF MIRROR
CRT1
CRT2
POLARIZING PLATE
POLARIZING GLASSES

HORIZONTAL LINE
1.5°
L
1R
4R
1L
4L

IMAGE DISPLAY MEANS
15
DISPLAY CONTROL PORTION
14
$Y_R$
$Y_L$
$9_R$
$9_L$
$X_R$
$X_L$
$13_R$
$13_L$
8
8a
8b
X

IMAGE DISPLAY MEANS
15
DISPLAY CONTROL PORTION
14
$Y_R$
$Y_L$
$9_R$
$9_L$
$X_R$
$X_L$
$13_R$
$13_L$
8a
8b
$8_R$
$8_L$
X

Ya
a
9a
Xa
Yb
b
9b
Xb
Yc
c
9c
Xc
Yd
d
9d
Xd
Ye
e
9e
Xe
Yf
f
9f
Xf
13a
13b
13c
13d
13e
13f
X

111
IMAGE DISPLAY MEANS
10
DISPLAY CONTROL PORTION
14
Ya
Yb
Yc
Yd
Ye
Yf
a
b
c
d
e
f
9a
9b
9c
9d
9e
9f
Xa
Xb
Xc
Xd
Xe
Xf
13a
13b
13c
13d
13e
13f
8
8
X

IMAGE DISPLAY MEANS
10
DISPLAY CONTROL PORTION
14
Ya
Yb
Yc
Yd
Ye
Yf
a
b
c
d
e
f
9a
9b
9c
9d
9e
9f
Xa
Xb
Xc
Xd
Xe
Xf
13a
13b
13c
13d
13e
13f
8a
8b
8
X $Y_R$
$9_R$
$64_R$
68'
$60_R$
$Y_L$
$9_L$
$64_L$
$60_L$
$63_L$
X

Ya
a
Yb
b
Yc
c
Yd
d
Ye
e
9a
9b
9c
9d
9e
Xa
Xb
Xc
Xd
Xe
13a
13b
13c
13d
13e
X a
Xa=100
b
Xb=100
c
Xc=102
d
Xd=102
e
Xe=100
6R
6L
10
11a~11e
IMAGE
DISPLAY
MEANS

Ya
a
Yb
b
Yc
c
Yd
d
Ye
e
9a
9b
9c
9d
9e
Xa
Xb
Xc
Xd
Xe
13a
13b
8
13c
13d
13e
X

MAGNIFI-
CATION
MODULATOR
17
Xa=100
Xb=101
Xc=102
Xd=103
Xe=104
Ya
Yb
Yc
Yd
Ye
a
b
c
d
e
9a
9b
9c
9d
9e
Xa
Xb
Xc
Xd
Xe
13a
13b
13c
13d
13e
X

IMAGE DISPLAY MEANS
MAGNIFICATION MODULATOR
69
10
77
11a~11e
6R
6L
X
13a
13b
13c
13d
13e
Ya
Yb
Yc
Yd
Ye
9a
9b
9c
9d
9e
Xa
Xb
Xc
Xd
Xe
a
b
c
d
e

Xa'
Xc'
Xb'
a
c
Yc
b
Yb
Ya
9a
Xa
9b
Xb
13a
13b
X

IMAGE DISPLAY MEANS
20
20a~20c
6R
6L
a
c
b

APPARATUS FOR DISPLAYING IMAGE RECOGNIZED BY OBSERVER AS STEREOSCOPIC IMAGE, AND IMAGE PICK-UP APPARATUS

BACKGROUND OF THE INVENTION

1. Field of the Invention

The present invention relates to an image display apparatus and an image recording apparatus and, more particularly, to a technique suitable for an apparatus for displaying display images on image display means on the basis of a plurality of input images with a parallax, so that an observer visually recognizes a plurality of observation images formed by the display images with his or her eyes, and recognizes them as a stereoscopic image.

2. Related Background Art

Conventionally, many image display apparatuses which independently present a plurality of images with a parallax to the two eyes of an observer so as to cause the observer to recognize a stereoscopic image have been proposed. Chihiro Masuda, "Three-dimensional Display" (Sangyo Tosho) discloses various types of stereoscopic image display apparatuses, as will be described below.

For the sake of easy understanding, images observed by the two eyes of an observer will be referred to as "observation images" hereinafter, images fetched from an object by input means will be referred to as "input images" hereinafter, and images displayed on image display means for the purpose of observation will be referred to as "display images" hereinafter.

FIG. 1 is an explanatory view of a three-dimensional display (stereoscopic image display apparatus) of an anaglyph method. In this method, a display image for the right eye and a display image for the left eye are respectively superimpose-displayed in two colors, e.g., red and blue, and observation images for the right and left eyes are separated using color filters, thus allowing an observer to recognize a stereoscopic image.

FIG. 2 is an explanatory view of a three-dimensional display of a polarizing glass method. In this method, a display image for the right eye and a display image for the left eye are respectively displayed on CRTs. Polarizing filters (polarizing plates) having orthogonal planes of oscillation and a half mirror are arranged in front of the CRTs. Observation images for the right and left eyes are separated by polarizing glasses, thus allowing an observer to recognize a stereoscopic image.

FIG. 3 is an explanatory view of a three-dimensional display of a time sharing shutter method. In this method, display images for the right and left eyes are alternately displayed on a CRT in a time sharing manner, and observation images for the right and left eyes are separated using time sharing shutter glasses which are opened/closed in a time sharing manner in synchronism with the display images, thus allowing an observer to recognize a stereoscopic image.

FIG. 4 is an explanatory view of an optical method. In this method, display images for the right and left eyes, which are separately displayed on a viewer using optical means such as prisms, mirror, lens, and the like, are superimpose-displayed as observation images in front of an observer, thus allowing the observer to recognize a stereoscopic image.

FIG. 5 is an explanatory view of a three-dimensional display of a lenticular method. In this method, a plurality of input images input by a lenticular lens are separately displayed via corresponding lenticular lens portions, thus allowing a plurality of observers to recognize a stereoscopic image.

FIGS. 6A and 6B are explanatory views of a three-dimensional display of large convex lens and large concave mirror methods. FIG. 6A shows the principle of the large convex lens method, and FIG. 6B shows the principle of the large concave mirror method. In this method, display images for the right and left eyes are formed on a large convex lens or a large concave mirror using projectors, and are displayed while determining the setting positions of the projectors and the spatial positions of the display images for the right and left eyes, so that light rays from the corresponding display images are incident on the right and left eyes, thus allowing an observer to recognize a stereoscopic image.

FIG. 7 is an explanatory view of a three-dimensional display of a parallax barrier method. In this method, a slit-shaped barrier (parallax barrier) is disposed in front of image display means to split a display image into right and left display images, and the right and left visual axes recognize these display images as observation images via the barrier, thus allowing an observer to recognize a stereoscopic image.

FIGS. 8A, 8B, and 8C are explanatory views of a three-dimensional display of an integral method. In this method, a large number of parallax images of an object are received (input) and recorded by an image taking device via a fly eye lens (FIG. 8A), and are transferred to a display device to be displayed as an image on the display device. The respective parallax images spatially form a real image at an identical position as that in the image taking operation. When an observer observes this real image from various directions, he or she can observe a parallax image corresponding to the observation direction, thus allowing stereoscopic viewing (FIGS. 8B and 8C).

On the other hand, as an input method of input images with a parallax, which are used in each of the above-mentioned image display apparatuses, a method of taking an image of an object from a plurality of directions using a plurality of cameras is normally used. When only two input images with a parallax for the right and left eyes are required like in the anaglyph method, polarizing glass method, time sharing shutter method, optical method, and the like, two image taking cameras $Y_R$ and $Y_L$ need only be used for an object X to be taken, as shown in FIG. 9, so as to obtain input images $X_R$ and $X_L$.

However, the lenticular method, large convex lens/large concave mirror method, parallax barrier method, and the like require input images with a parallax from three or more view points in some cases. Thus, such methods require multi-lens camera input means, as shown in FIG. 25 (reference numerals in FIG. 25 will be described in detail later).

Note that the integral method inputs images via a special-purpose fly eye lens.

On the other hand, in recent years, input images actually taken by cameras are subjected to image processing attained by arithmetic operations of a computer so as to obtain parallax images for stereoscopic viewing, and such images are often used in stereoscopic viewing. In some cases, images of an object processed to appear to have been taken from quite different directions are generated and input on the basis of several input images, and such images are often used in the above-mentioned stereoscopic image display apparatus.

Furthermore, input images with a parallax, which are called CG (computer graphics) and are artificially synthesized by arithmetic operations using a computer, are often used in place of input images actually taken by cameras. When a CG method which performs image generation by accurately recognizing object configuration information in a three-dimensional space is used, since a plurality of input images with a. parallax can be formed on the basis of single three-dimensional information, such a method can be easily applied to the stereoscopic image display apparatus.

The above-mentioned stereoscopic image display utilizing a binocular parallax has no established display condition between the observation images for the right and left eyes, but is premised on the simple assumption that images for the right and left eyes are displayed under an identical condition. No image display apparatus which sets the display condition for images for the right and left eyes in consideration of effects to be given to an observer is available.

Similarly, as for the image input apparatus for inputting images to the image display apparatus for displaying a stereoscopic image, no apparatus which sets the display condition for images for the right and left eyes in consideration of effects to be given to an observer is available.

SUMMARY OF THE INVENTION

It is an object of the present invention to provide an image display apparatus and an image input apparatus, which can improve observability by setting different display conditions of images to be presented to the right and left eyes of an observer.

In order to achieve the above object, according to one aspect of the present invention, there is provided a stereoscopic image display apparatus which allows an observer to recognize a stereoscopic image, comprising:

right eye image display means for displaying an image for a right eye by irradiating light;

left eye image display means for displaying an image for a left eye by irradiating light; and tilt means for tilting a central line, in a vertical direction, of an observation image which is formed based on the image for the right eye and is to be observed by the right eye of the observer, and a central line, in the vertical direction, of an observation image which is formed based on the image for the left eye and is to be observed by the left eye of the observer, relative to each other within a range from an angle larger than 0° to an angle not more than 3°.

According to a preferred aspect, the tilt means comprises means for rotating at least one of the right and left eye image display means in a display surface of the image display means.

According to a preferred aspect, the tilt means comprises an image rotator arranged in an optical path of at least one of the right and left eye image display means.

According to a preferred aspect, the tilt means comprises means for rotating a display image of at least one of the right and left eye image display means by coordinate conversion processing, and displaying the rotated image on the image display means.

According to a preferred aspect, the tilt means comprises one of means for rotating clockwise the central line, in the vertical direction, of the observation image to be observed by the right eye of the observer and means for rotating counterclockwise the central line, in the vertical direction, of the observation image to be observed by the left eye of the observer.

According to one aspect of the present invention, there is provided an image recording apparatus for recording an image which is used to allow an observer to recognize a stereoscopic image, comprising:

right eye image recording means for taking an input image for a right eye of the observer, and recording the input image;

left eye image recording means for taking an input image for a left eye of the observer, and recording the input image; and rotation means for rotating at least one of the right and left eye image recording means in a recording surface of the image recording means so as to tilt and record the input images for the right and left eyes relative to each other.

According to a preferred aspect, the rotation means comprises an image rotator arranged in an optical path upon taking one of the input images for the right and left eyes.

According to another aspect of the present invention, there is provided a stereoscopic image display apparatus which allows an observer to recognize a stereoscopic image, comprising:

right eye image display means for displaying an image for a right eye by irradiating light;

left eye image display means for displaying an image for a left eye by irradiating light; and means for setting a size of an observation image which is formed based on the image for the right eye and is to be observed by the right eye of the observer, and a size of an observation image which is formed based on the image for the left eye and is to be observed by the left eye of the observer to be relatively different from each other.

According to a preferred aspect, the means for setting the sizes of the observation images to be relatively different from each other comprises means for changing a size of a display image of at least one of the right and left eye image display means by coordinate conversion means, and displaying the image of the changed size on the image display means.

According to a preferred aspect, the image display apparatus further comprises a right eye optical system for forming the observation image to be observed by the right eye of the observer on the basis of the image for the right eye, and a left eye optical system for forming the observation image to be observed by the left eye of the observer on the basis of the image for the left eye, and a focal length of the right eye optical system is different from a focal length of the left eye optical system.

According to a preferred aspect, the focal length of at least one of the right and left eye optical systems is variable.

According to a preferred aspect, the stereoscopic image display apparatus satisfies:

$$0<|\Delta V|<3$$

where $R_v$ and $L_v$ are the sizes of the observation images to be observed by the right and left eyes of the observer, and $\Delta V$ is the magnification difference given by:

$$\Delta V=(R_v-L_v)/L_v*100$$

$R_v$ and $L_v$ are preselected measuring lengths of virtual images to be objected in this specification.

According to the present invention, there is provided an image pick-up apparatus for taking an image which is used to allow an observer to recognize a stereoscopic image, comprising:

a right eye image pick-up optical system for taking an image for a right eye of the observer; and a left eye image pick-up optical system for taking an image for a left eye of the observer, wherein the right and left eye image pick-up optical systems have different magnification factors.

According to a preferred aspect, the magnification factor of at least one of the right left eye image pick-up optical systems is variable.

According to a preferred aspect, the image pick-up apparatus satisfies:

$$0<|\Delta V|<3$$

where ΔV is the magnification difference between the right and left image pick-up optical systems.

Some examples of an image display apparatus of the present invention will be presented in the following description of the embodiments.

BRIEF DESCRIPTION OF THE DRAWINGS

FIGS. 14A and 14B are front views showing the layout of image displays of the first embodiment, in which FIG. 14A shows the right image display, and FIG. 14B shows the left image display;

FIGS. 15A and 15B are views of observation images of the prior art and the first embodiment when observed from an observer, in which FIG. 15A shows the prior art, and FIG. 15B shows the first embodiment;

FIGS. 18A and 18B are explanatory views of an image signal modulating portion in the third embodiment, in which FIG. 18A shows the arrangement for an analog image signal, and FIG. 18B shows the arrangement for a digital image signal;

DETAILED DESCRIPTION OF THE PREFERRED EMBODIMENTS

Figure 1:
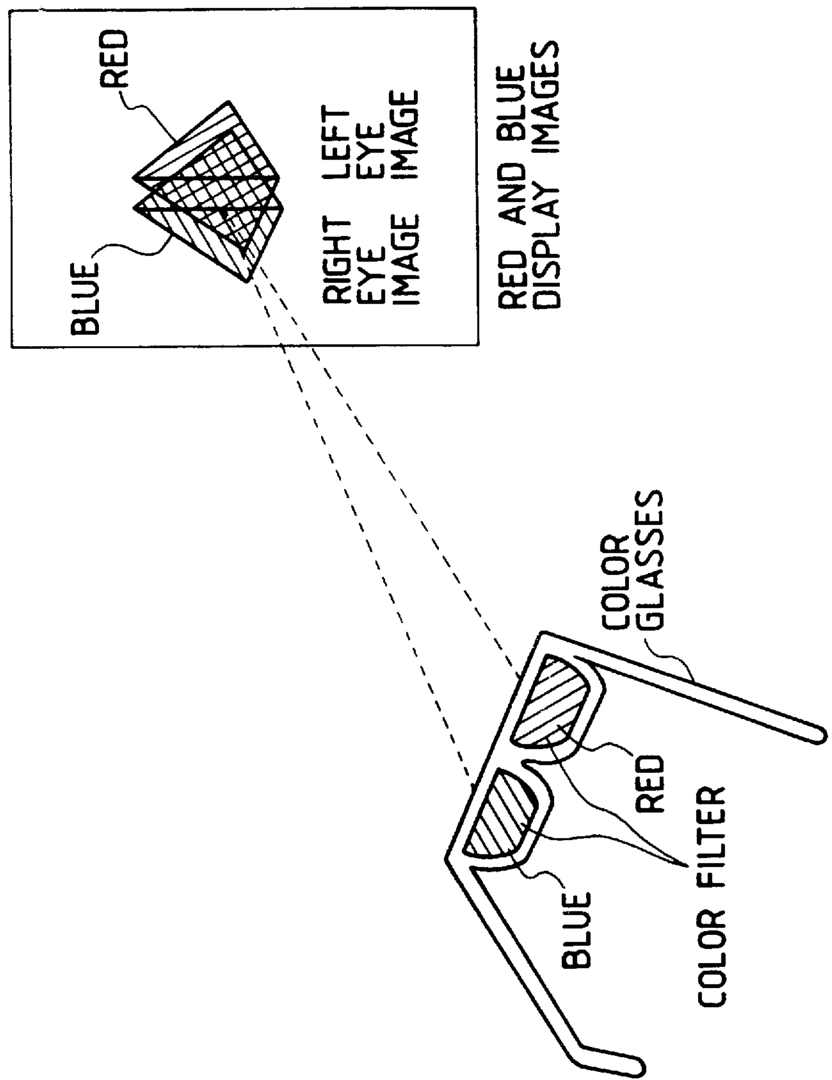
FIG. 1 is an explanatory view of a three-dimensional display of an anaglyph method.
Figure 2:
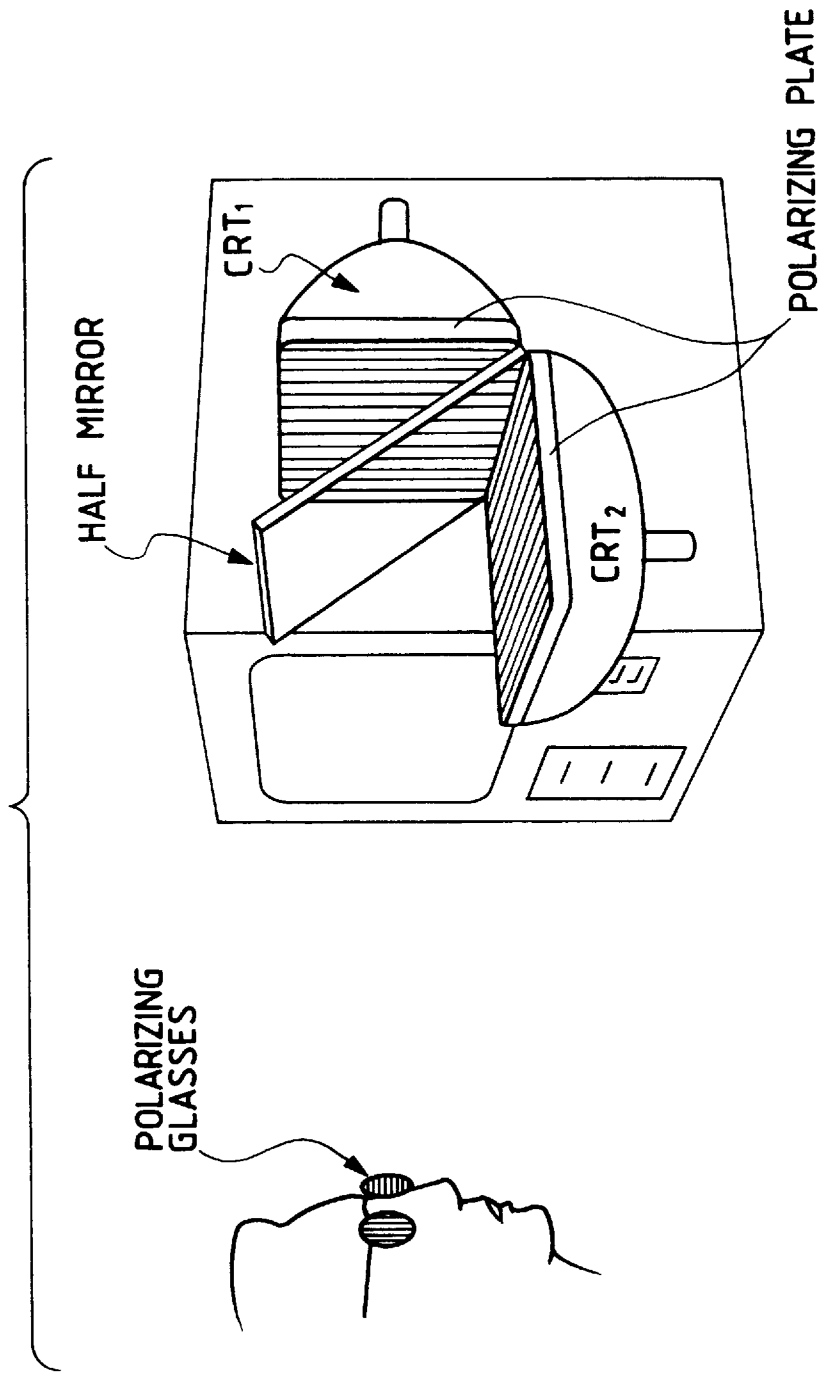
FIG. 2 is an explanatory view of a three-dimensional display of a polarizing glass method.
Figure 3:
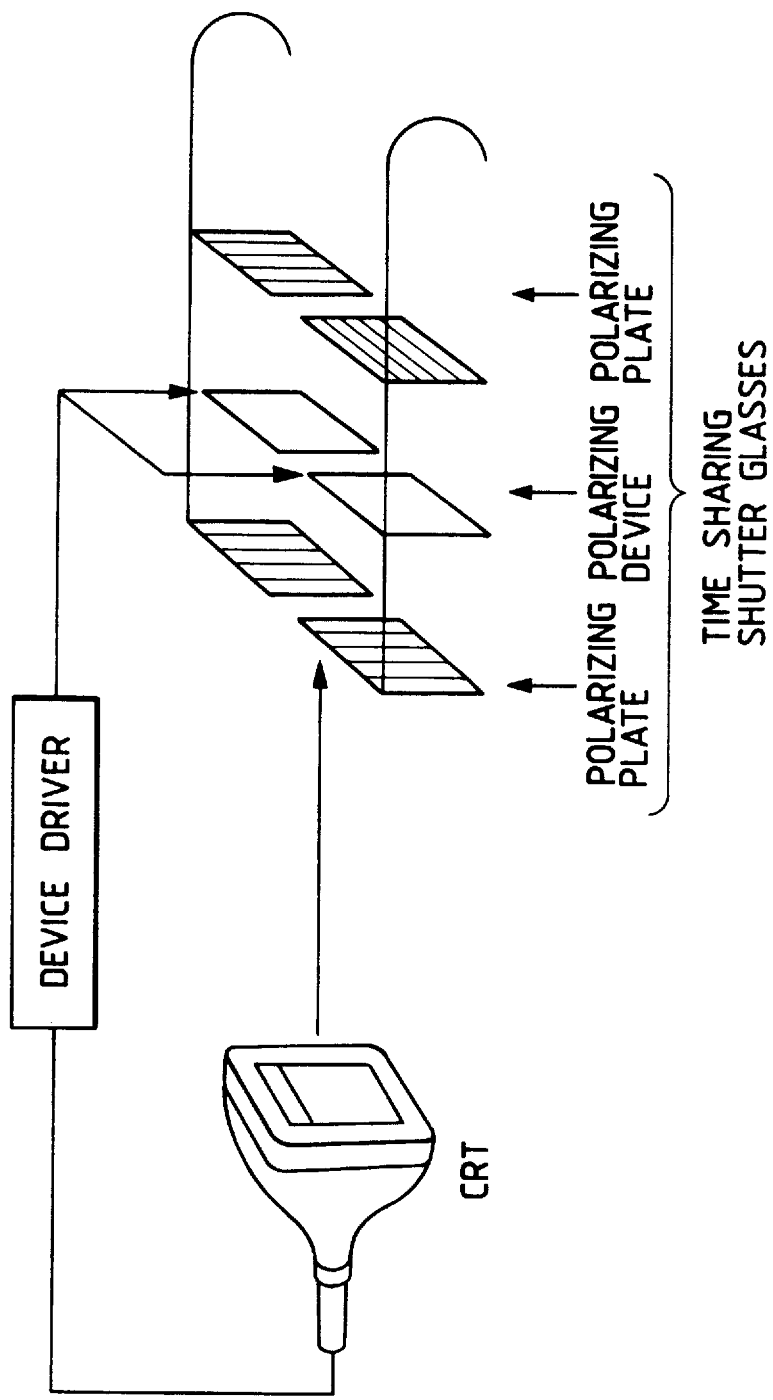
FIG. 3 is an explanatory view of a three-dimensional display of a time sharing shutter method.
Figure 4:
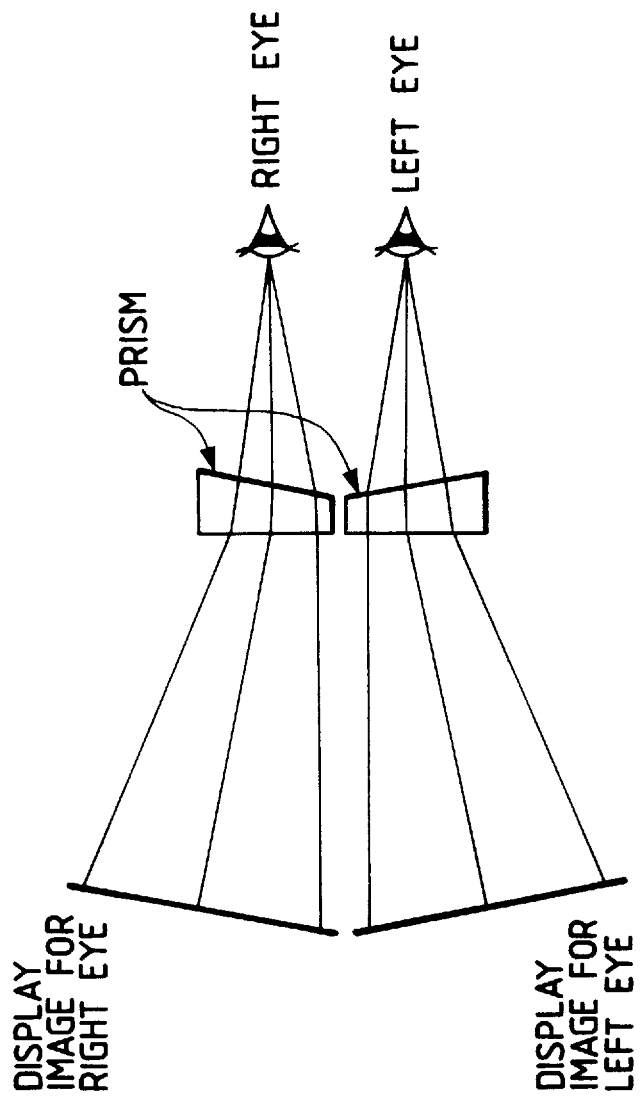
FIG. 4 is an explanatory view of a three-dimensional display of an optical method.
Figure 5:
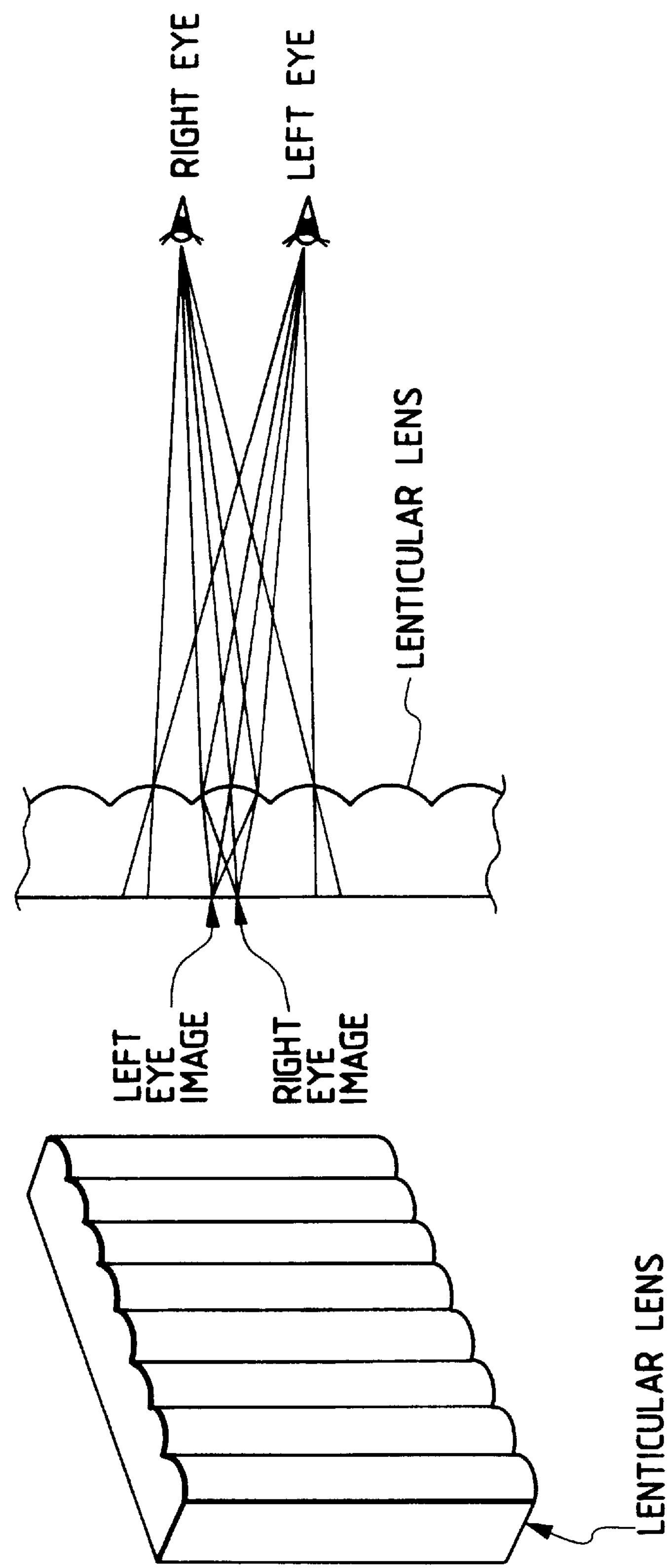
FIG. 5 is an explanatory view of a three-dimensional display of a lenticular method.
Figure 6A:
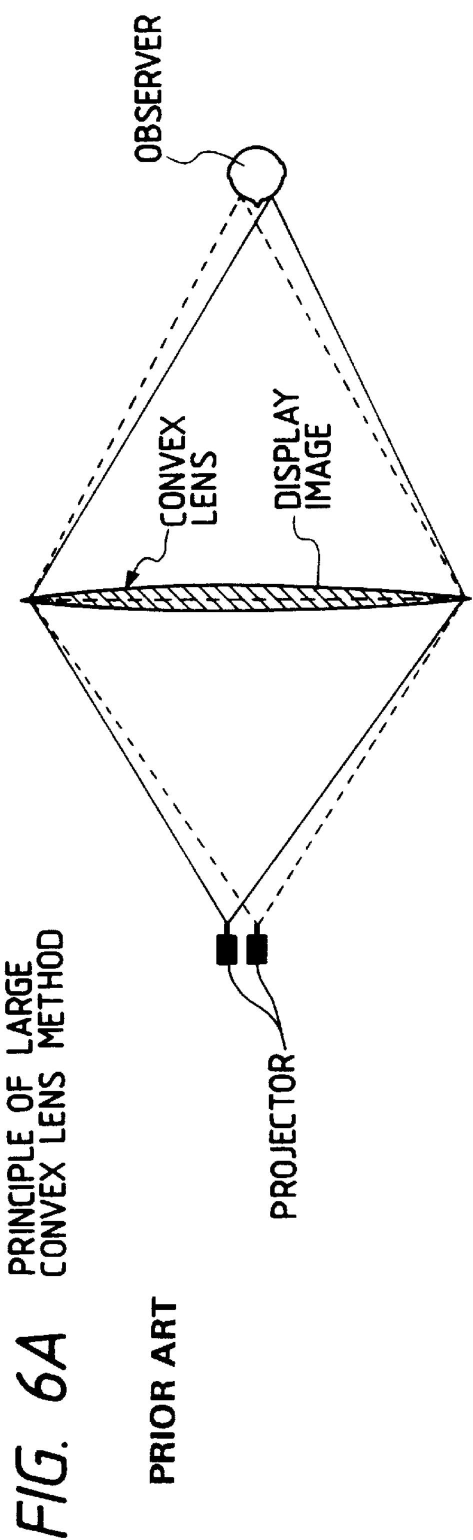
FIGS. 6A and 6B are explanatory views of three-dimensional displays of large convex lens and large concave mirror methods.
Figure 6B:
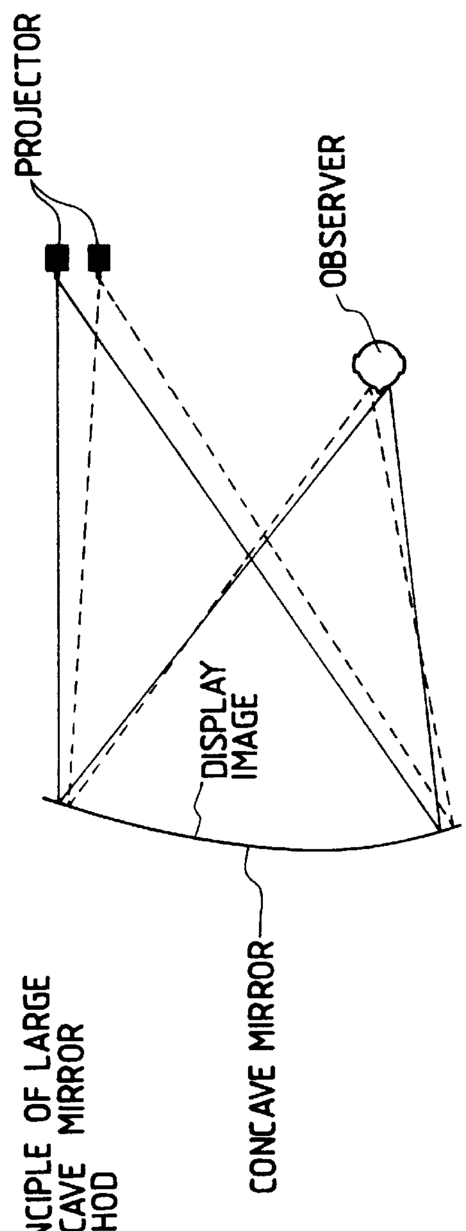
Figure 7:
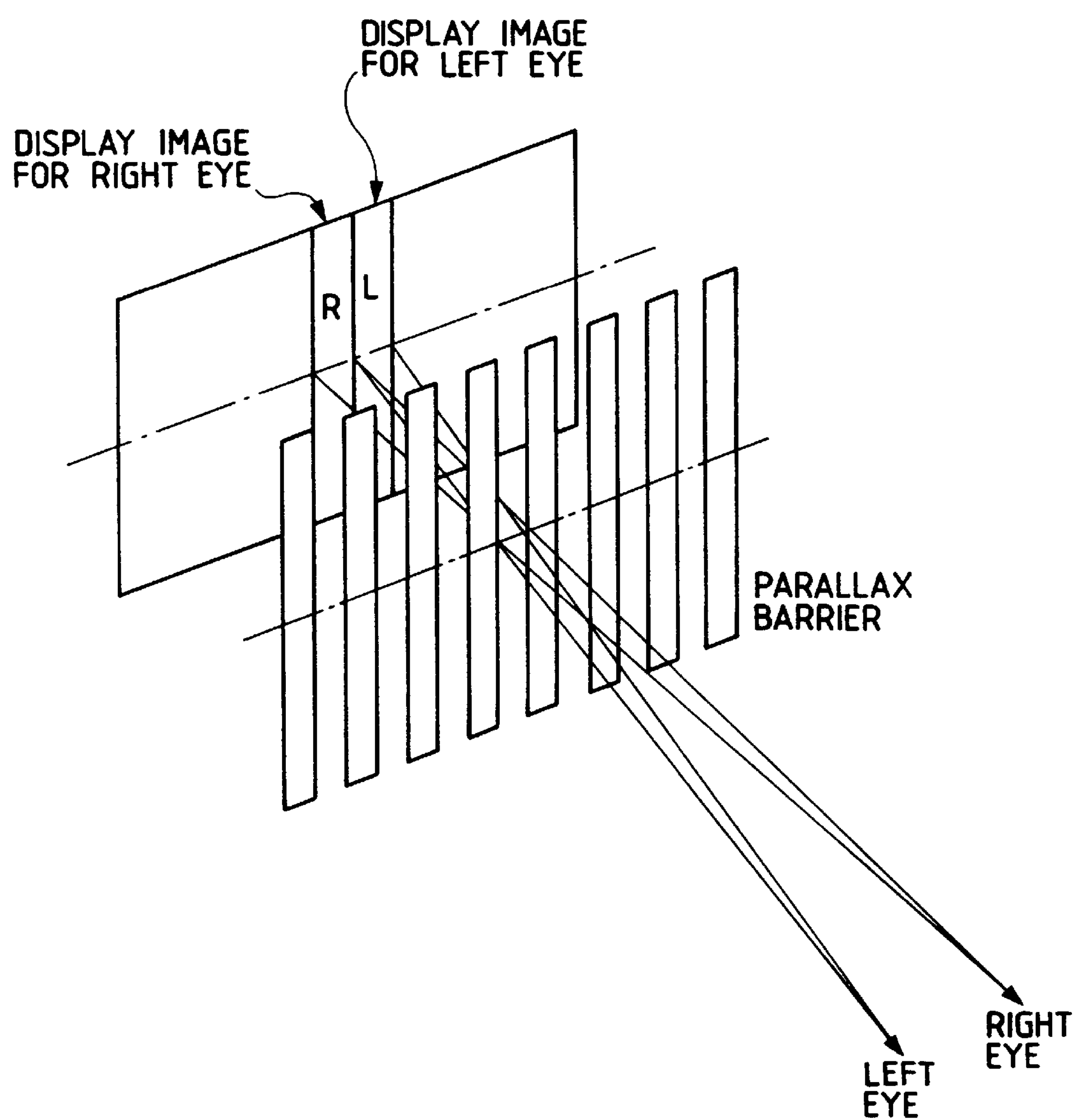
FIG. 7 is an explanatory view of a three-dimensional display of a parallax method.
Figure 8A:
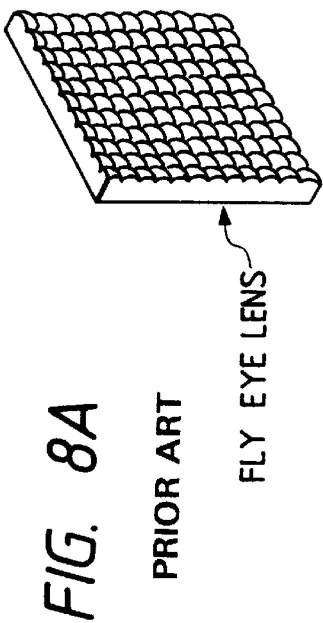
FIGS. 8A, 8B, and 8C are explanatory views of a three-dimensional display of an integral method.
Figure 8B:
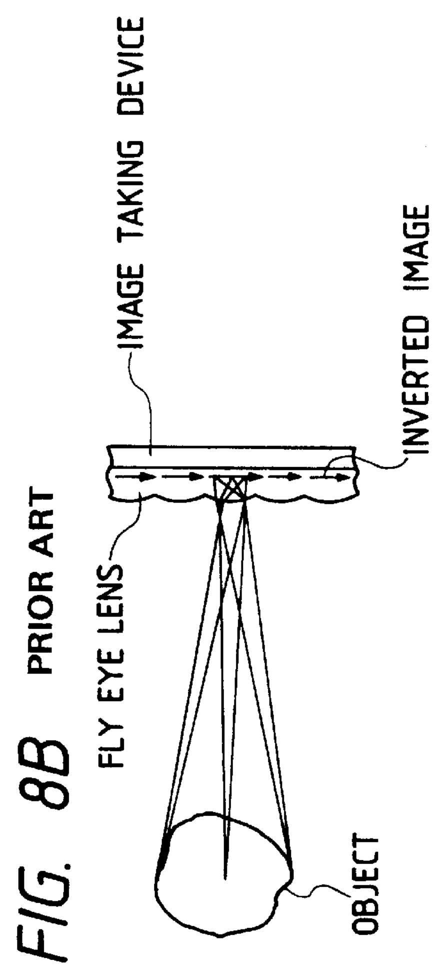
Figure 8C:
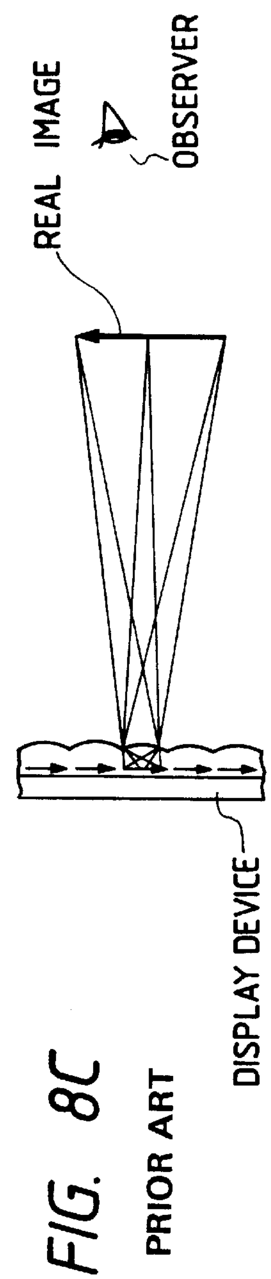
Figure 9:
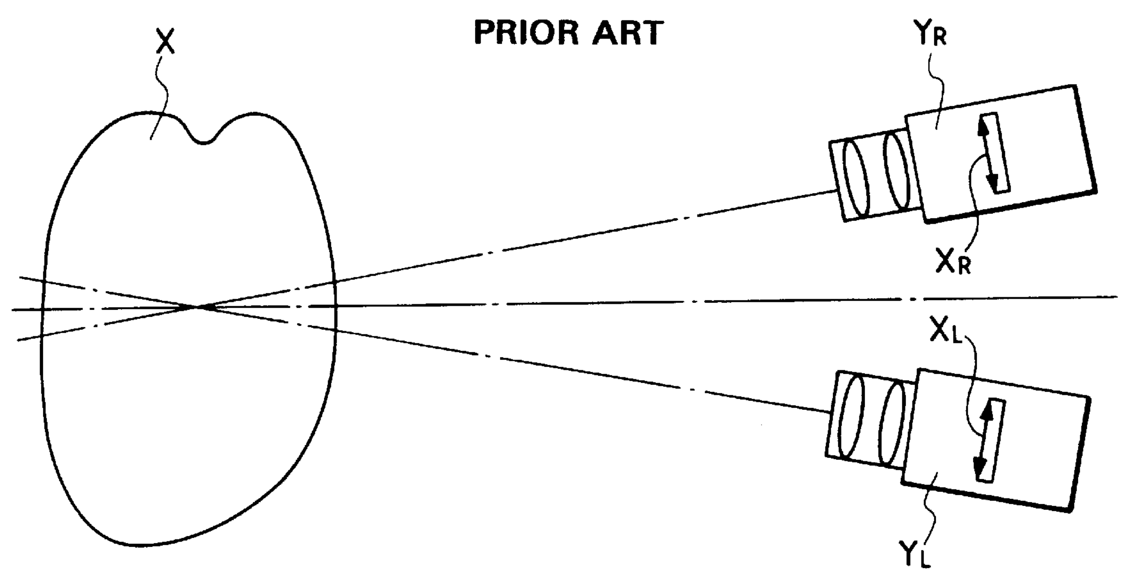
FIG. 9 is a view showing the image pick-up layout of two input images with a parallax.
Figure 10:
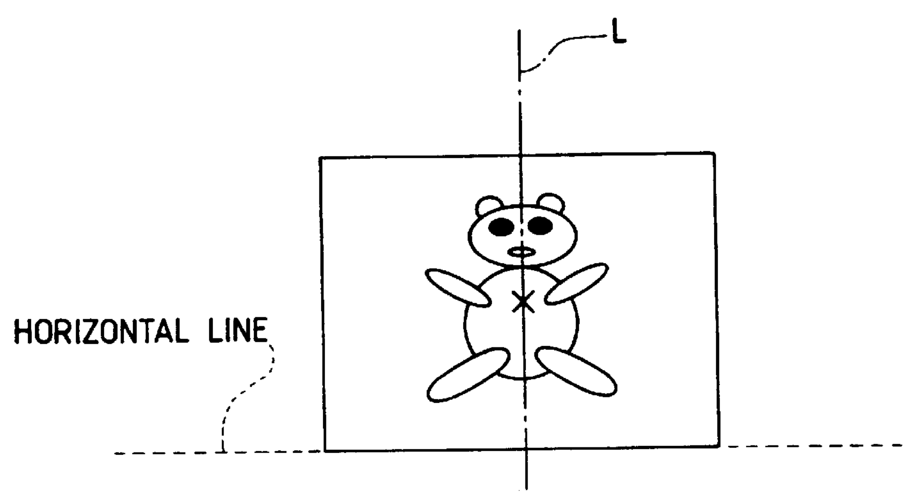
FIG. 10 is an explanatory view of the central line, L, in the vertical direction of an observation image.

The conventional stereoscopic image display utilizing the above-mentioned binocular parallax described above has no established display condition between the observation images for the right and left eyes, but is premised on the simple assumption that observation images for the right and left eyes are displayed so that their central lines in the vertical direction always extend parallel to each other. Note that the central line, in the vertical direction, of the observation image means a straight line L in FIG. 10, i.e., a straight line which perpendicularly crosses the horizontal line in the display plane of the observation image and passes the center of the image.

No image display apparatus which sets the display condition for images for the right and left eyes in consideration of effects to be given to an observer when the above-mentioned display condition is changed is available.

Also, there is no proposal associated with input means of parallax images used in an image display apparatus for displaying a stereoscopic image by setting a different display condition from that of the conventional apparatus.

As a result of examination of the effects of different display conditions between observation images for the right and left eyes on an observer in the stereoscopic image display utilizing a binocular parallax, the present inventors found that the “observability” of a stereoscopic image could be improved by displaying observation images for the right and left eyes while their central lines in the vertical direction were tilted in a V-shaped pattern relative to each other.

This effect will be explained below. FIGS. 11A and 11B and FIGS. 12A and 12B are graphs showing the examination results. In each of these graphs, the rotational angle (degrees) of the observation image is plotted along the abscissa, and the evaluation value statistically obtained by distributed processing of subjective evaluation values of “observability” of a stereoscopic image for a plurality of observers is plotted along the ordinate. Note that the “observability” represents an evaluation pertaining to “the degree of fatigue after observation of a stereoscopic image for a long period of time”.

Figure 11A:
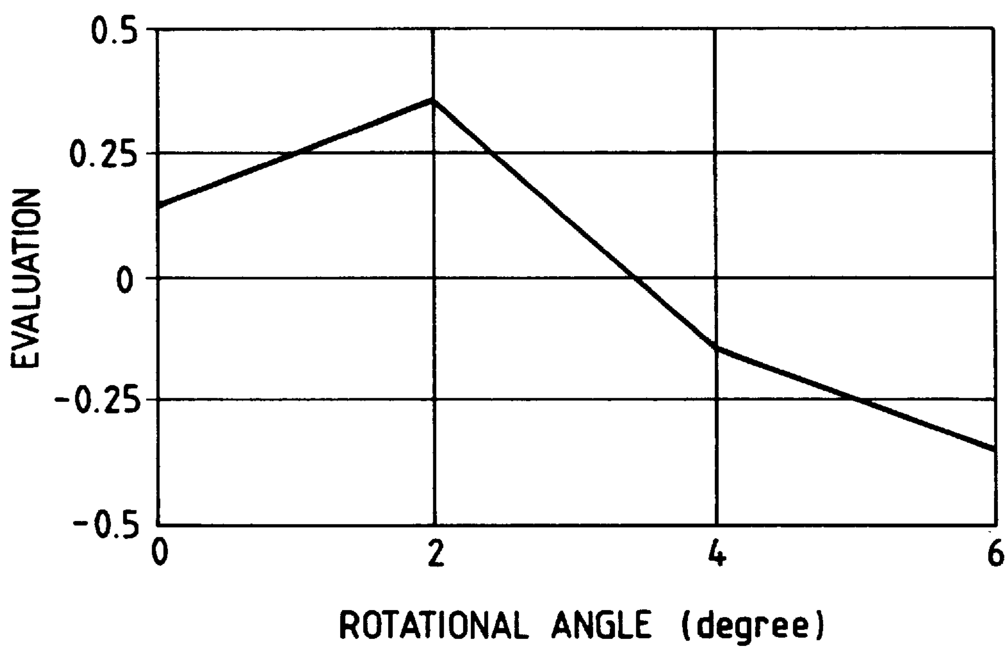
FIGS. 11A and 11B are experiment graphs I showing the relationship between the difference in display condition and the observability of an observation image.
Figure 11B:
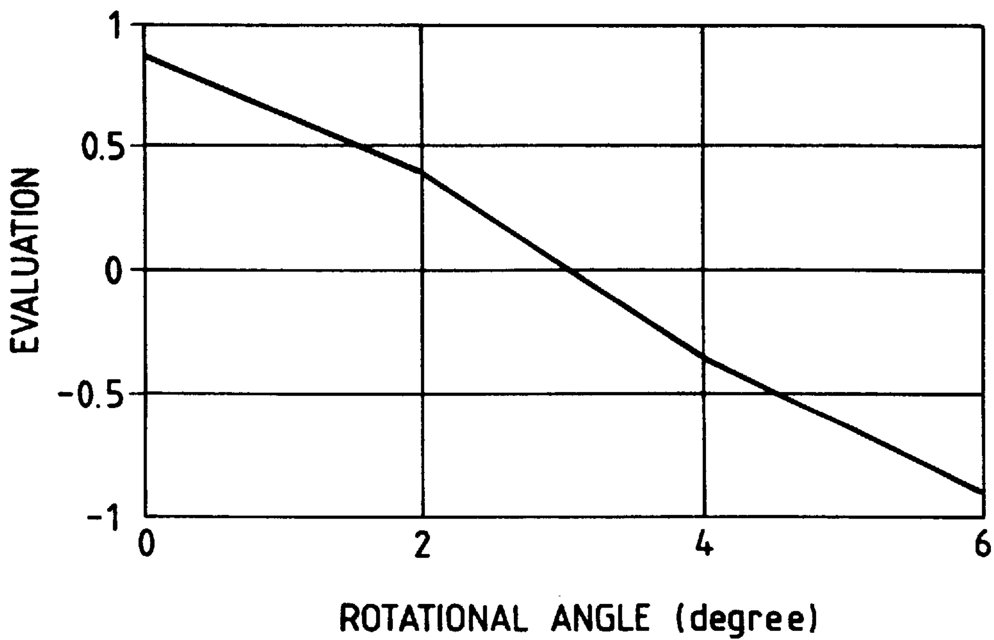

FIG. 11A shows a case wherein the observation image for the left eye is fixed in position, and the observation image for the right eye is rotated clockwise, and FIG. 11B shows a case wherein the observation image for the right eye is fixed in position, and the observation image for the left eye is rotated clockwise. As can be seen from FIG. 11B, when the observation image for the right eye is fixed in position, and the observation image for the left eye is rotated clockwise, the evaluation value of “observability” of a stereoscopic image lowers as the rotational angle increases. In contrast, as can be seen from FIG. 11A, when the observation image for the left eye is fixed in position, and the observation image for the right eye is rotated clockwise, the evaluation value of “observability” of a stereoscopic image becomes higher upon rotation through about 2° than that obtained when the rotational angle of the image=0°.

Also, as can be seen from FIG. 11A, the evaluation value of “observability” of a stereoscopic image continues to improve within the range from 0° to 3°.

Figure 12A:
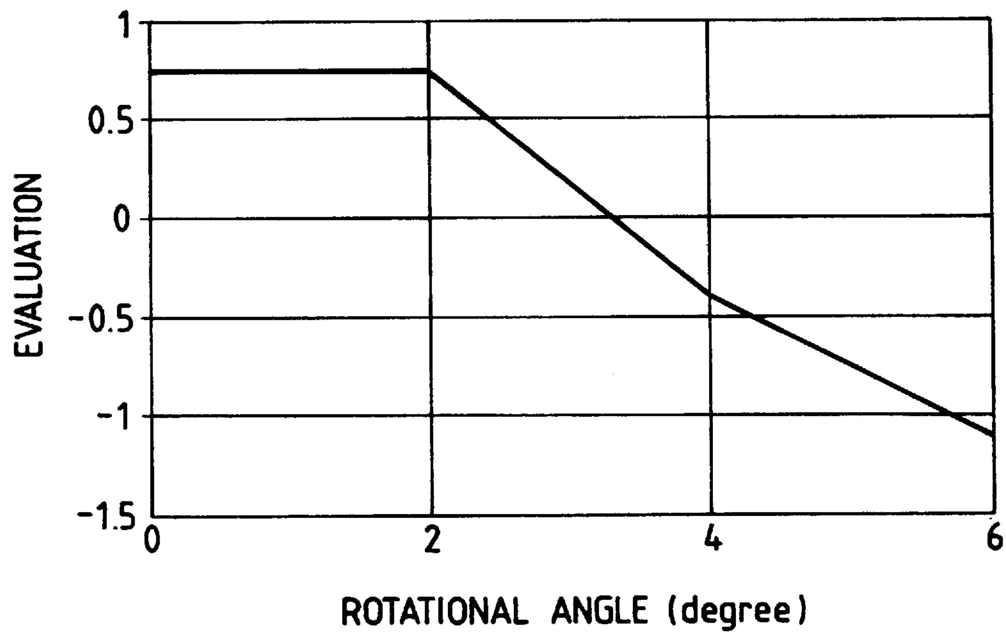
FIGS. 12A and 12B are experiment graphs II showing the relationship between the difference in display condition and the observability of an observation image.
Figure 12B:
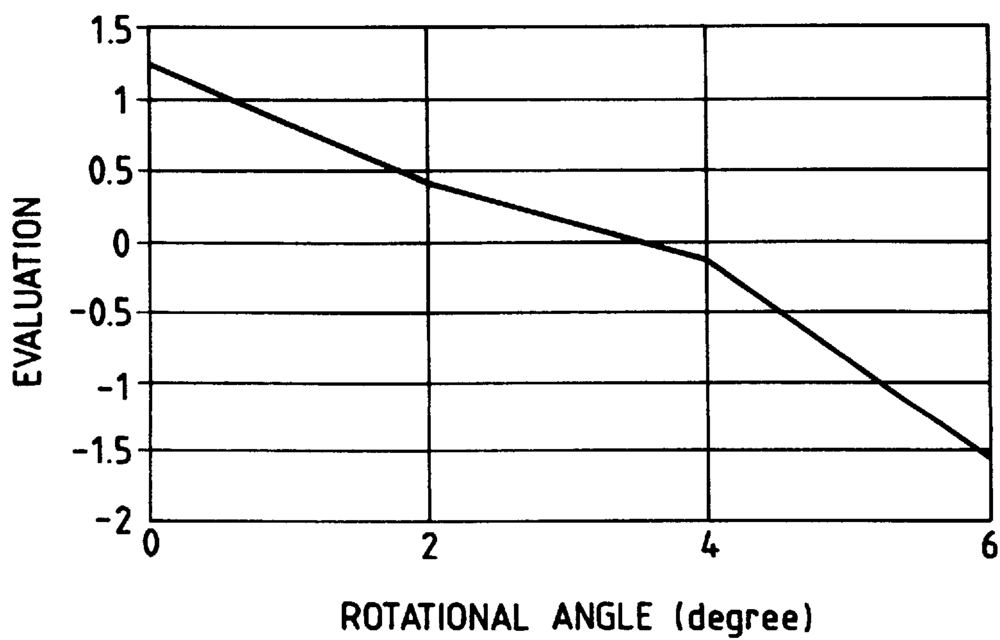

FIG. 12A shows a case wherein the observation image for the right eye is fixed in position, and the observation image for the left eye is rotated counterclockwise, and FIG. 12B shows a case wherein the observation image for the left eye is fixed in position, and the observation image for the right eye is rotated counterclockwise. As can be seen from FIG. 12A, the evaluation value of "observability" of a stereoscopic image is maintained when the rotational angle of the image=0° and when the image is rotated through about 2°. However, as can be seen from FIG. 12B, when the observation image for the left eye is fixed in position, and the observation image for the right eye is rotated counterclockwise, the evaluation value of "observability" of a stereoscopic image lowers as the rotational angle increases.

As can be seen from the above description, when the observation images for the right and left eyes are displayed to be tilted relative to each other in their display planes, the evaluation value of "observability" of a stereoscopic image to be observed changes, and the stereoscopic image can become more "observable" than the conventional display method, i.e., when the rotational angle=0° depending on the direction of rotation.

However, none of conventional stereoscopic image display apparatuses adopt a positive device for rotating the observation images for the right and left eyes relative to each other in their display planes. Similarly, none of image input means of the conventional image display apparatuses adopt a positive device for rotating input images to be input for the right and left eyes relative to each other.

It is an object of the present invention to provide an image display apparatus and an image recording apparatus, which can present a better and more "observable" stereoscopic image than a conventional stereoscopic image display apparatus, i.e., can obtain a state wherein "an observer does not experience fatigue after observation of a stereoscopic image for a long period of time".

Furthermore, it is another object of the present invention to provide an image display apparatus and an image recording apparatus, which can arbitrarily adjust the "observability" of a stereoscopic image within the above-mentioned range in correspondence with the recognition ability of each observer.

Figure 13:
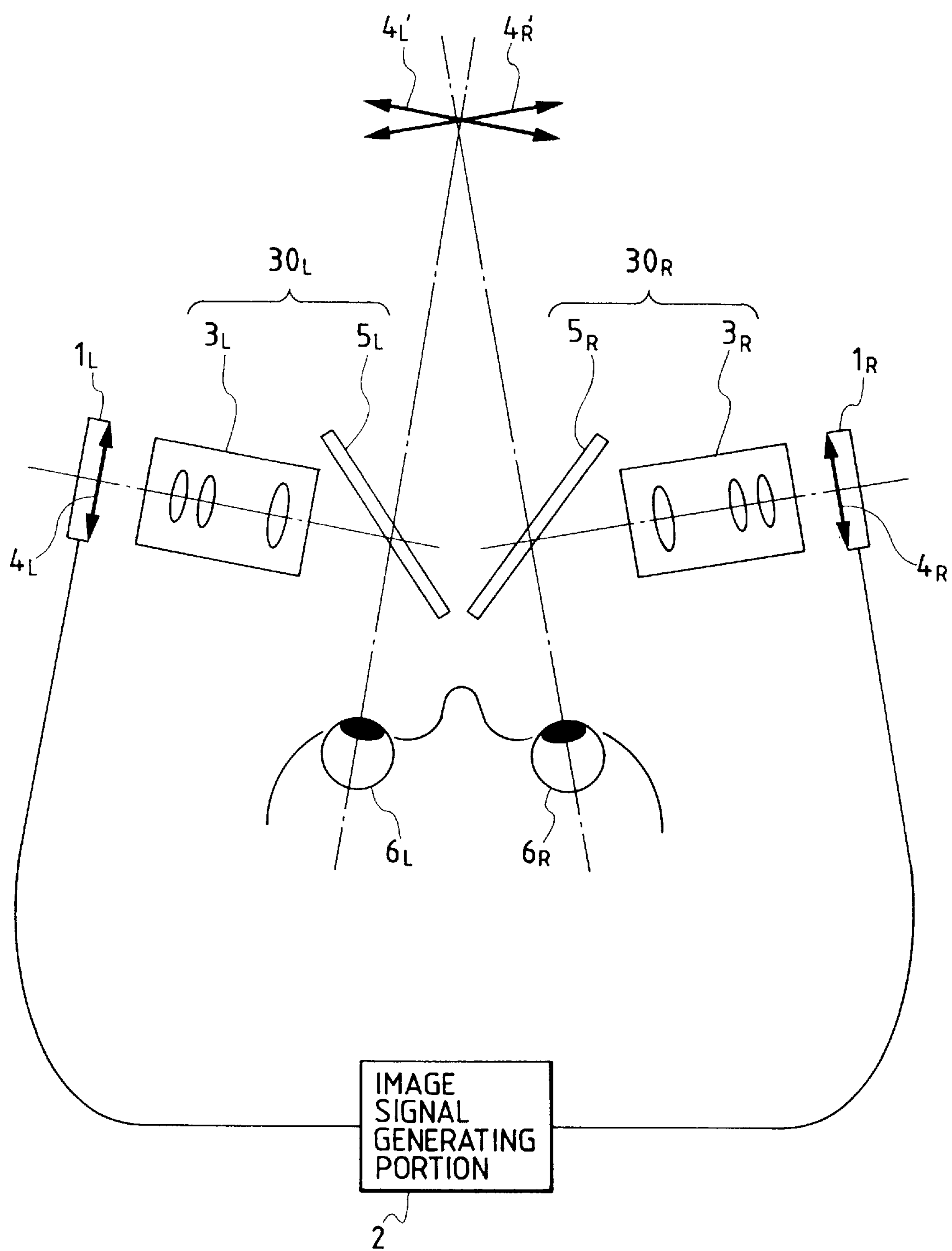
FIG. 13 is a schematic view showing principal part of the first embodiment of the present invention.

FIG. 13 is a schematic view showing principal part of the first embodiment of the present invention. In this embodiment, the present invention is applied to a so-called HMD (head-mounted display) type image display apparatus which independently presents two observation images with a parallax to the two eyes of an observer via an optical system to allow the observer to recognize a stereoscopic image. Referring to FIG. 13, image displays (image display means) $\mathbf{1}_R$ and $\mathbf{1}_L$ (subscripts R and L respectively indicate elements for the right and left eyes) comprise liquid crystal display elements (to be abbreviated as LCDs hereinafter) with backlights in this embodiment. As the image display, a CRT, a plasma display, or the like may be used. In order to attain a size reduction of the entire apparatus, a compact display is preferably used.

An image signal generating portion 2 generates image signals of display images $\mathbf{4}_R$ and $\mathbf{4}_L$ to be respectively presented to the right and left eyes of an observer, and transmits these signals to the corresponding image displays. Lenses (optical systems) $\mathbf{3}_R$ and $\mathbf{3}_L$ have a role of forming, in an enlarged scale, virtual images (observation images) $\mathbf{4}_R'$ and $\mathbf{4}_L'$ of the display images $\mathbf{4}_R$ and $\mathbf{4}_L$ displayed on the image displays 1 at positions in front of the observer. Mirrors $\mathbf{5}_R$ and $\mathbf{5}_L$ bend the optical axes of the lenses $\mathbf{3}_R$ and $\mathbf{3}_L$. Eyes $\mathbf{6}_R$ and $\mathbf{6}_L$ of the observer are located on the optical axes bent by the mirrors $\mathbf{5}_R$ and $\mathbf{5}_L$, and the observer can observe the observation images $\mathbf{4}_R'$ and $\mathbf{4}_L'$ enlarged in the optical axis directions. Since the mirrors $\mathbf{5}_R$ and $\mathbf{5}_L$ are used, the apparatus can be made compact, and can be mounted on the head of the observer. When half mirrors are used, a background image can be superposed on the observation images $\mathbf{4}_R'$ and $\mathbf{4}_L'$, and when the mirrors 5 themselves have an optical power, a further size reduction and improvement of optical performance can be attained.

Note that optical systems $\mathbf{30}_R$ and $\mathbf{30}_L$ for the right and left eyes, which are respectively constituted by the mirrors $\mathbf{3}_R$ and $\mathbf{3}_L$ and the mirrors $\mathbf{5}_R$ and $\mathbf{5}_L$, are disposed at substantially symmetrical positions about the vertical direction, and form the observation images $\mathbf{4}_R'$ and $\mathbf{4}_L'$ at substantially the same position in a space, as shown in FIG. 13. For this reason, when the display images $\mathbf{4}_R$ and $\mathbf{4}_L$ having a binocular parallax are respectively displayed on the right and left image displays $\mathbf{1}_R$ and $\mathbf{1}_L$ the observer can easily observe a stereoscopic image.

Figure 14A:
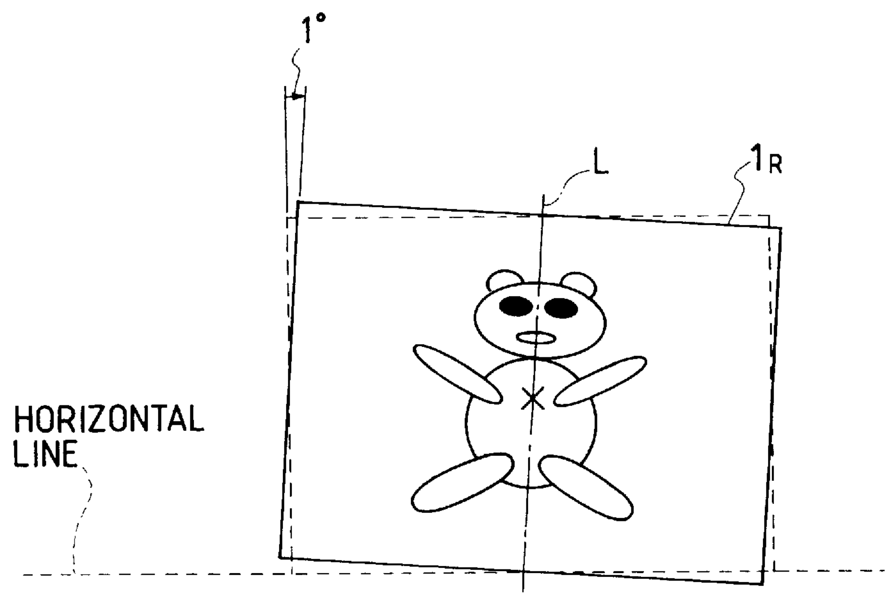

In this embodiment, the image displays $\mathbf{1}_R$ and $\mathbf{1}_L$ are disposed so that the bottom sides of their screen frames do not extend horizontally, unlike in the conventional image display apparatus. FIG. 14A shows the right image display $\mathbf{1}_R$ when viewed from the display plane side (from the observer side) via the mirror. In FIG. 14A, the layout of the conventional image display is indicated by a dotted line, and the layout of the image display of this embodiment is indicated by a solid line. As shown in FIG. 14A, the right image display $\mathbf{1}_R$ is rotated clockwise through about 1° from the layout of the conventional image display in its display plane.

Figure 14B:
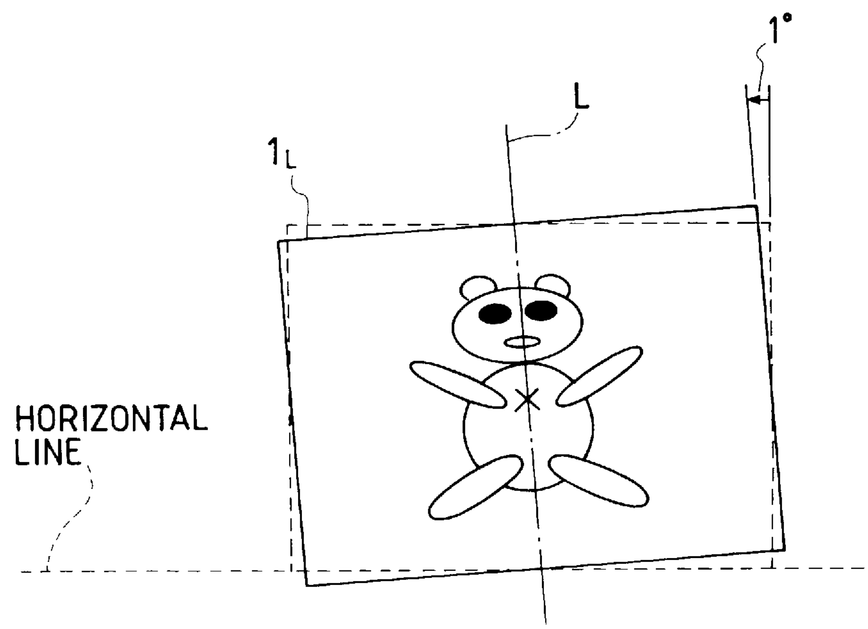

On the other hand, the left image display $\mathbf{1}_L$ is rotated counterclockwise through about 1° from the conventional layout in its display plane, as shown in FIG. 14B. More specifically, the central lines, in the vertical directions, of the observation images for the right and left eyes are tilted in a V-shaped pattern. (In the following description, the V-shaped pattern represents a state wherein the central lines, in the vertical direction, of two images are titled in a V-shaped pattern relative to each other.) With this layout, the observation images $\mathbf{4}_R'$ and $\mathbf{4}_L'$ are also formed in the directions of the corresponding displays.

Figure 15A:
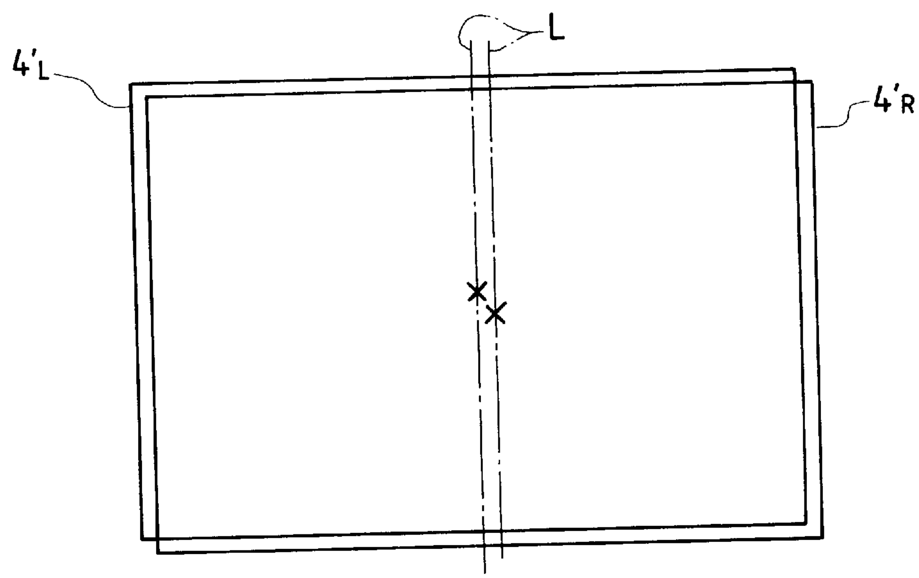
Figure 15B:
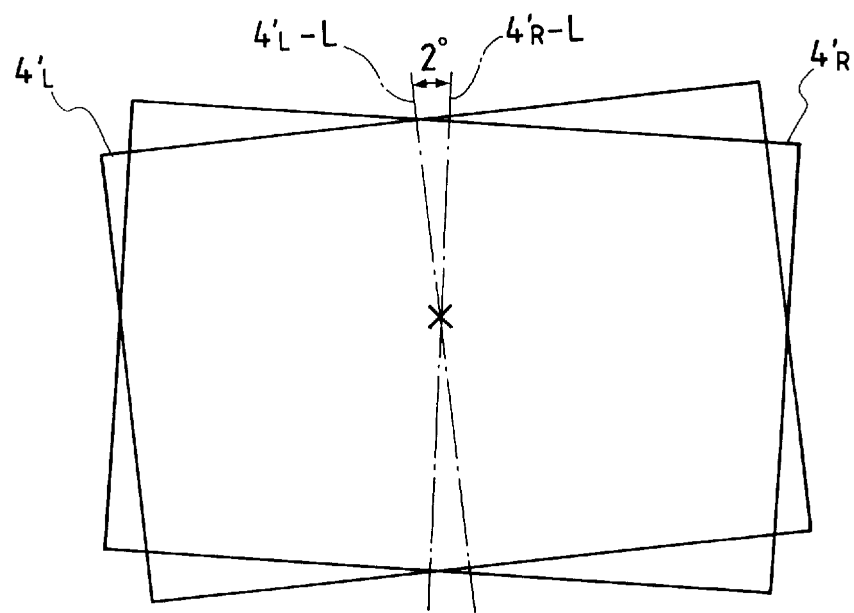

FIG. 15A shows the observation images $\mathbf{4}_R'$ and $\mathbf{4}_L'$ of the conventional display apparatus when viewed from the direction of the observer. The bottom sides of the right and left observation images are horizontal, and the positions of the entire right and left image frames substantially match each other. However, in this embodiment, as shown in FIG. 15B, the observation images $\mathbf{4}_R'$ and $\mathbf{4}_L'$ for the right and left eyes are formed in a state wherein the observation image $\mathbf{4}_R'$ for the right eye is rotated clockwise through about 1°, and the observation image $\mathbf{4}_L'$ for the left eye is rotated counterclockwise through about 1°, i.e., the two images are tilted through 2° relative to each other.

As described above, in the HMD type stereoscopic image display apparatus of this embodiment, the two observation images with a parallax, which are presented to the two images, are tilted relative to each other within the range from an angle larger than 0° to an angle equal to or smaller than 3°, and preferably, within the range from 1° to 3°, thus obtaining good "observability" of a stereoscopic image.

In the present invention, since a relative tilt angle need only be set between the two observation images, one of the two image displays may be tilted from the horizontal state.

Figure 16:
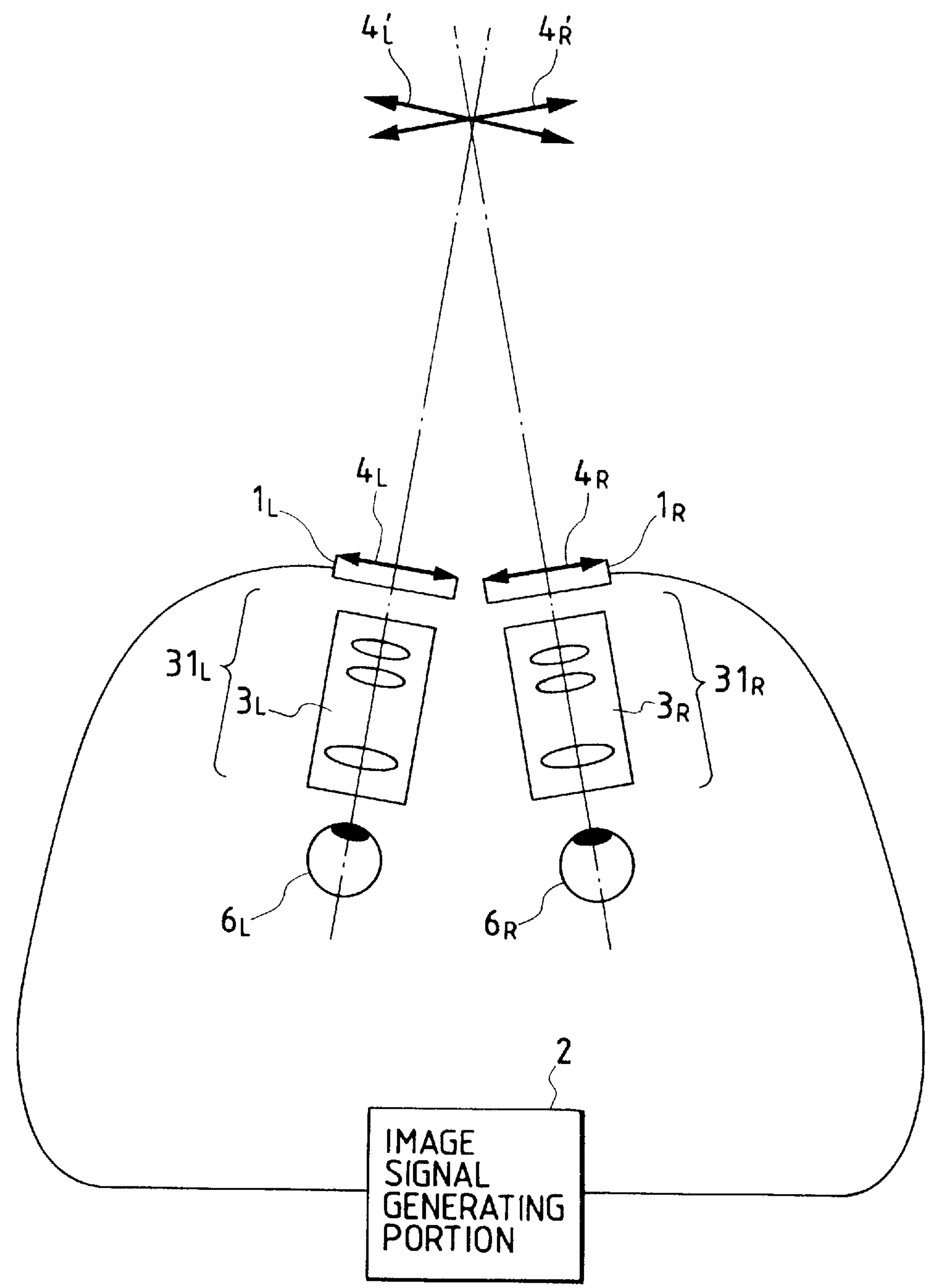
FIG. 16 is a schematic view showing principal part of the second embodiment of the present invention.

FIG. 16 is a schematic view showing principal part of the second embodiment of the present invention. In this embodiment, the mirrors 5 in the first embodiment are omitted. Eyes $6_R$ and $6_L$ of the observer are located on the optical axes of the lenses $3_R$ and $3_L$, and the observer can observe the virtual images (observation images) $4_R$' and $4_L$' enlarged in the optical axis directions. Optical systems $31_R$ and $31_L$ for the right and left eyes, which are respectively constituted by the image displays $1_R$ and $1_L$ and the lenses $3_R$ and $3_L$, are disposed at substantially the symmetrical positions about the vertical direction, and form the observation images $4_R$' and $4_L$' at substantially the same position on the space, as shown in FIG. 16. For this reason, when the display images $4_R$ and $4_L$ having a binocular parallax are respectively displayed on the right and left image displays $1_R$ and $1_L$, the observer can easily observe a stereoscopic image.

In this arrangement as well, the right and left image displays $1_R$ and $1_L$ are disposed in a tilted state as in the first embodiment. With this arrangement, the observation images $4_R$' and $4_L$' are tilted in a V-shaped pattern relative to each other within the range from an angle larger than 0° to an angle equal to or smaller than 3°, and preferably, within the range from 1° to 3°, thus obtaining good "observability" of a stereoscopic image.

As described above, the present invention is characterized in that the right and left observation images to be observed by the observer are displayed to be tilted relative to each other in their display planes. As the rotation method of the two observation images, the following two methods are available in addition to the method of tilting the image displays.

1) Method using coordinate conversion of images

2) Method using optical systems

Method 1) using coordinate conversion of images will be explained below. In the method using coordinate conversion of images, upon displaying a pair of display images on the image displays 1, at least one display image is subjected to image coordinate conversion processing to rotate it through a predetermined angle relative to an original display image, and the rotated image is displayed.

Figure 17:
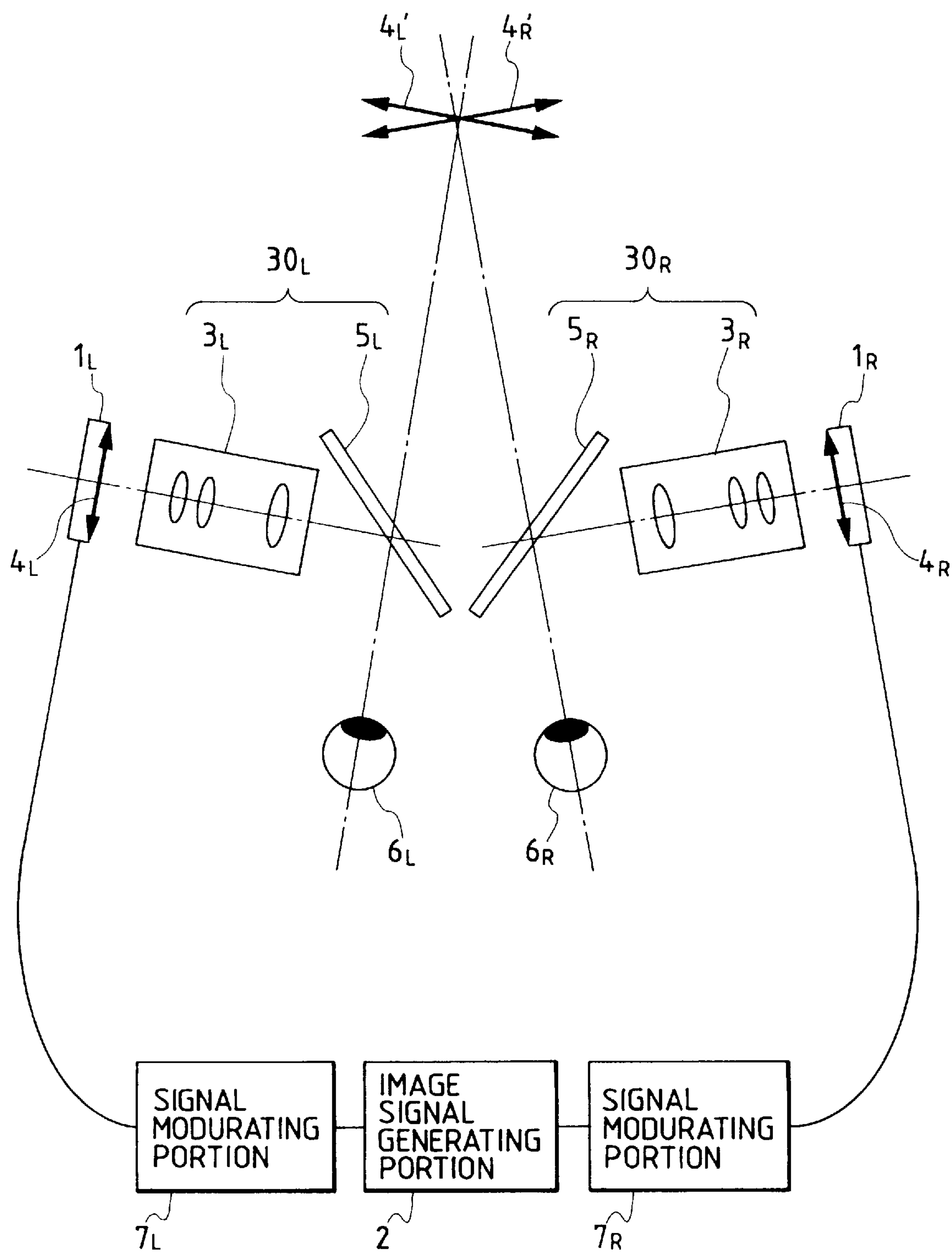
FIG. 17 is a schematic view showing principal part of the third embodiment of the present invention.

FIG. 17 is a schematic view showing principal part of the third embodiment of the present invention. The difference between this embodiment and the first embodiment is that display images are rotated by electronically attaining coordinate conversion of images using image signal modulating portions without tilting the image displays 1.

More specifically, electrical signals supplied from the image signal generating portion 2 to the image displays 1 are subjected to coordinate conversion processing of images in right and left image signal modulating portions $7_R$ and $7_L$ (7) to rotate the right and left display images $4_R$ and $4_L$, and the rotated images are displayed.

Figure 18A:
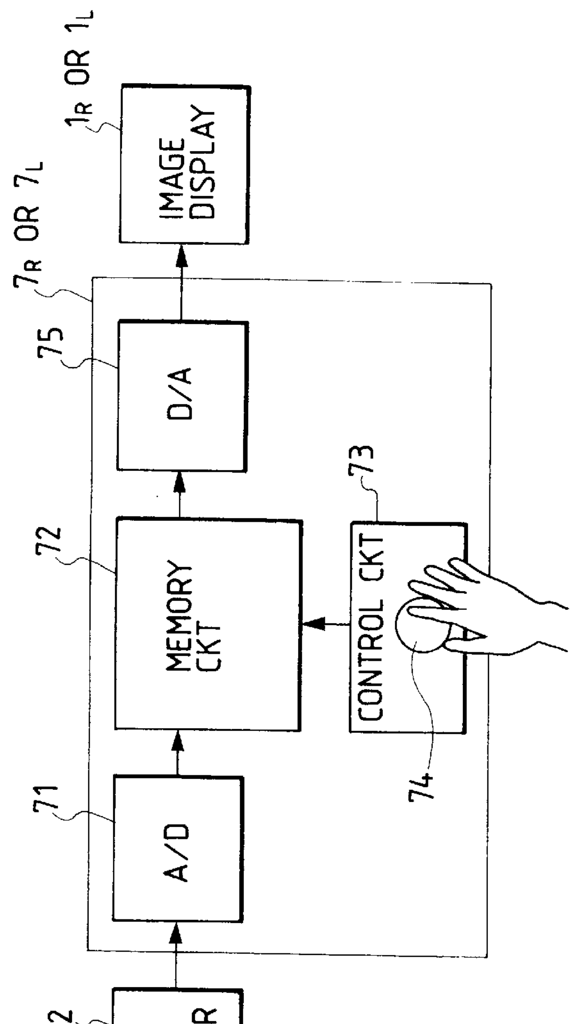
Figure 18B:
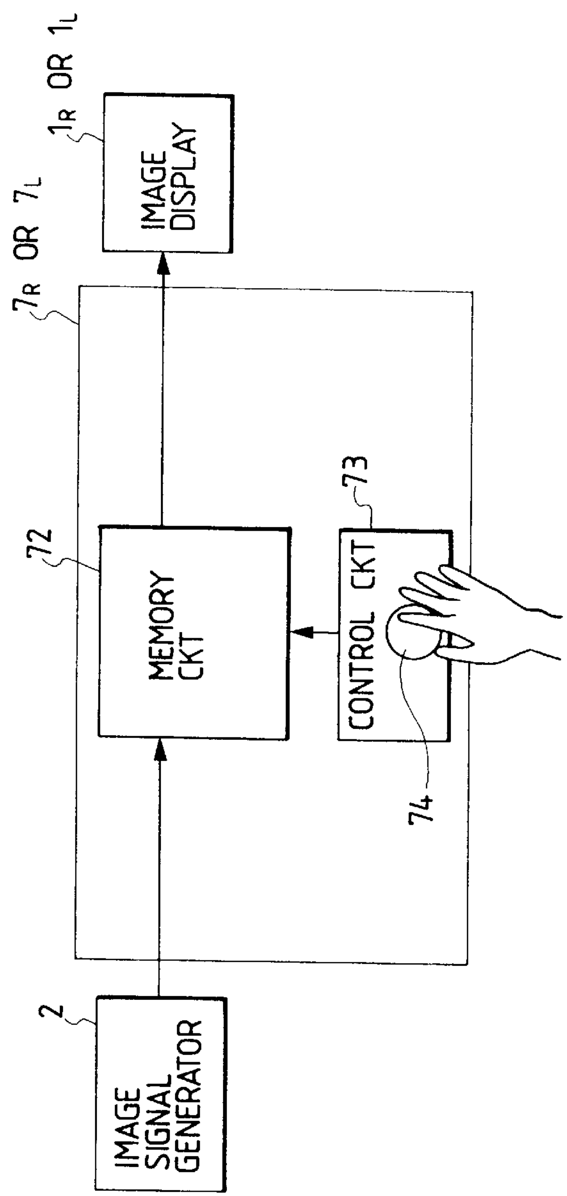

FIGS. 18A and 18B are explanatory views of the image signal modulating portion 7 of the third embodiment. FIG. 18A shows the arrangement of the image signal modulating portion when the image signal supplied from the image signal generating portion 2 is an analog video signal. An analog image signal generated by the image signal generating portion 2 is converted into a digital signal by an A/D converter 71, and the digital signal is supplied to a memory circuit 72. On the memory circuit 72, coordinate conversion processing such as movement, interpolation, thin-out processing, and the like is performed in units of pixels in accordance with a command signal supplied from a control circuit 73, thereby modulating the rotational angle of an image. The control circuit 73 has a knob 74 for adjusting the image rotational angle, and a user can freely adjust the image rotational angle using this knob. The digital image signal which is modulated on the memory circuit 72 is converted into an analog image signal by a D/A converter 75, and the analog image signal is supplied to the corresponding image display 1. Of course, if the image display 1 can receive a digital signal, the D/A converter 75 may be omitted.

FIG. 18B shows the arrangement of the image signal modulating portion $7_L$ ($7_R$) when an image signal supplied from the image signal generating portion 2 is a digital signal. A digital image signal generated by the image signal generating portion 2 is directly supplied to the memory circuit 72. On the memory circuit 72, coordinate conversion processing such as movement, interpolation, thin-out processing, and the like is performed in units of pixels in accordance with a command signal supplied from the control circuit 73, thereby modulating the rotational angle of an image. The control circuit 73 has the knob 74 for adjusting the image rotational angle, and a user can freely adjust the image rotational angle using this knob. The image display 1 can receive a digital signal, and the modulated digital image signal is directly transmitted to the image display 1.

As described above, with the above-mentioned arrangements for analog and digital image signals, a desired rotational angle can be provided to the display images $4_R$ and $4_L$ to be displayed on the right and left image displays $1_R$ and $1_L$. In the arrangement of the third embodiment, the right and left optical systems $30_R$ and $30_L$ are perfectly symmetrical with each other, and there are no optical factors for rotating the right and left images. Therefore, the rotational angles of the display images $4_R$ and $4_L$ are directly reflected in those of the corresponding observation images (virtual images) $4_R$' and $4_L$'.

Figure 19:
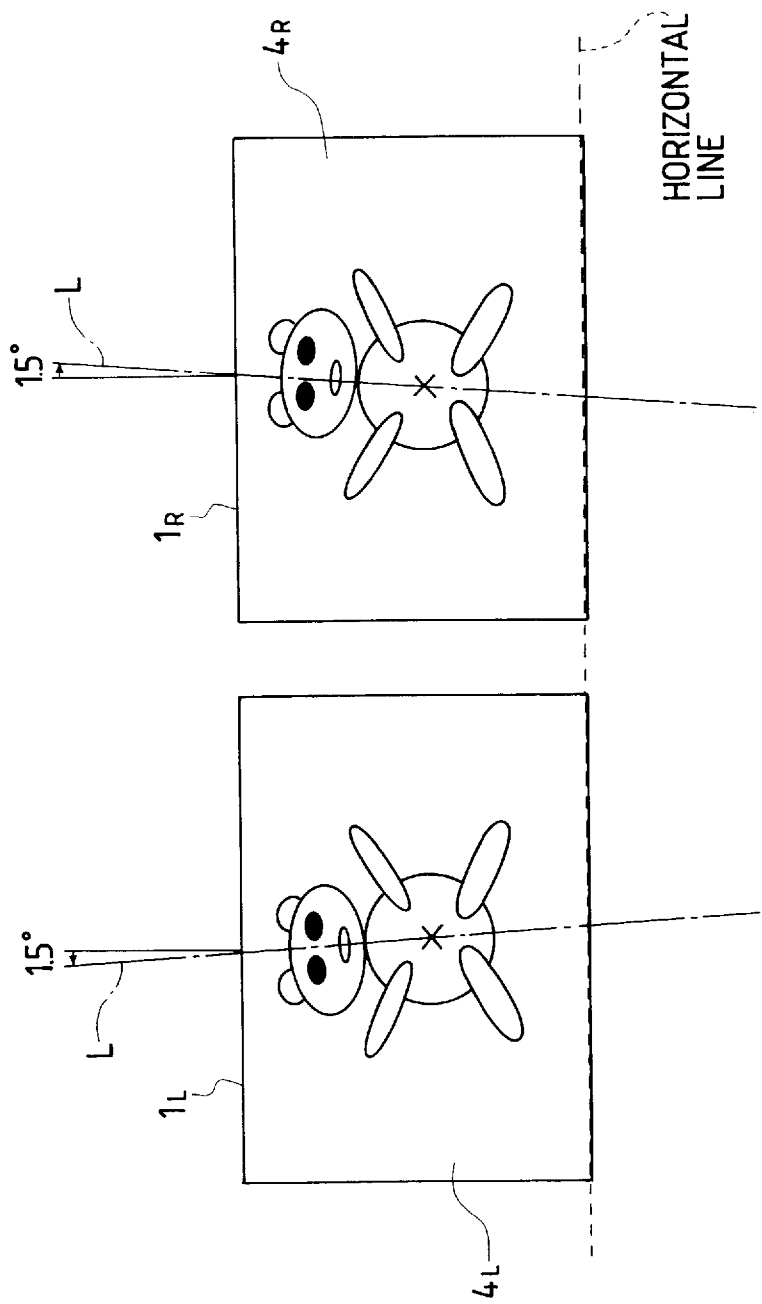
FIG. 19 is a view showing display images displayed on the right and left image displays of the third embodiment.

FIG. 19 shows the display images $4_R$ and $4_L$ for the right and left eyes to be displayed on the right and left image displays $1_R$ and $1_L$ in this embodiment. At this time, since the display image $4_R$ for the right eye is rotated clockwise through 1.5°, and the display image $4_L$ for the left eye is rotated counterclockwise through 1.5°, the observation images $4_R$' and $4_L$' are similarly displayed in the rotated states.

As described above, when at least one of the right and left display images is rotated by the above-mentioned coordinate conversion processing of an image, the tilt angle of the two observation images can be adjusted by the above-mentioned method in desired directions within the range from an angle larger than 0° to an angle equal to or smaller than 3°, and preferably, within the range from 1° to 3°, thus obtaining two observation images which are tilted in a V-shaped pattern. In this manner, good "observability" of a stereoscopic image can be obtained as in the first embodiment.

In this embodiment as well, since the two observation images need only be tilted relative to each other, the image signal modulating portion 7 may be arranged for only one image, and only one input image may be tilted from the horizontal state.

Method 2) using optical systems will be described below. In the method using optical systems, when a stereoscopic image display apparatus has a pair of optical systems for forming right and left observation images at predetermined positions, an image is rotated during the formation process of a virtual image (observation image) from a display image by each optical system. When this method is adopted, the display images $4_R$ and $4_L$ for the right and left eyes are displayed on the right and left image displays 1 so as not to be tilted relative to each other, and the observation images are rotated somewhere in the right and left optical systems.

Figure 20:
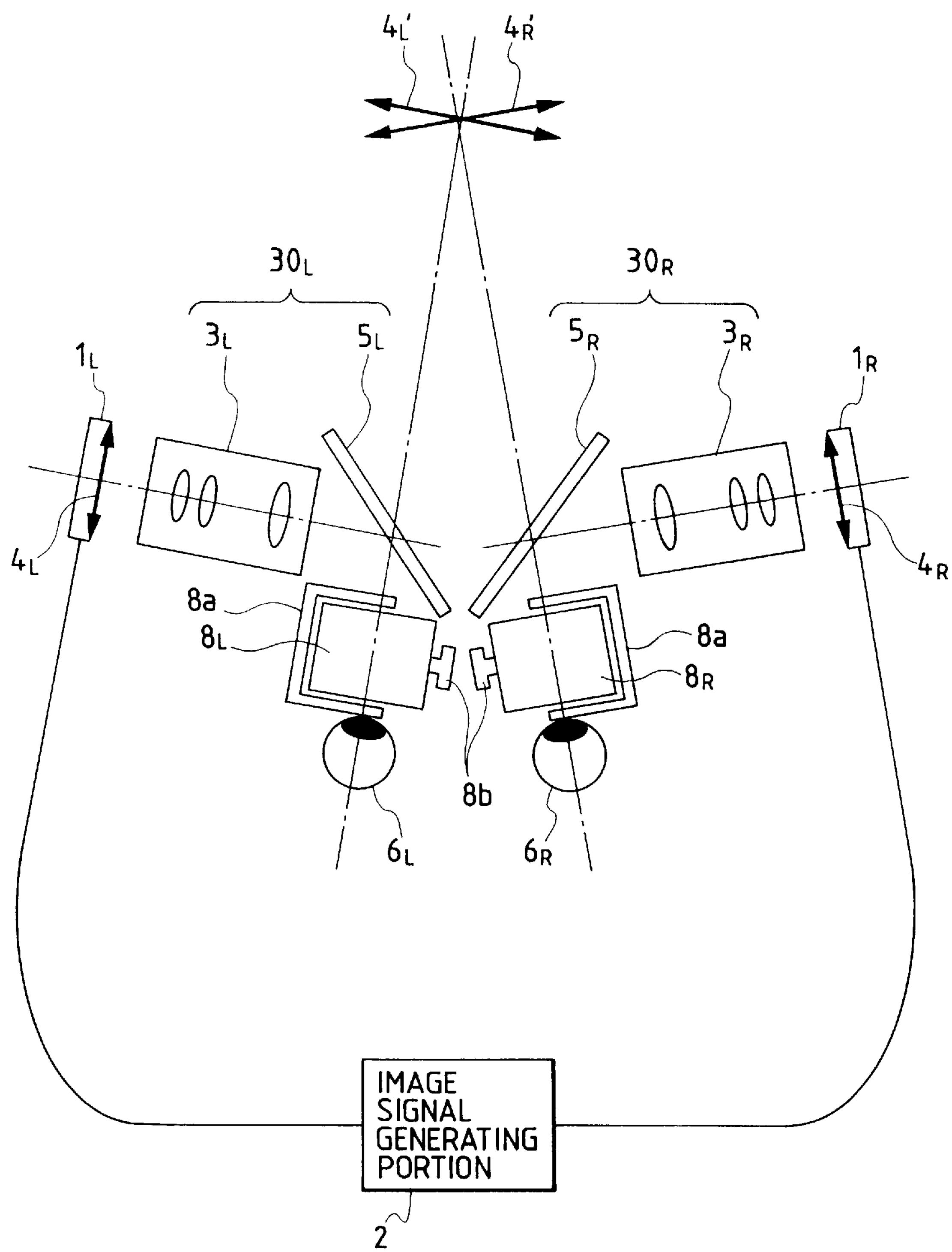
FIG. 20 is a schematic view showing principal part of the fourth embodiment of the present invention.

FIG. 20 is a schematic view showing principal part of the fourth embodiment of the present invention. In this embodiment, the observation images are rotated by image rotators. This embodiment is substantially the same as the first embodiment except that the right and left image displays $\mathbf{1}_R$ and $\mathbf{1}_L$ are not tilted relative to each other, and image rotators are added to the optical systems. In FIG. 20, image rotators $\mathbf{8}_R$ and $\mathbf{8}_L$ are used for tilting the observation images.

Figure 21A:
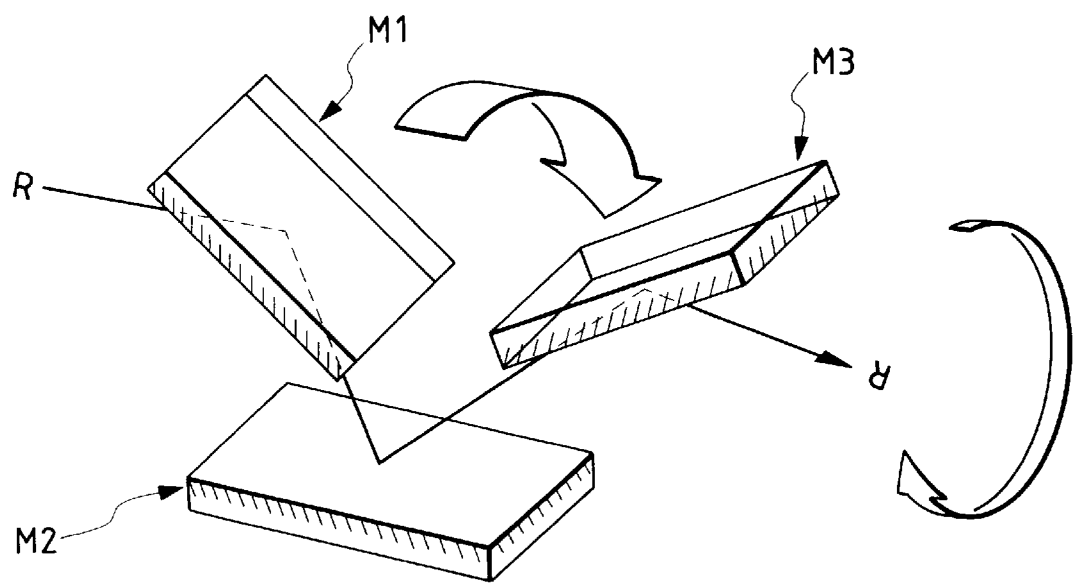
FIGS. 21A and 21B are perspective views of an image rotator.
Figure 21B:
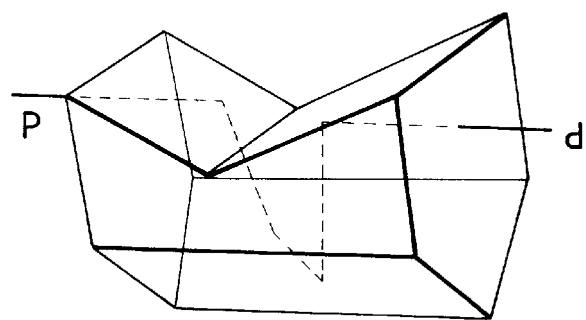

FIGS. 21A and 21B are perspective views of the image rotators. The image rotator is an optical element which rotates an image transmitted therethrough through 2θ° when it is rotated through θ° about its optical axis. For example, an image rotator using three mirrors, as shown in FIG. 21A, and an image rotator using a prism, as shown in FIG. 21B, are available. In this embodiment, the image rotator of the type shown in FIG. 21B is used. The image rotators $\mathbf{8}_R$ and $\mathbf{8}_L$ can be rotated through an arbitrary angle about their optical axes using support members 8*a* and knobs 8*b*. Note that a structure for electrically rotating the image rotators $\mathbf{8}_R$ and $\mathbf{8}_L$ may be adopted. According to the arrangement shown in FIG. 20, the rotational angles of the right and left observation images can be adjusted to arbitrary angles.

The insertion positions of the image rotators $\mathbf{8}_R$ and $\mathbf{8}_L$ are not particularly limited as long as they are inserted in the optical paths. For example, when the image rotators $\mathbf{8}_R$ and $\mathbf{8}_L$ are disposed at positions corresponding to the beam waists of light beams which contribute to formation of virtual images, their sizes can be reduced. On the other hand, as shown in FIG. 20, when each image rotator is inserted between the mirror 5 and the pupil (eye) 6 of the observer, the rotation direction of the image rotator can be matched with that of the observation image (virtual image).

In this embodiment, since the right image rotator $\mathbf{8}_R$ is rotated clockwise (viewed from the exit side of a light beam) through 0.5°, and the left image rotator $\mathbf{8}_L$ is rotated counterclockwise (viewed from the exit side of a light beam) through 0.5°, the right observation image $\mathbf{4}_R'$ is rotated clockwise through 1°, and the left observation image $\mathbf{4}_L'$ is rotated counterclockwise through 1°. Therefore, the two observation images $\mathbf{4}_R'$ and $\mathbf{4}_L'$ are tilted through 2° relative to each other.

As described above, when the movable image rotator is inserted in at least one of the right and left optical systems, the tilt angles of two observation images can be arbitrarily set, so that the two images are tilted in a V-shaped pattern relative to each other within the range from an angle larger than 0° to an angle equal to or smaller than 3°, and preferably, within the range from 1° to 3°. In this manner, good "observability" of a stereoscopic image can be obtained as in the first embodiment.

In this embodiment as well, since it suffices to tilt the two observation images relative to each other, the image rotator 8 may be inserted in only one optical path, and only one observation image may be tilted from the horizontal state.

Even when no optical systems are used in displaying images, the image rotator can be arranged in front of one eye of the observer upon observation, thus tilting the observation image on the corresponding side.

Note that practicing of the present invention by rotating at least one of the right and left image displays 1 like in the first embodiment is regarded as a kind of method 2) using optical systems.

Note that method 1) using coordinate conversion of images and method 2) using optical systems may be combined. This example will be described below.

Figure 22:
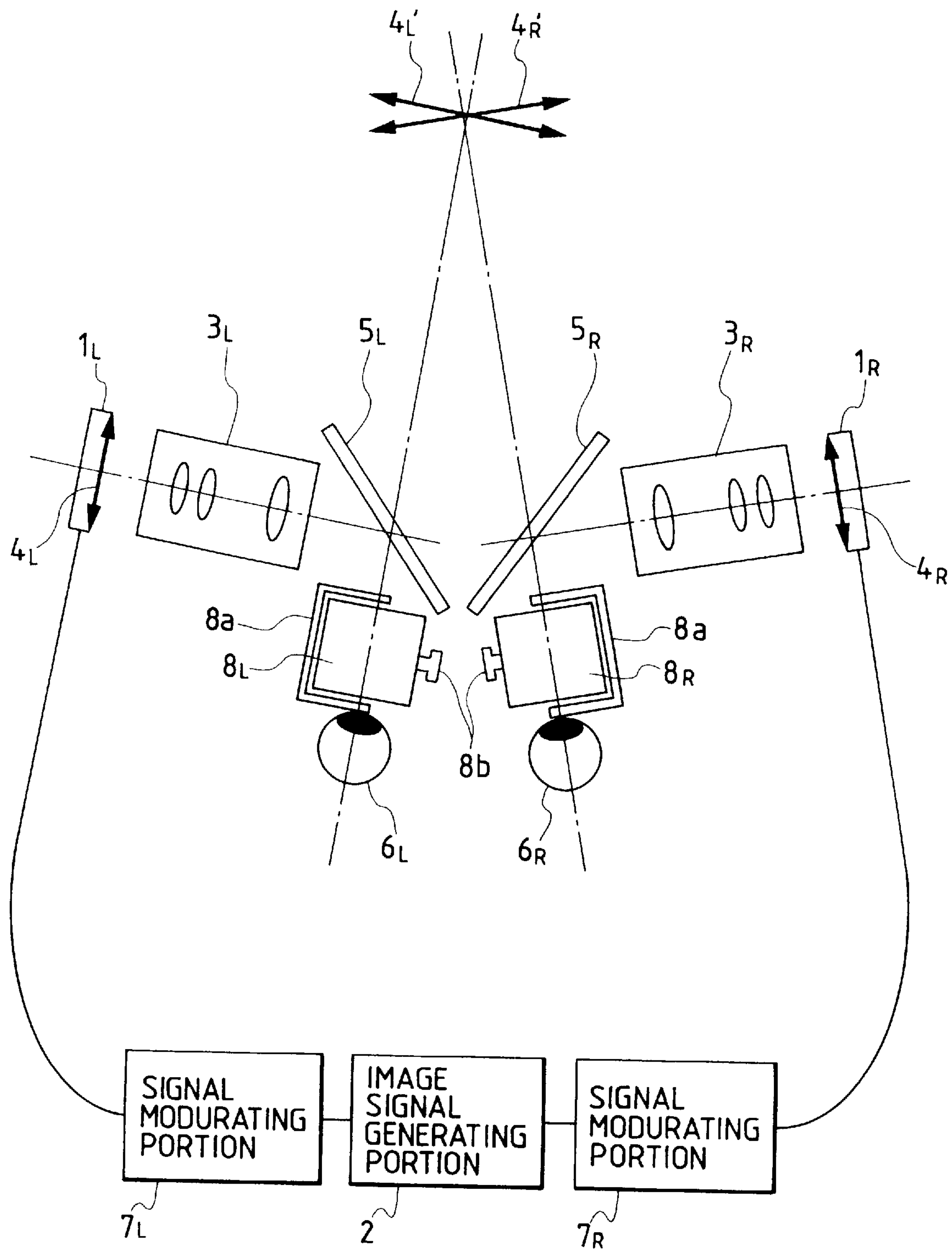
FIG. 22 is a schematic view showing principal part of the fifth embodiment of the present invention.

FIG. 22 is a schematic view showing principal part of the fifth embodiment of the present invention. In this embodiment, rotation of the observation images $\mathbf{4}_R'$ and $\mathbf{4}_L'$ is realized using both methods 1) and 2). In FIG. 22, image signal modulating portions $\mathbf{7}_R$ and $\mathbf{7}_L$ rotate the display images by the coordinate conversion processing of images. Image rotators $\mathbf{8}_R$ and $\mathbf{8}_L$ can also rotate observation images.

As described above, in the first to fifth embodiments, in order to display the observation images for the right and left eyes while tilting them in a V-shaped pattern relative to each other within the range from an angle larger than 0° to an angle equal to or smaller than 3°, both the observation images for the right and left eyes are tilted or are rotated independently.

In the first to fifth embodiments, the present invention is applied to an output portion (HMD display apparatus) of the image display apparatus. Alternatively, when the present invention is applied to an input portion (input means) of a stereoscopic image display apparatus, i.e., an image recording apparatus, the same effect can be obtained. Embodiments of four different types of input means will be described hereinafter.

Double-Lens Camera Input Means

Figure 23:
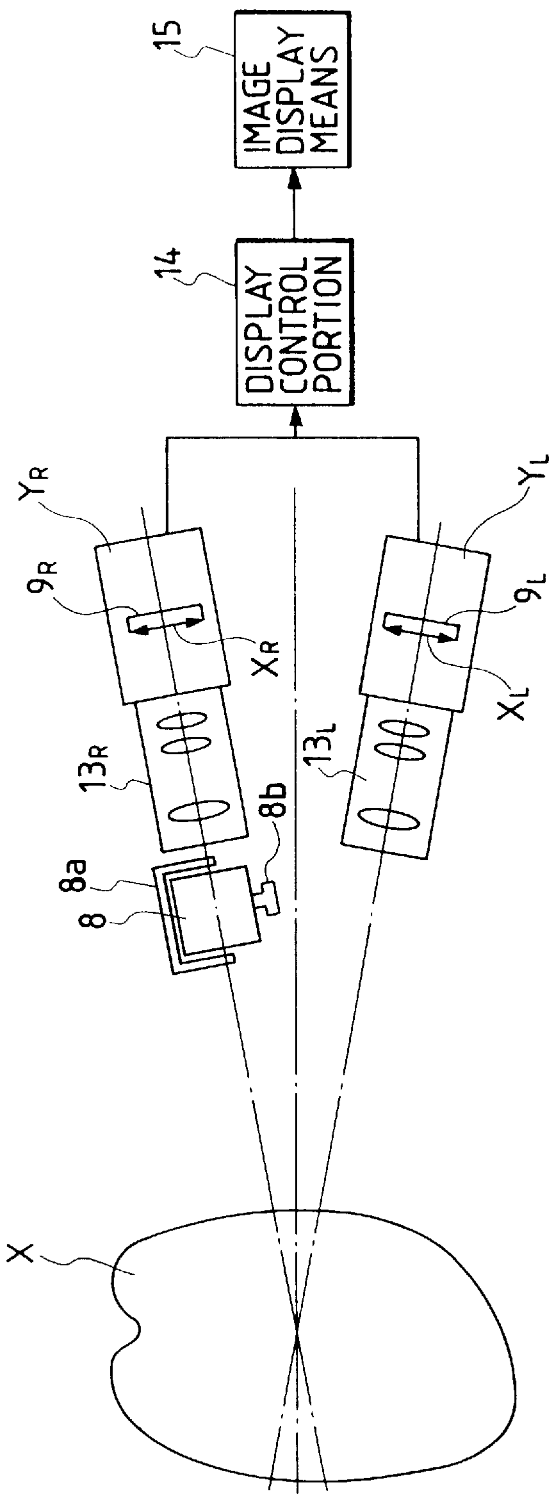
FIG. 23 is a schematic view showing principal part of the sixth embodiment of the present invention.

FIG. 23 is an explanatory view of the sixth embodiment of the present invention. In this embodiment, in order to set a V-shaped layout of right and left input images upon input in an image recording apparatus having double-lens camera input means, the "method using optical systems" used in the fourth embodiment, i.e., an image rotator, is applied to one optical system (optical means) of a double-lens camera system.

In FIG. 23, an image of an object X is taken by right and left cameras $Y_R$ and $Y_L$ constituting the double-lens camera system. Optical systems $\mathbf{13}_R$ and $\mathbf{13}_L$ form an image of the object X on image recording means $\mathbf{9}_R$ and $\mathbf{9}_L$ to obtain input images $X_R$ and $X_L$. A display control portion 14 receives signals of the input images from the double-lens camera system, and appropriately displays the received images on image display means 15 as display images by controlling the received images.

In this arrangement, an image rotator 8 is inserted in the optical path of at least one of the optical systems of the right and left cameras $Y_R$ and $Y_L$. When the image rotator 8 is rotated about its optical axis, the input image $X_R$ obtained on the image recording means $\mathbf{9}_R$ is rotated through an arbitrary angle within the range from an angle larger than 0° to an angle equal to or smaller than 3°, and preferably, within the range from 1° to 3°, thereby obtaining the two input images $X_R$ and $X_L$ which are tilted in a V-shaped pattern relative to each other.

Figure 24:
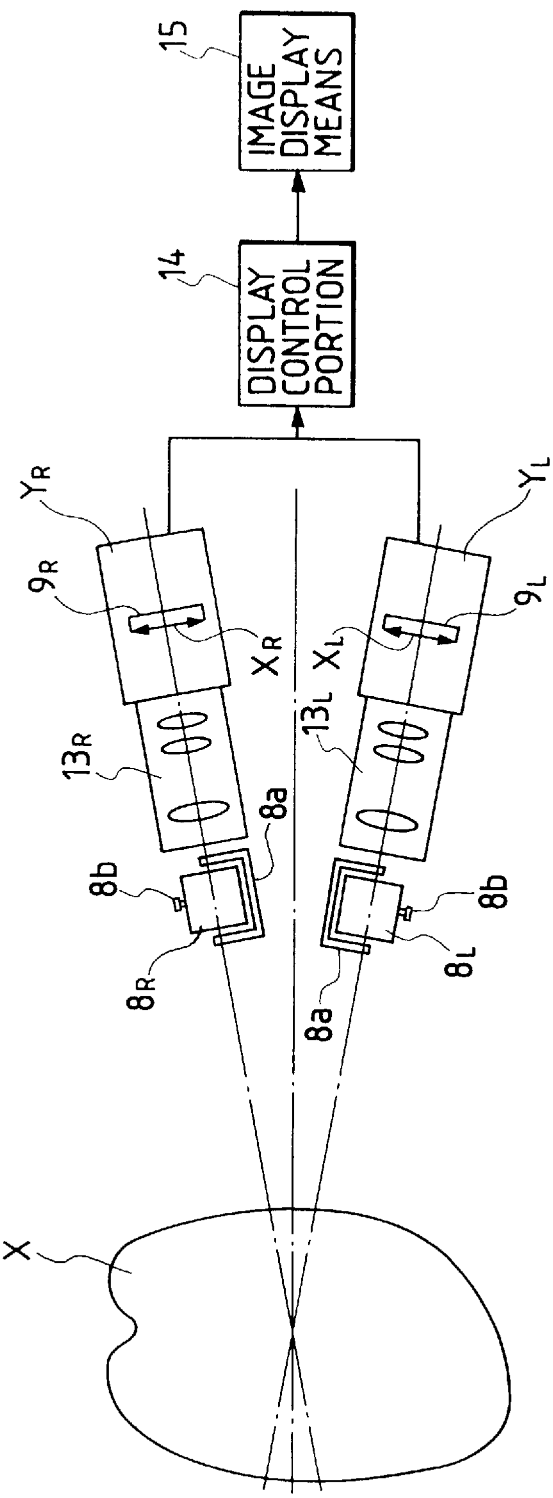
FIG. 24 is a schematic view showing principal part of another arrangement of the sixth embodiment of the present invention.

FIG. 23 shows an example wherein the image rotator 8 is inserted in the optical system of only the right camera. Furthermore, FIG. 24 shows an example wherein image rotators $\mathbf{8}_R$ and $\mathbf{8}_L$ are inserted in the optical paths of both the right and left image pick-up optical systems. In this case, the two input images $X_R$ and $X_L$ can be rotated through arbitrary angles in correspondence with the display condition.

On the other hand, the lens portions of the cameras remain unmodified, and at least one of the right and left image recording means $\mathbf{9}_R$ and $\mathbf{9}_L$ may be rotated in its recording plane within the range from an angle larger than 0° to an angle equal to or smaller than 3°, and preferably, within the range from 1° to 3°, so that the central lines, in the vertical directions, of the image recording means form a V-shaped layout, thus obtaining the same effect as described above.

As described above, in the image recording apparatus with the double-lens camera input means, when the image rotator 8 is used in a portion of the double-lens camera system, two input images with a parallax can be input while being tilted relative to each other. When stereoscopic viewing is performed in a normal image display apparatus using these two input images, good "observability" can be provided.

Multi-Lens Camera Input Means

In an image recording apparatus having means for inputting input images with a parallax using a multi-lens camera system, when the central lines, in the vertical direction, of the input images are set to form a V-shaped pattern, an optical system (optical means) for taking an input image for the right eye and an optical system (optical means) for taking an input image for the left eye can be optically rotated by the above-mentioned method as in the double-lens camera system.

However, in this case, upon inputting input images with a parallax, the position information of the two eyes of an observer with respect to the image display means is required. If the positions of the two eyes of the observer are determined with respect to the image display means, two cameras for presenting a stereoscopic image corresponding to the positions of the two eyes are selected, and two input images obtained by the selected cameras are tilted to form a V-shaped pattern.

If the positions of the two eyes of the observer with respect to the image display means are unknown, detectors are added to detect the positions of the two eyes of the observer, two cameras for presenting a stereoscopic image corresponding to the detected positions are selected, and two input images obtained by the selected cameras are tilted to form a V-shaped pattern.

Figure 25:
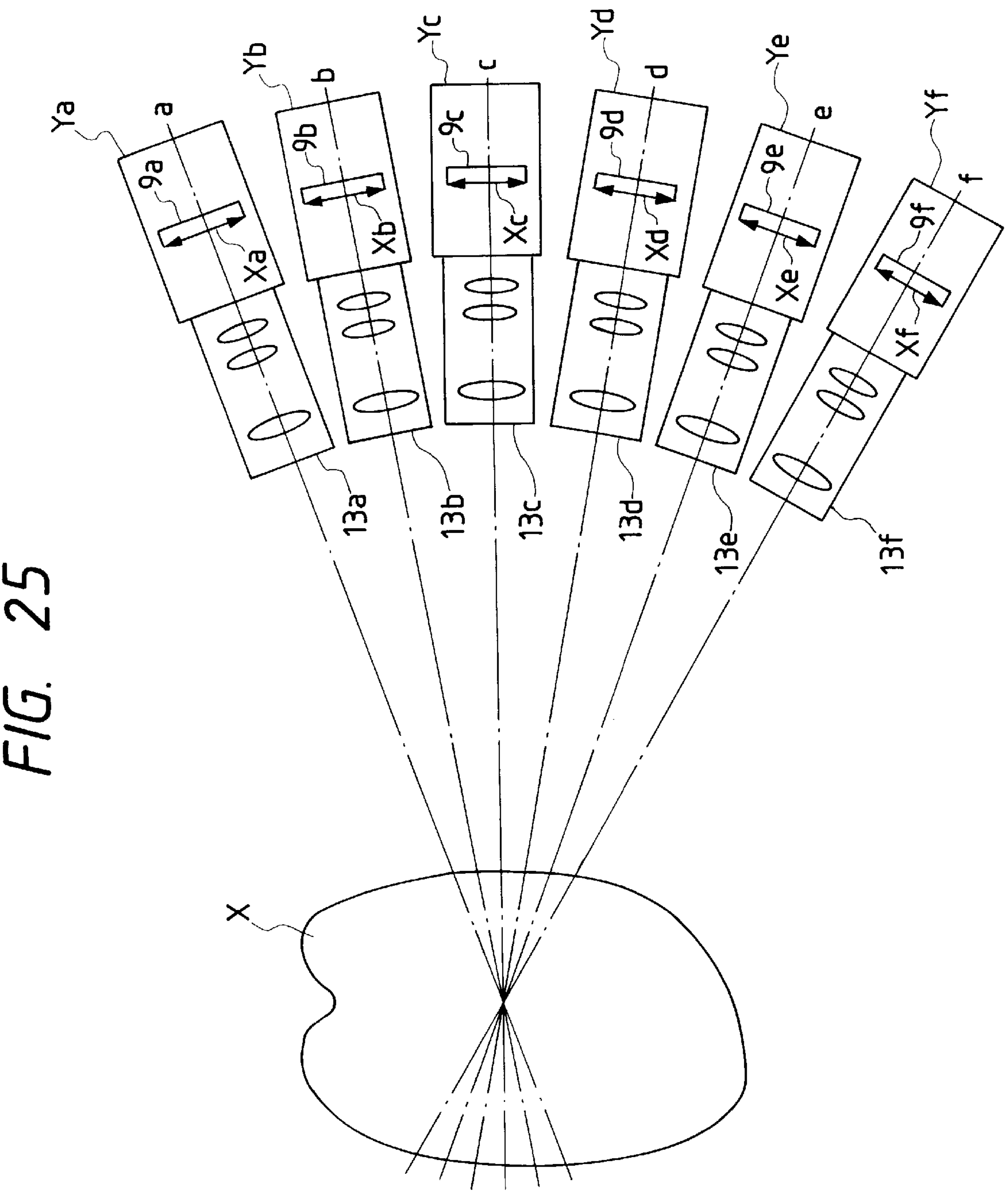
FIG. 25 is an explanatory view of six-lens camera input means.

FIG. 25 is an explanatory view of the six-lens camera input means. In FIG. 25, an image of an object X is taken using a six-lens camera system including cameras Ya to Yf. Optical systems 13*a* to 13*f* form the image of the object X on image recording means 9*a* to 9*f* to obtain input images Xa to Xf with a parallax. Of these input images, only one input image corresponds to a display image to be observed by the right eye of the observer, and only one input image corresponds to a display image to be observed by his or her left eye.

Figure 26:
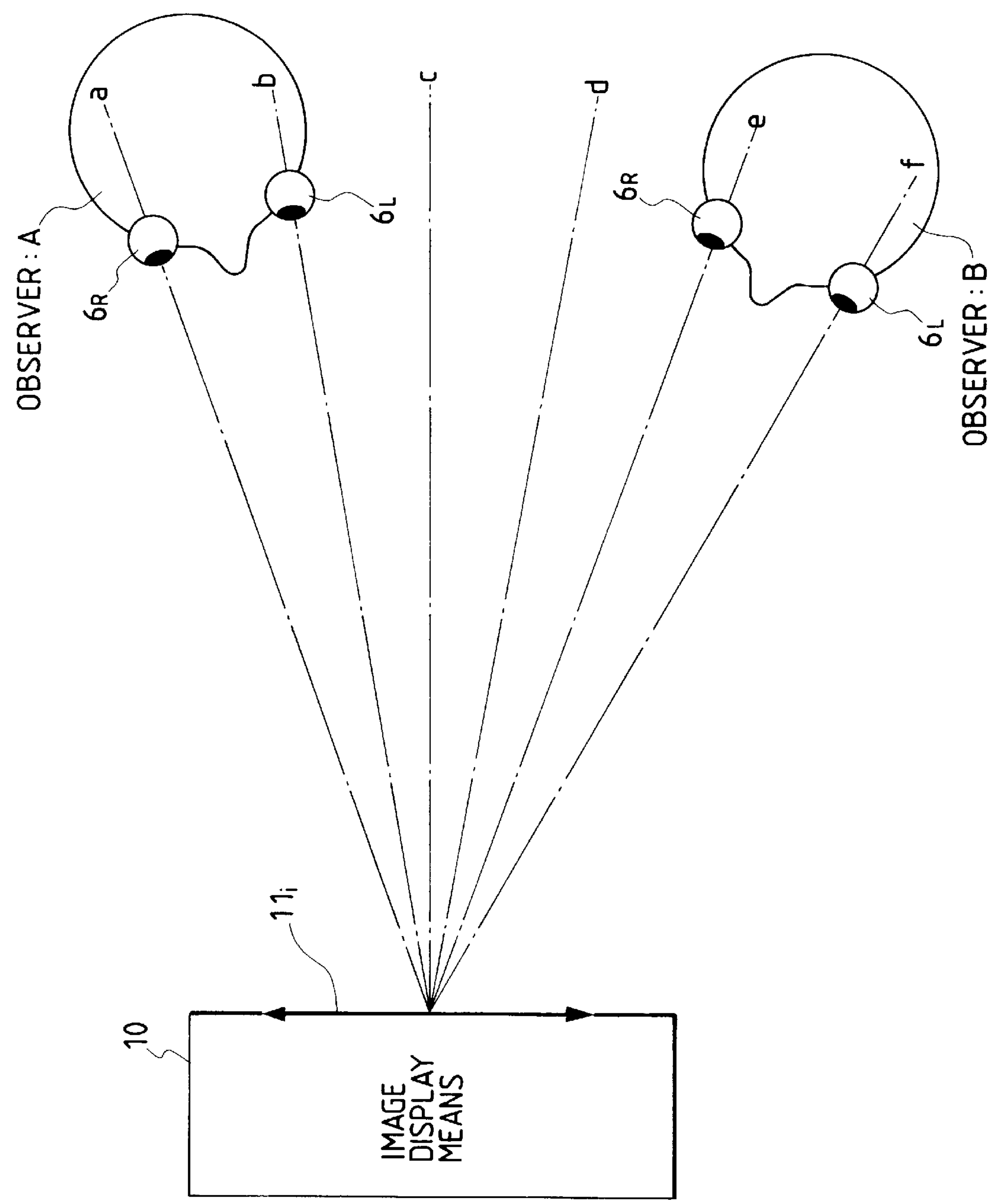
FIG. 26 is an explanatory view of an observation method of images obtained by a multi-lens camera system.

FIG. 26 is an explanatory view of the method for observing display images displayed on the basis of the six input images with a parallax so as to have a correct parallax in a stereoscopic image display apparatus utilizing a binocular parallax. Image display means 10 allows observers to independently observe the six display images with a parallax from the same direction as that in the image pick-up operation. For example, the image display means 10 adopts the lenticular method, large convex lens/large concave mirror method, parallax barrier method, or the like. Display images $\mathbf{11}_i$ are displayed on the image display means 10.

Assume that, as shown in FIG. 26, the position of an observer A is determined so that his or her eyes are located on direction axes a and b, and the position of an observer B is determined so that his or her eyes are located on direction axes e and f. In this case, when the input images Xa and Xb are displayed as display images for the right and left eyes of the observer A, and input images Xe and Xf are displayed as display images for the right and left eyes of the observer B, the observers can respectively observe stereoscopic images.

At this time, the images are optically rotated in the optical paths of the optical systems 13 of the cameras Ya and Yb, and Ye and Yf, so that the right and left images recorded on the image recording means 9 are tilted in a V-shaped pattern within the range from an angle larger than 0° to an angle equal to or smaller than 3°, and preferably, within the range from 1° to 3°, thereby achieving the object of the present invention. An embodiment for realizing this operation will be described below.

Figure 27:
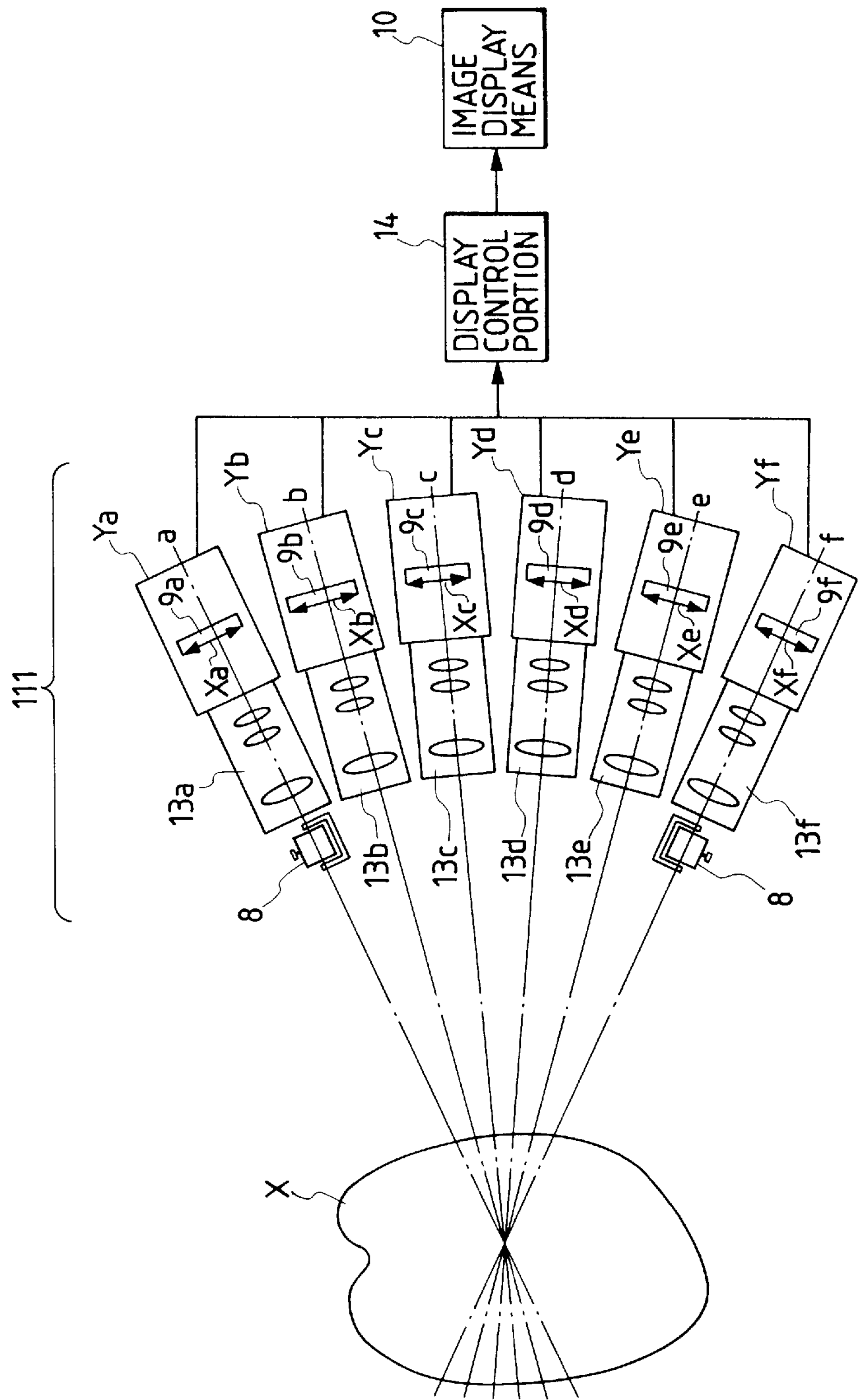
FIG. 27 is a schematic view showing principal part of the seventh embodiment of the present invention.

FIG. 27 is a schematic view showing principal part of the seventh embodiment of the present invention. In this embodiment, the present invention is applied to an image recording apparatus having multi-lens camera input means 111. The method of obtaining input images which have a parallax and are tilted relative to each other in this embodiment is the same as the input method using the double-lens camera system shown in FIG. 24. Referring to FIG. 27, the apparatus includes cameras Ya to Yf for taking an image of an object X, image recording means 9*a* to 9*f*, optical systems 13*a* to 13*f*, and image rotators 8.

As shown in FIG. 27, the image rotators 8 are inserted in the optical paths of either ones (the optical systems 13*a* and 13*f* in FIG. 27) of the optical systems of the cameras Ya and Yb, and Ye and Yf, and each image rotator 8 is rotated about its optical axis as in the fourth embodiment, thereby rotating the input image Xa or Xf obtained on the image recording means 9*a* or 9*f* through an arbitrary angle within the range from an angle larger than 0° to an angle equal to or smaller than 3°, and preferably, within the range from 1° to 3°. As a result, the two images Xa and Xb or Xe and Xf, which are tilted in a V-shaped pattern relative to each other, can be obtained. (A description of the operation of the cameras Yc and Yd will be omitted.) Alternatively, as in the case of the double-lens camera system, the same effect as described above can be obtained by rotating the image recording means 9*a* to 9*f*.

Figure 28:
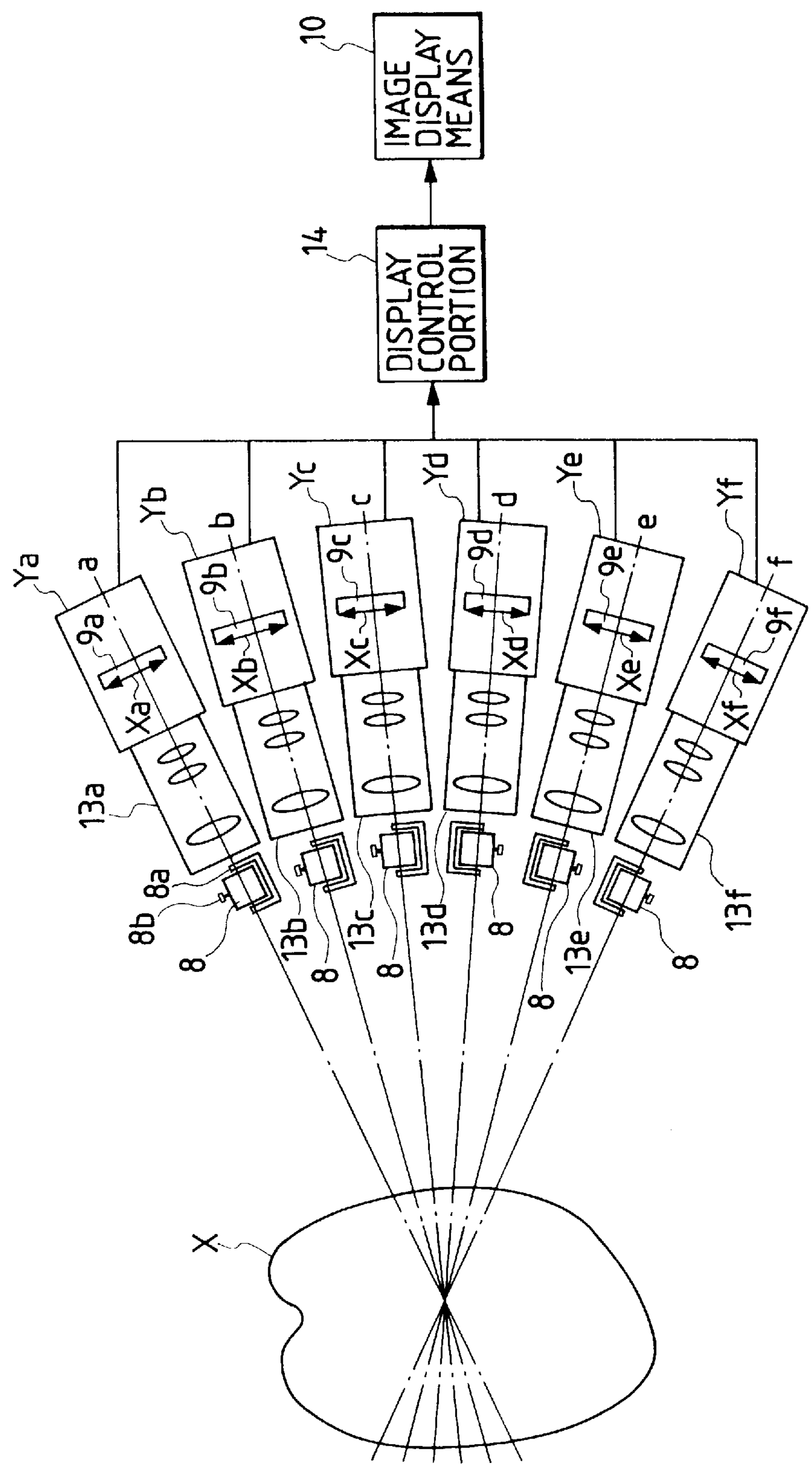
FIG. 28 is a schematic view showing principal part of another arrangement of the seventh embodiment of the present invention.

Furthermore, as shown in FIG. 28, the image rotators may be inserted in the optical paths of the optical systems of all the cameras so as to rotate the input images in correspondence with the display condition.

When the positional relationship between the two eyes of the observer and the image display means is unknown, the seventh embodiment cannot be used. In this case, the following embodiment is used.

Figure 29:
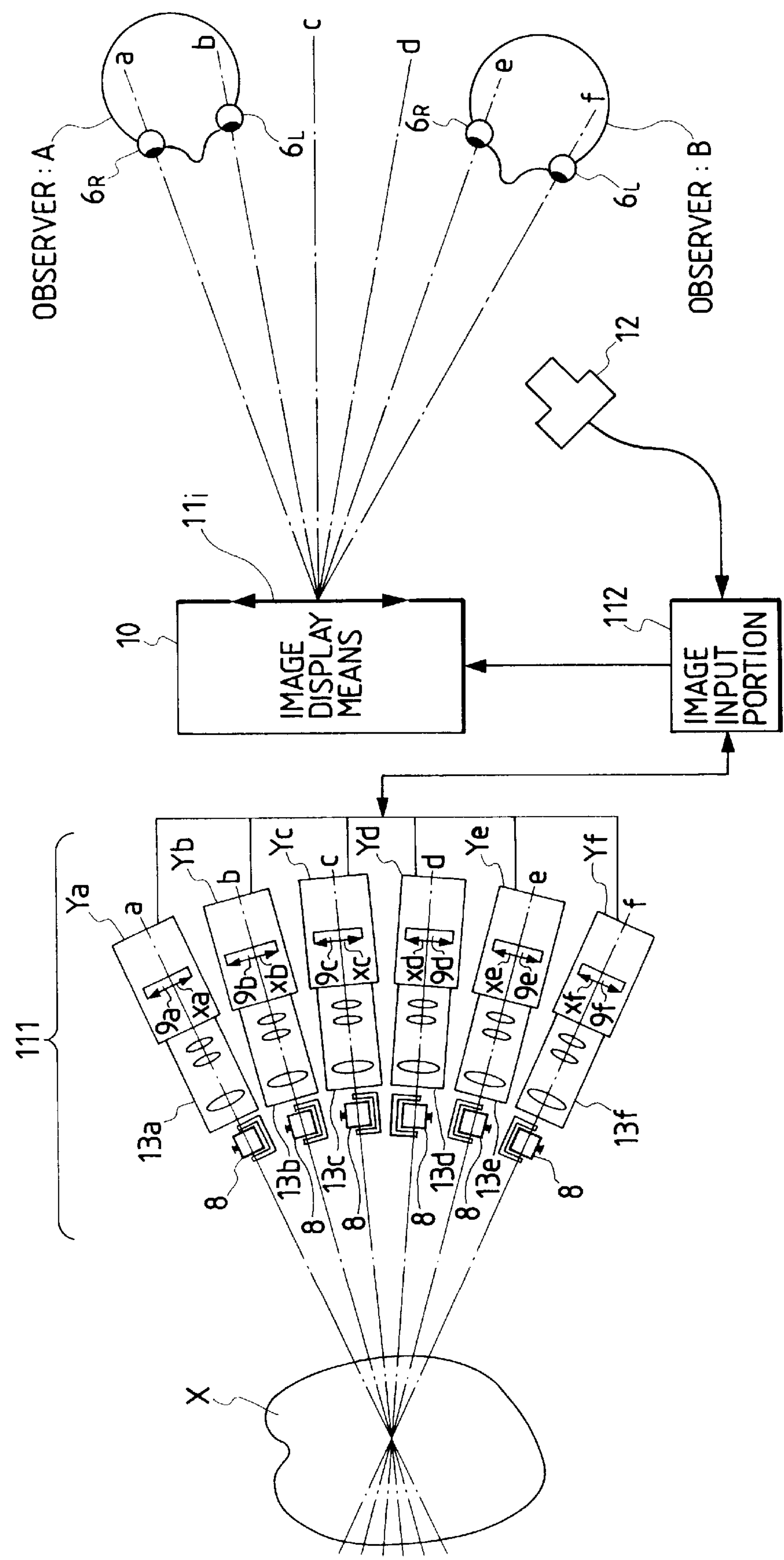
FIG. 29 is a schematic view showing principal part of the eighth embodiment of the present invention.

FIG. 29 is a schematic view showing principal part of the eighth embodiment of the present invention. In this embodiment, the present invention is applied to a case wherein the positions of the two eyes of an observer with respect to image display means 10 are unknown in an image recording apparatus using multi-lens camera input means and an image display apparatus using the image recording apparatus. In FIG. 29, multi-lens camera input means 111 is the same as that in the seventh embodiment. An image input portion 112 inputs a plurality of display images $\mathbf{11}_i$ to the image display means 10. A detector 12 detects the positions of the two eyes of the observer. In this embodiment, the detector 12 outputs position information of the two eyes of the observer relative to the image display means 10 to the image input portion 112 in real time, and the image input portion 112 selects a pair of input images corresponding to the two eyes of the observer on the basis of the input information. Thereafter, the input images are rotated relative to each other by the same operation as in the seventh embodiment, so that the central lines, in the vertical direction, of the two input images form a V-shaped pattern. Then, the rotated images are displayed on the image display means 10. In this case, image rotators are preferably rotated in accordance with an electrical signal.

In the seventh and eighth embodiments, the display images may be rotated using the coordinate conversion processing of images without using any image rotators.

Input Means Using Synthesis•Processing of Image Input means for generating input images with a parallax by synthesis•processing of images allows generation of input images from many virtual view points using a smaller number of cameras. The input method of input images with a parallax by the synthesis•processing of images is basically the same image input technique as the above-mentioned input method of input images using the multi-lens camera system. In this method, since all the pieces of image information are converted into electrical signals, and images from virtual view points are synthesized•processed by arithmetic operations on a computer, rotation of right and left input images is attained by the method using coordinate conversion of images.

Figure 30:
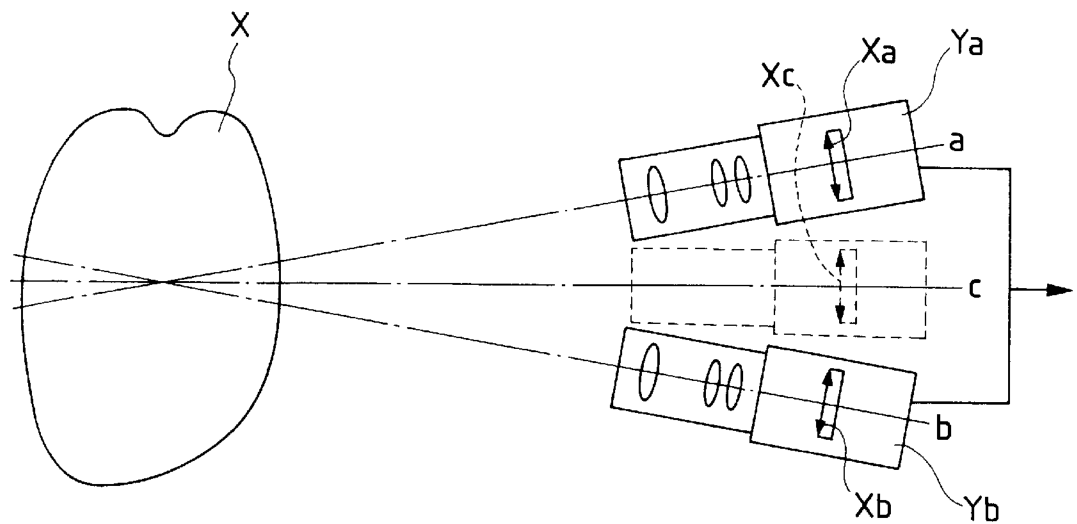
FIG. 30 is an explanatory view of generation of input images from virtual view points.

FIG. 30 is an explanatory view of generation of an input image from a virtual view point. Input images are generated in the following procedure. Input images Xa and Xb with a parallax are input to a computer using a double-lens camera system (cameras Ya and Yb). Then, an input image Xc from a virtual view point c is generated by synthesis•processing of images attained by arithmetic operations of the computer using image information of these two input images Xa and Xb.

Figure 31:
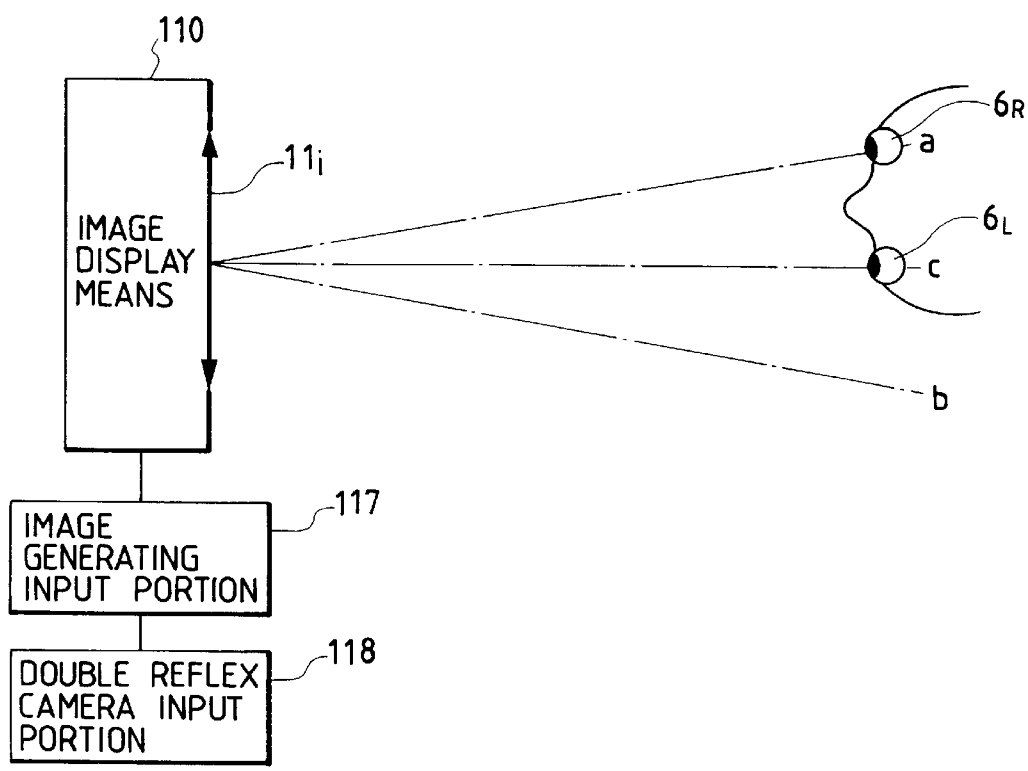
FIG. 31 is a schematic view showing principal part of the ninth embodiment of the present invention.

FIG. 31 is a schematic view showing principal part of the ninth embodiment of the present invention. In this embodiment, the present invention is applied to an apparatus which generates, using two parallax images Xa and Xb fetched by two cameras Ya and Yb, an input image from a virtual view point C between the two images, and inputs these images to display a stereoscopic image. In FIG. 31, image display means 111 displays a plurality of display images $\mathbf{11}_i$ with a parallax for an observer. An image generating input portion 117 fetches input images Xa and Xb from double-lens camera input means 118, appropriately generates an input image Xc from a virtual view point c in correspondence with the observation position of the observer, and inputs the generated image to the image display means 110, thus displaying images.

The operation of this embodiment will be described below. In the layout shown in FIG. 31, it is detected in advance that the two eyes, $\mathbf{6}_R$ and $\mathbf{6}_L$, of the observer are present on direction axes a and c. In this case, the image generating input portion 117 generates the input image Xc from the virtual view point c on the direction axis c using the input images Xa and Xb with a parallax, and inputs the generated image to the image display means 110. The image display means 110 displays the input image Xa as a display image Xa' for the right eye of the observer, and displays a display image Xc' for the left eye based on the input image Xc. At this time, simultaneously with generation of the input image Xc for the left eye, the generated image is rotated counterclockwise by the coordinate conversion processing of a computer within the range from an angle larger than 0° to an angle equal to or smaller than 3°, and preferably, within the range from 1° to 3°, and the rotated image is displayed as the display image Xc', thereby achieving the object of the present invention, i.e., tilting the right and left display images Xa' and Xc' relative to each other in a V-shaped pattern.

When input images with a parallax are input by the synthesis•processing of images, if the positional relationship between the two eyes of the observer and the image display means is known, two input images corresponding to the two eyes of the observer are rotated by the coordinate conversion of images, and are displayed as display images, thus practicing the present invention.

On the other hand, when the positional relationship between the two eyes of the observer and the image display means is unknown, a detector is arranged as in the eighth embodiment to detect the positions of the two eyes of the observer in real time, and at least one of two input images corresponding to the two eyes of the observer is sequentially rotated by the coordinate conversion of images of a computer in correspondence with the positional relationship relative to the image display means 110, thus practicing the present invention.

CG Input Means

As described above, the CG technique can generate input images with a parallax from arbitrary view points from one three-dimensional information. In this case as well, the present invention can be practiced when image generation is performed while executing the coordinate conversion for rotating at least one of input images, to be presented to the right and left eyes of the observer, of a plurality of input images.

For example, the CG technique can obtain images corresponding to input images Xa to Xf with a parallax obtained by taking an image of a certain object X from six directions a to f using the multi-lens camera system, as shown in FIG. 25.

When the positional relationship between the two eyes of the observer and the image display means is known, at least one of two input images corresponding to the two eyes of the observer is rotated by the coordinate conversion, and is displayed as a display image, thus practicing the present invention.

On the other hand, when the positional relationship between the two eyes of the observer and the image display means is unknown, a detector is arranged as in the eighth embodiment to detect the positions of the two eyes of the observer in real time, and at least one of two input images corresponding to the two eyes of the observer is sequentially rotated by the coordinate conversion of images of a computer in correspondence with the positional relationship relative to the image display means 110, thus practicing the present invention.

As described above, when the input images with a parallax are input by the CG method, one or both of the display images for the right and left eyes can also be tilted relative to each other in a V-shaped pattern within the range from an angle larger than 0° to an angle equal to or smaller than 3°, and preferably, within the range from 1° to 3°. However, since subjective evaluation values for the rotational amount of an observation image include personal differences, the relative tilt angle between display images is preferably set to be about 2° from the graphs shown in FIGS. 11A to 12B so as to prevent a decrease in evaluation value of "observability" of a stereoscopic image to be observed.

In the above description, the embodiments in which the present invention is applied to the output and input portions of a stereoscopic viewing apparatus have been exemplified. Upon application of the present invention to the respective stereoscopic image display methods, where and how the present invention is practiced will be explained hereinafter.

An embodiment in which the present invention is applied to a stereoscopic image display apparatus of the anaglyph method will be described below.

Figure 32:
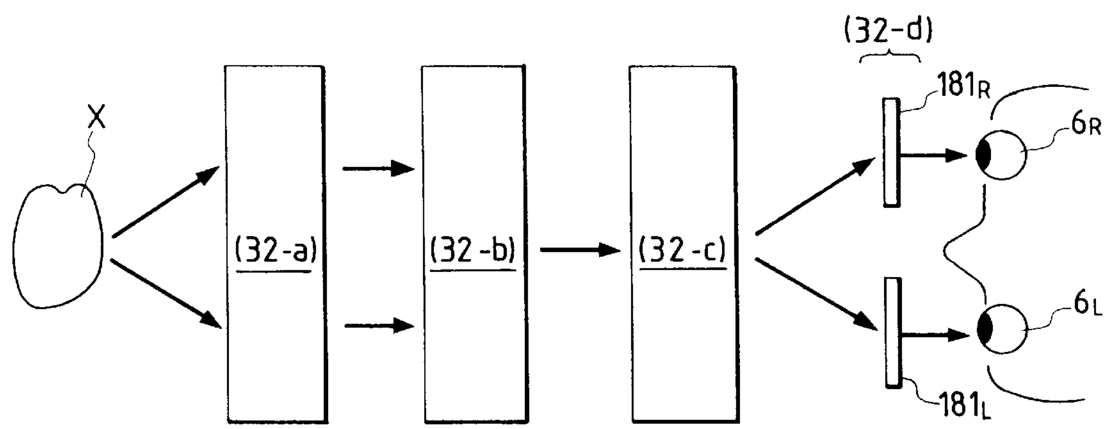
FIG. 32 is an explanatory view of the general procedure of stereoscopic image display by the anaglyph method.

FIG. 32 is an explanatory view of the general procedure of stereoscopic display of the anaglyph method. FIG. 32 illustrates an object X, color filters $\mathbf{181}_R$ and $\mathbf{181}_L$ for the right and left eyes, and eyes $\mathbf{6}_R$ and $\mathbf{6}_L$ of an observer. The procedure will be described below.

(32-a) Two input images with a parallax are obtained by the double-lens camera method, image synthesis•processing method, CG method, or the like.

(32-b) Two input images are synthesized to one image.

(32-c) The synthesized image is displayed in two colors.

(32-d) Observation images are observed via the color filters 181$_R$ and 181$_L$ for the right and left eyes.

In order to rotate one of the observation images for the right and left eyes to obtain a V-shaped layout of the central lines, in the vertical direction, of the two images, at least one of the following methods can be used.

(1) The method using the image rotator or the method using electronic coordinate conversion of an image is used in step (32-a).

(2) The method using electronic coordinate conversion of an image is used in step (32-b).

(3) The method using an optical system in which an image rotator is arranged before or after the color filter is used in step (32-d).

Figure 33:
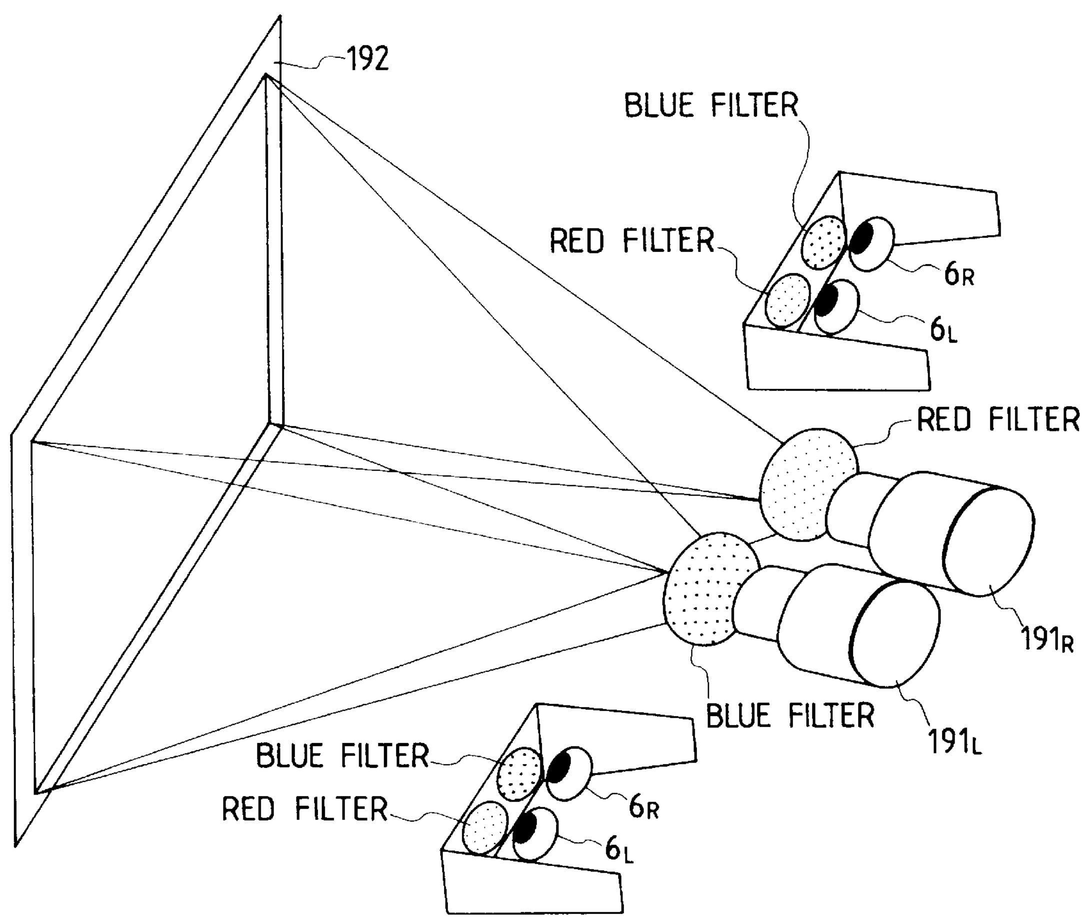
FIG. 33 is a perspective view showing a two-image projection type image display apparatus for an anaglyph stereoscopic image.
Figure 34:
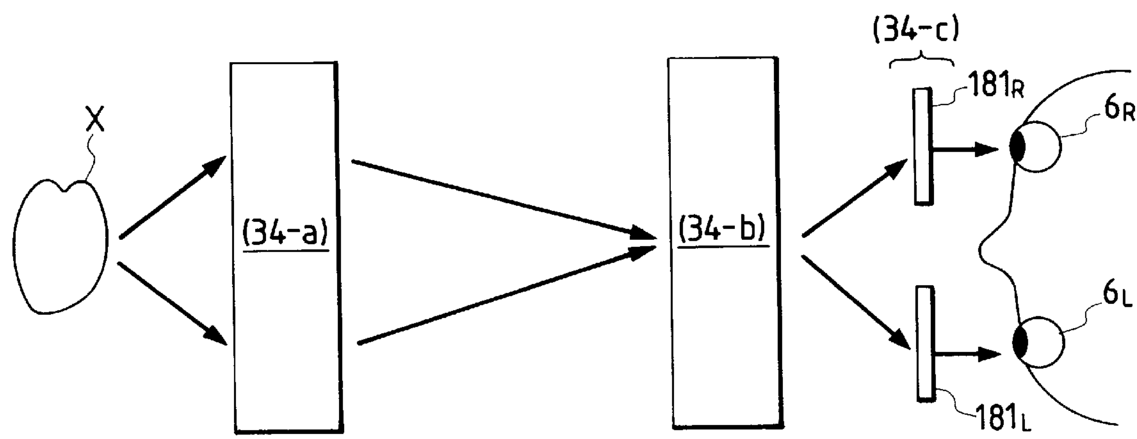
FIG. 34 is an explanatory view of the general procedure of stereoscopic image display by the anaglyph method shown in FIG. 31.

On the other hand, when two input images with a parallax are projected onto a single screen 192 using two projectors 191$_R$ and 191$_L$ with color filters, as shown in FIG. 33, since the input images need not be synthesized to one image, the procedure shown in FIG. 34 can be used. This procedure will be described below.

(34-a) Two input images with a parallax are obtained by the double-lens camera method, image synthesis•processing method, CG method, or the like.

(34-b) Two images are projected via the color filters using the two projectors 191$_R$ and 191$_L$ on the basis of the two input images, and are superimpose-displayed as display images on the screen 192.

(34-c) Observation images are observed via the color filters 181$_R$ and 181$_L$ for the right and left eyes.

In this case, in addition to the above-mentioned methods, the projection optical system of one of two projectors may be tilted upon projection of images, so as to tilt the two display images relative to each other in a V-shaped pattern.

An embodiment in which the present invention is applied to a stereoscopic image display apparatus of the polarizing glass method will be described below.

Figure 35:
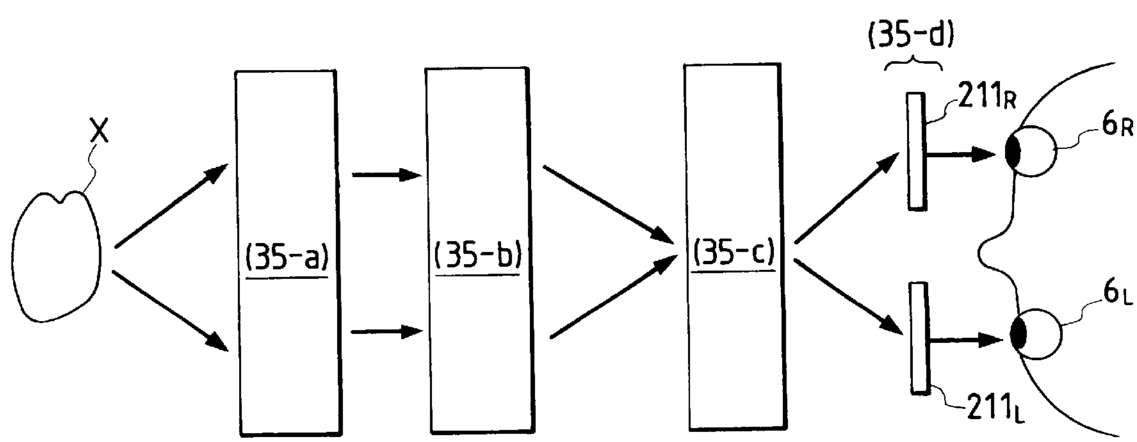
FIG. 35 is an explanatory view of the general procedure of stereoscopic image display by the polarizing glass method.

FIG. 35 is an explanatory view of the general procedure of stereoscopic image display by the polarizing glass method. FIG. 35 illustrates polarizing glasses 211. The procedure will be described below.

(35-a) Two input images with a parallax are obtained by the double-lens camera method, image synthesis•processing method, CG method, or the like.

(35-b) The two input images are displayed as display images on two image display means.

(35-c) Polarizing plates are arranged on the respective image display means, and the two display images are superimpose-displayed using a half mirror.

(35-d) Observation images are observed via the polarizing glasses.

In order to rotate one of the observation images for the right and left eyes to obtain a V-shaped layout of the two images, at least one of the following methods can be used.

(1) The method using an image rotator or the method using electronic coordinate conversion of an image is used in step (35-a).

(2) The method using electronic coordinate conversion of an image is used in step (35-b).

(3) The method using an image rotator is used in right and left display optical systems in step (35-c). (This method cannot in some cases be realized in terms of size.)

(4) The method using an optical system in which an image rotator is arranged before or after the polarizing glasses is used in step (35-d).

Figure 36:
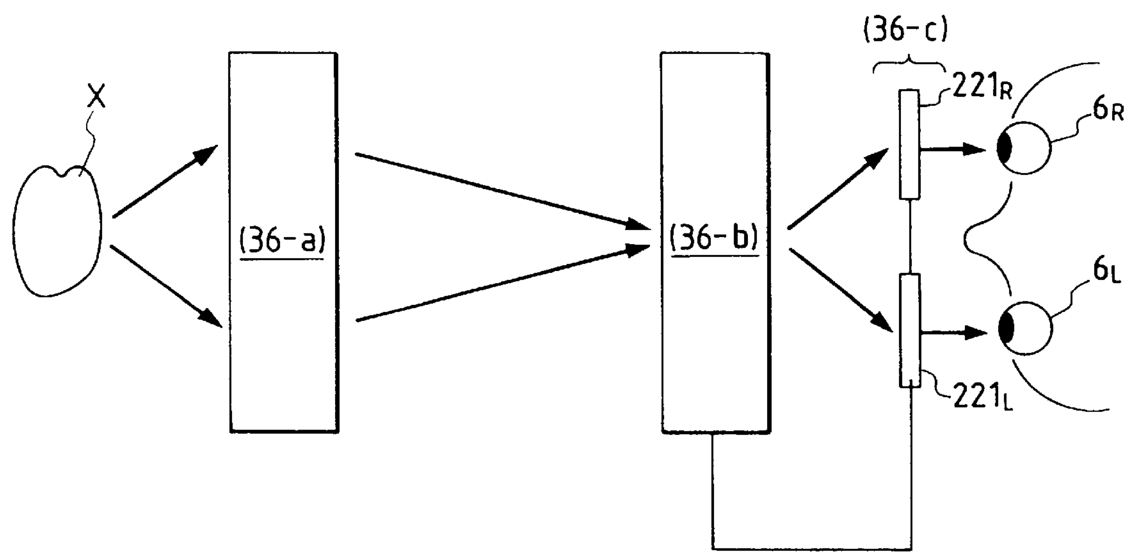
FIG. 36 is an explanatory view of the general procedure of stereoscopic image display by the time sharing shutter method.

An embodiment in which the present invention is applied to a stereoscopic image display apparatus of the time sharing shutter method will be described below. FIG. 36 is an explanatory view of the general procedure of stereoscopic image display by the time sharing shutter method. FIG. 36 illustrates time sharing shutter glasses 221. The procedure will be described below.

(36-a) Two input images with a parallax are obtained by the double-lens camera method, image synthesis processing method, CG method, or the like.

(36-b) The two input images are displayed as display images on image display means in a time sharing manner.

(36-c) Observation images are observed via the time sharing shutter glasses.

In order to rotate one of the observation images for the right and left eyes to obtain a V-shaped layout of the two images, at least one of the following methods can be used.

(1) The method using an image rotator or the method using electronic coordinate conversion of an image is used in step (36-a).

(2) The method using electronic coordinate conversion of an image is used in step (36-b).

(3) The method using an optical system in which an image rotator is arranged before or after the time sharing shutter glasses 221 is used in step (36-c).

Figure 37:
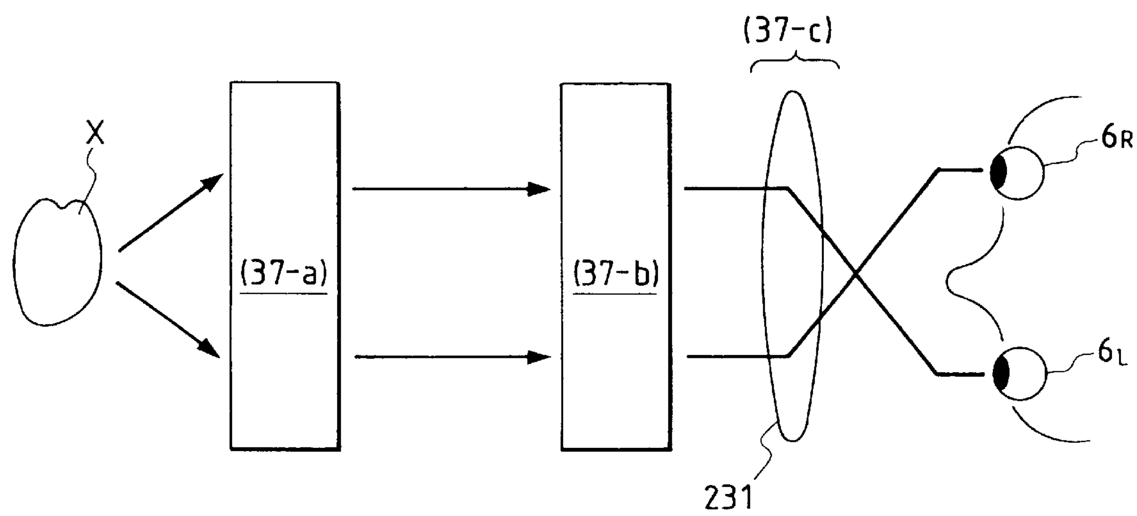
FIG. 37 is an explanatory view of the general procedure of stereoscopic image display by the large convex lens/large concave mirror method.

An embodiment in which the present invention is applied to a stereoscopic image display apparatus of the large convex lens/large concave mirror method will be described below. FIG. 37 is an explanatory view of the general procedure of stereoscopic image display by the large convex lens/large concave mirror method. FIG. 37 illustrates a large convex lens or large concave mirror 231. The procedure will be described below.

(37-a) n input images with a parallax are input by the multi-lens camera method, image synthesis-processing method, CG method, or the like.

(37-b) The n input images are simultaneously projected as display images at positions near the large convex lens or large concave mirror using n projectors.

(37-c) Two out of the plurality of display images projected at the positions near the large convex lens or large concave mirror are observed as observation images.

In this case, in order to rotate one of the observation images for the right and left eyes, two input images must be specified. If the positions of the two eyes of the observer are determined with respect to the large convex lens or large concave mirror, two inputs images which can present a stereoscopic image with respect to the positions of the two eyes are selected, and the V-shaped layout of two input images is obtained by at least one of the following methods.

If the positions of the two eyes of the observer with respect to the large convex lens or large concave mirror are unknown, the positions of the two eyes of the observer are detected using a detector like in the eighth embodiment, two input images corresponding to the detected positions are selected, and the V-shaped layout of two display images corresponding to a stereoscopic image is obtained by at least one of the following methods.

(1) The method using an image rotator or the method using electronic coordinate conversion of an image is used in step (37-a).

(2) The display images are rotated using optical systems in step (37-b). Alternatively, the method using coordinate conversion of images is used in a process of displaying images on the projectors.

When the method using an optical system in which an image rotator is arranged in front of one eye of the observer is used in step (37-c), the V-shaped layout of two observation images corresponding to a stereoscopic image can be obtained independently of the positions of the two eyes of the observer.

Figure 38:
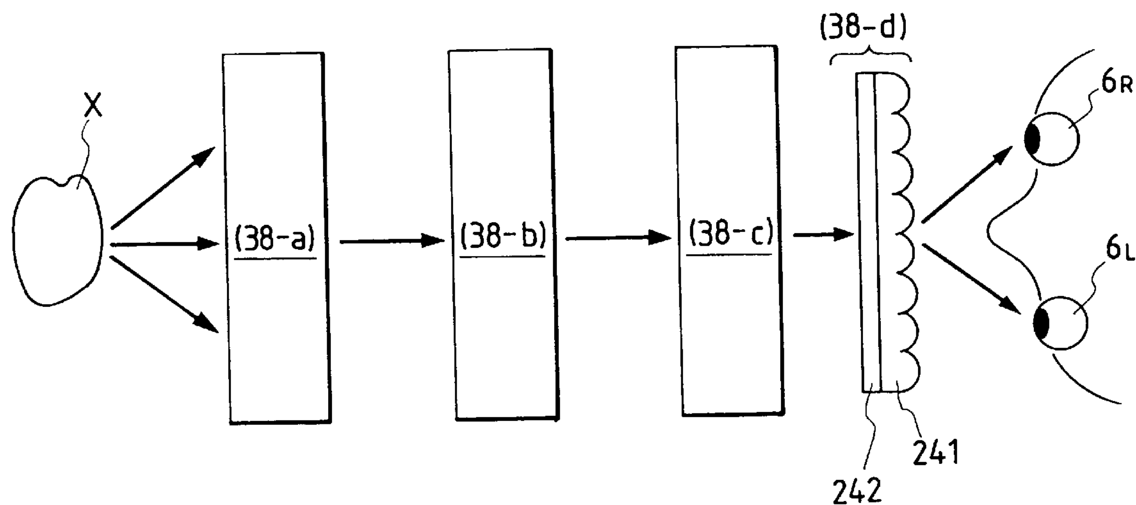
FIG. 38 is an explanatory view of the general procedure of stereoscopic image display by the lenticular method.

An embodiment in which the present invention is applied to a stereoscopic image display apparatus of the lenticular method will be described below. FIG. 38 is an explanatory view of the general procedure of stereoscopic image display by the lenticular method. FIG. 38 illustrates a lenticular lens 241. A display device 242 comprises a liquid crystal panel or CRT. The procedure will be described below.

(38-a) n input images with a parallax are input by the multi-lens camera method, image synthesis•processing method, CG method, or the like.

(38-b) The width of each input image is compressed to 1/n, the compressed image is horizontally divided into n portions, and divided pixels are picked up and arranged one by one from the n input images to be synthesized into one image.

(38-c) The synthesized image is displayed on the display surface of the display device.

(38-d) The displayed image is observed via the lenticular lens.

In order to tilt observation images observed by the two eyes of the observer relative to each other in this method, position information of the two eyes of the observer is required.

If the positions of the two eyes of the observer are determined with respect to the display device, two input images which can present a stereoscopic image with respect to the positions of the two eyes are selected, and the two input images are tilted in a V-shaped pattern by at least one of the following methods.

If the positions of the two eyes of the observer with respect to the display device are unknown, the positions of the two eyes of the observer are detected using a detector as in the eighth embodiment, two input images corresponding to the detected positions are selected, and the two input images are tilted in a V-shaped pattern by at least one of the following methods.

(1) The method using electronic coordinate conversion of images is performed in step (38-a).

(2) The method using electronic coordinate conversion of images is performed in step (38-b).

Alternatively, observation images may be rotated using the optical method by arranging an image rotator in front of one eye of the observer in step (38-d) without processing the input images. With this method, the position information of the two eyes of the observer is not required.

With the above-mentioned procedure, even in the stereoscopic image display by the lenticular method, the two observation images to be observed can always be tilted relative to each other in correspondence with the position of the observer within the range from an angle larger than 0° to an angle equal to or smaller than 3°, and preferably, within the range from 10° to 3°, thus obtaining good "observability".

Figure 39:
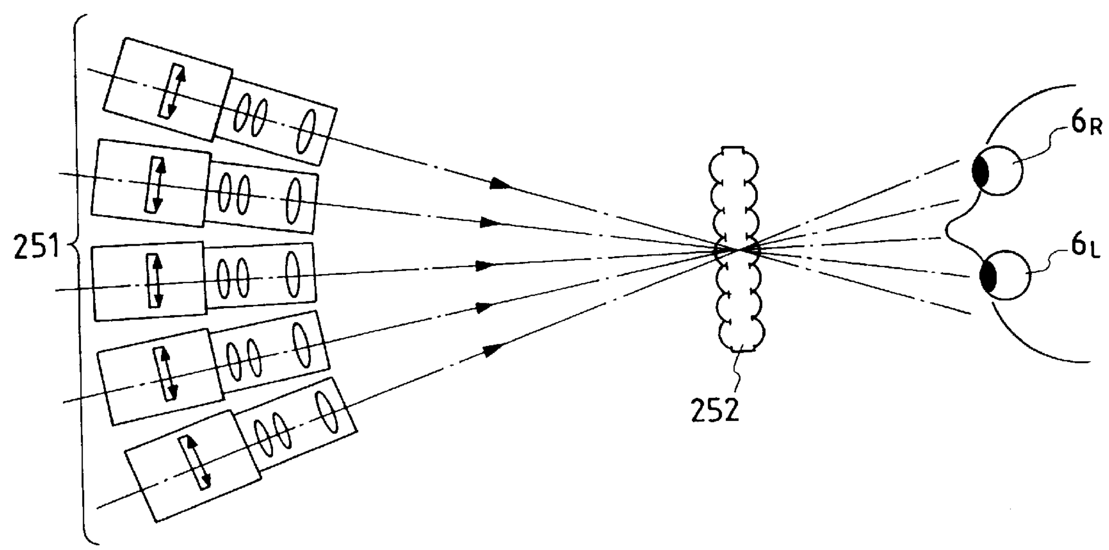
FIG. 39 is an explanatory view of stereoscopic image display of the lenticular method by means of image projection.
Figure 40:
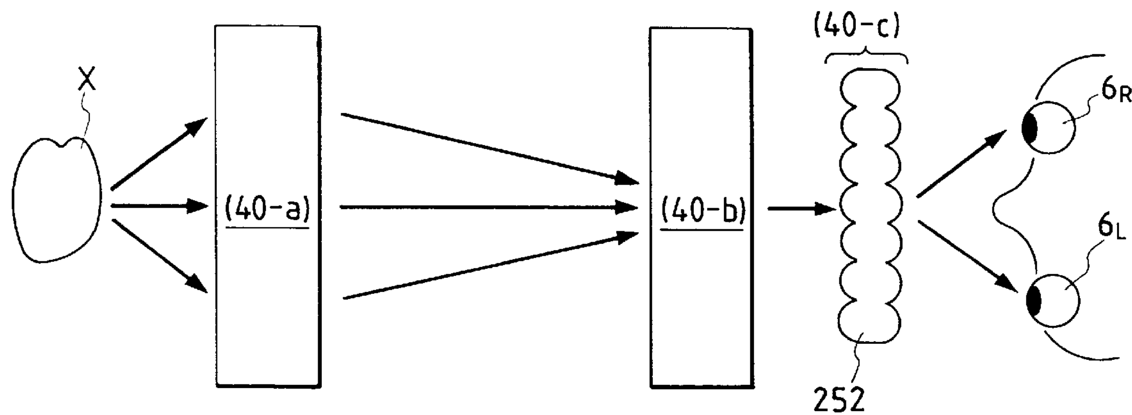
FIG. 40 is an explanatory view of the general procedure of stereoscopic image display of the lenticular method based on image projection.

FIG. 39 is an explanatory view of stereoscopic image display by the lenticular method by means of image projection. In this method, n parallax images are projected onto a transmission type double lenticular screen 252 using n projectors 251, and an observer observes images via the double lenticular screen 252. FIG. 40 shows the procedure in this case. The procedure will be described below.

(40-a) n input images with a parallax are input by the multi-lens camera method, image synthesis-processing method, CG method, or the like.

(40-b) The n input images are projected onto the double lenticular screen 252 using the n projectors.

(40-c) The displayed images are observed via the double lenticular screen 252.

In order to tilt observation images observed by the two eyes of the observer relative to each other in this method, position information of the two eyes of the observer is required.

If the positions of the two eyes of the observer are determined with respect to the double lenticular screen 252, two input images which can present a stereoscopic image with respect to the positions of the two eyes are selected, and images on the projectors which project the two input images are tilted in a V-shaped pattern by at least one of the following methods.

If the positions of the two eyes of the observer with respect to the double lenticular screen 252 are unknown, the positions of the two eyes of the observer are detected using a detector like in the eighth embodiment, two input images corresponding to the detected positions are selected, and images on the projectors which project the two input images are tilted in a V-shaped pattern by at least one of the following methods.

(1) The method using electronic coordinate conversion of images is used in step (40-a).

(2) The method using an image rotator in a projector optical system or the method using electronic coordinate conversion of images is used in step (40-b).

Alternatively, observation images may be rotated using the optical method by arranging an image rotator in front of one eye of the observer in step (40-d)without processing the input images. With this method, the position information of the two eyes of the observer is not required.

With the above-mentioned procedure, even in the stereoscopic image display by the lenticular method by means of image projection, the two observation images to be observed can always be tilted relative to each other in correspondence with the position of the observer within the range from an angle larger than 0° to an angle equal to or smaller than 3°, and preferably, within the range from 1° to 3°, thus obtaining good "observability".

An embodiment in which the present invention is applied to a stereoscopic image display apparatus of the parallax barrier method will be described below.

Figure 41:
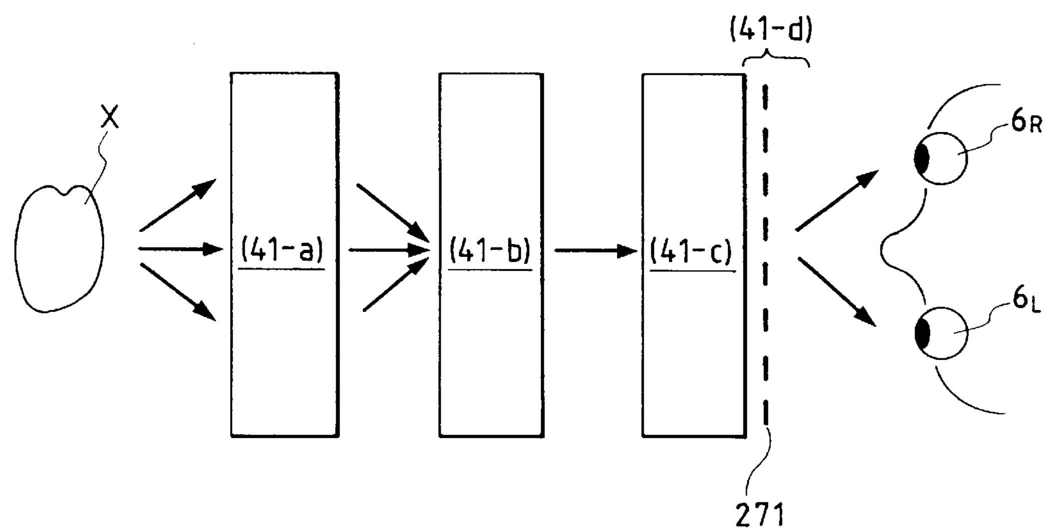
FIG. 41 is an explanatory view of the general procedure of stereoscopic image display by the parallax barrier method.

FIG. 41 is an explanatory view of stereoscopic image display by the parallax barrier method. FIG. 41 illustrates a parallax barrier 271. This method is substantially the same as the stereoscopic image display by the lenticular method. In this case as well, a liquid crystal panel or CRT must be used as a display device. The procedure will be described below.

(41-a) n input images with a parallax are input by the multi-lens camera method, image synthesis•processing method, CG method, or the like.

(41-b) The width of each input image is compressed to 1/n, the compressed image is horizontally divided into n portions, and divided pixels are picked up and arranged one by one from the n input images to be synthesized into one image.

(41-c) The synthesized image is displayed on the display surface of the display device.

(41-d) The displayed image is observed via the parallax barrier.

In order to tilt the observation images observed by the two eyes of the observer relative to each other in this method, position information of the two eyes of the observer is required.

If the positions of the two eyes of the observer are determined with respect to the display device, two input images which can present a stereoscopic image with respect to the positions of the two eyes are selected, and the two input images are tilted in a V-shaped pattern by at least one of the following methods.

If the positions of the two eyes of the observer with respect to the display device are unknown, the positions of the two eyes of the observer are detected using a detector as in the eighth embodiment, two input images corresponding to the detected positions are selected, and the two input images are tilted in a V-shaped pattern by at least one of the following methods.

(1) The method using electronic coordinate conversion of images is performed in step (41-a).

(2) The method using electronic coordinate conversion of images is performed in step (41-b).

Alternatively, observation images may be rotated using the optical method by arranging an image rotator in front of one eye of the observer in step (41-d) without processing the input images. With this method, the position information of the two eyes of the observer is not required.

With the above-mentioned procedure, even in the stereoscopic image display by the parallax barrier method, the two observation images to be observed can always be tilted relative to each other in correspondence with the position of the observer within the range from an angle larger than 0° to an angle equal to or smaller than 3°, and preferably, within the range from 1° to 3°, thus obtaining good "observability".

The conventional stereoscopic image display utilizing a binocular parallax has no established display condition between the observation images for the right and left eyes, but is premised on the simple assumption that images for the right and left eyes are displayed under an identical condition. No image display apparatus which sets the display condition for images for the right and left eyes in consideration of effects to be given to an observer is available.

Similarly, as for the image input apparatus for inputting images to the image display apparatus for displaying a stereoscopic image, no apparatus which sets the display condition for images for the right and left eyes in consideration of effects to be given to an observer is available.

However, as a result of examination of effects of different display conditions for images for the right and left images with respect to an observer in the stereoscopic image display utilizing a binocular parallax, the present inventors found that "the observability of a stereoscopic image could be improved when a magnification difference was set between images for the right and images".

Note that the magnification difference is defined as:

-continued $$\text{Magnification Difference} = \frac{\begin{array}{c}\text{Size of image for right eye}\\ \text{to be observed by observer}\end{array} - \begin{array}{c}\text{Size of image for left eye}\\ \text{to be observed by observer}\end{array}}{\begin{array}{c}\text{Size of image for left eye}\\ \text{to be observed by observer}\end{array}} * 100(\%)$$

Figure 42A:
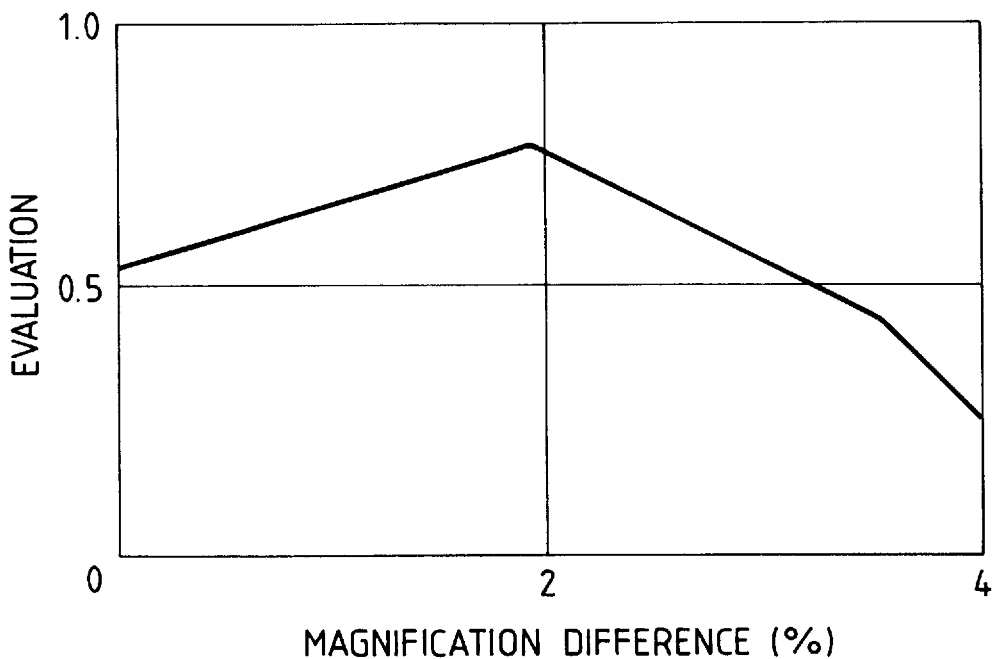
FIGS. 42A and 42B are graphs showing the relationship between the magnification difference and observability.
Figure 42B:
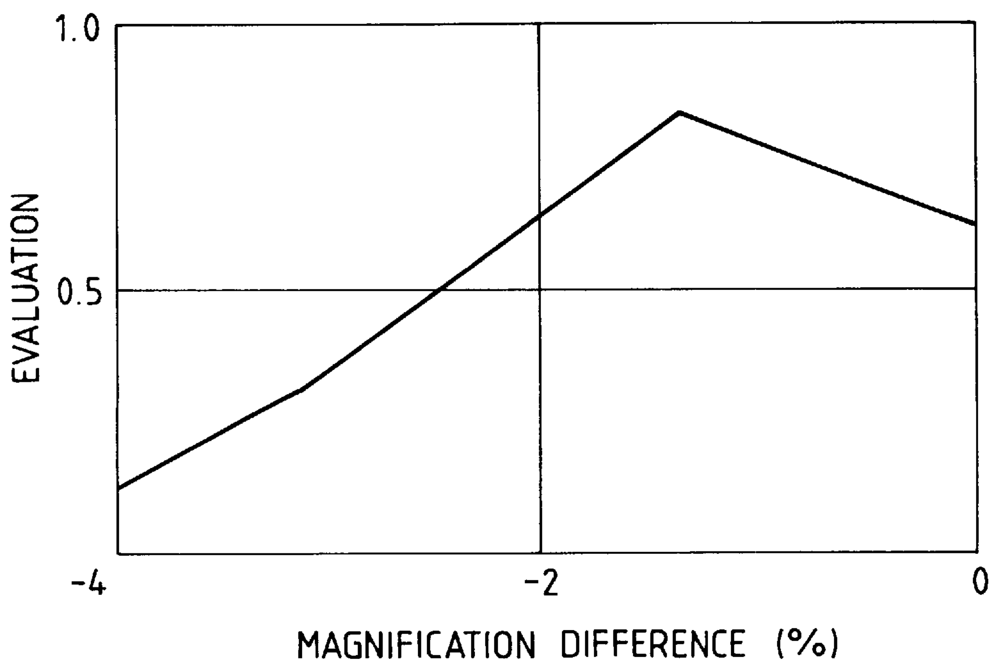

FIGS. 42A and 42B are graphs showing the examination results. In each graph, the magnification difference (%) is plotted along the abscissa, and the evaluation value obtained by distributed processing of the subjective evaluation values of "observability" of a stereoscopic image for a plurality of observers is plotted along the ordinate.

FIG. 42A shows a case wherein the magnification difference is positive, and FIG. 42B shows a case wherein the magnification difference is negative. As can be seen from FIGS. 42A and 42B, the evaluation value of "observability" of a stereoscopic image obtained upon generation of a magnification difference of about ±2% is higher than that obtained in a case wherein no magnification difference is generated between the right and left images (magnification difference=0%), and the evaluation value is high within the range of 0<|magnification difference|<3 (%).

As can be seen from the above description, a stereoscopic image can be made easy to observe when a magnification difference is given between the images for the right and left eyes to be observed by the observer.

Figure 43:
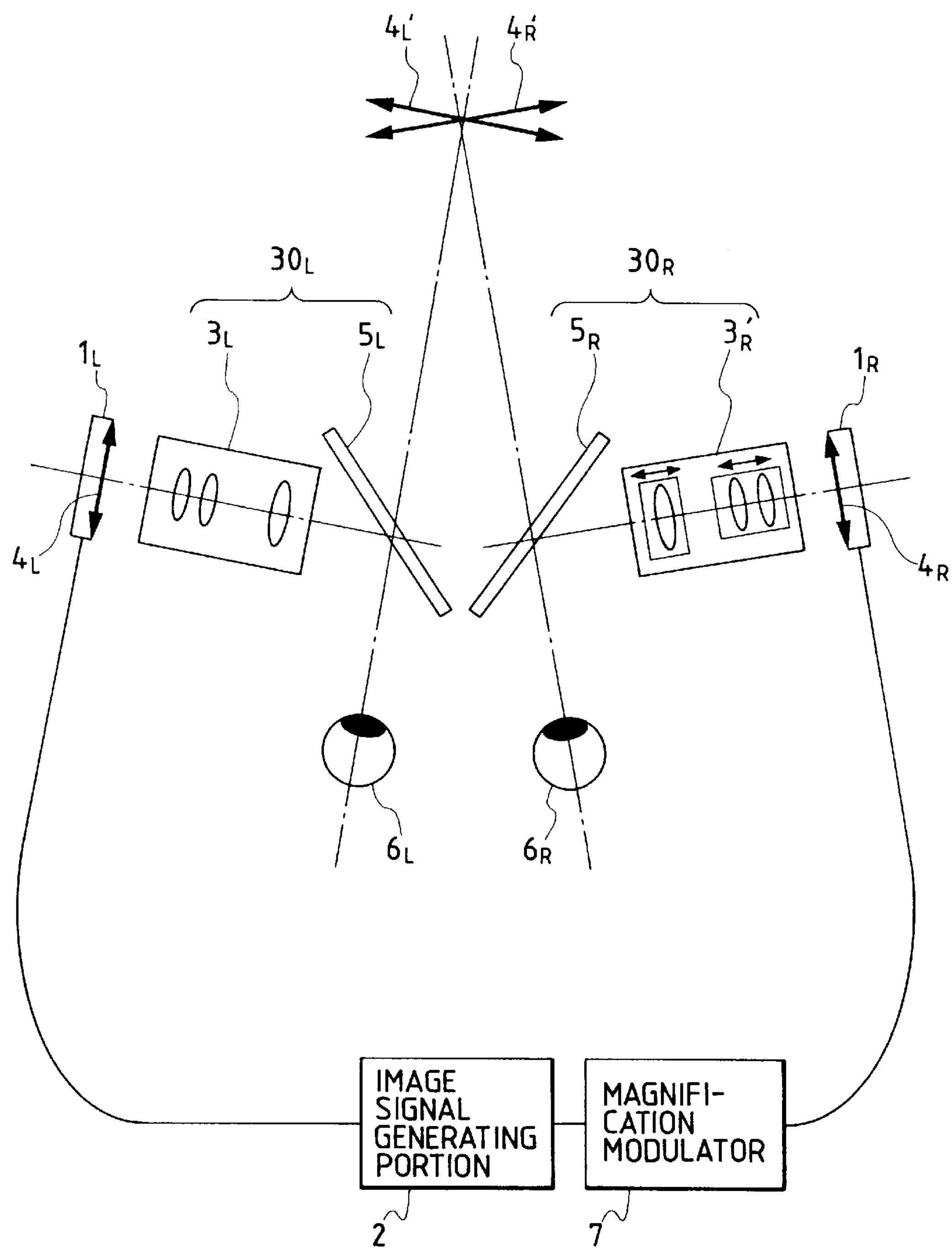
FIG. 43 is a schematic view showing principal part of the 10th embodiment of the present invention.

FIG. 43 is a schematic view showing principal part of the 10th embodiment of the present invention. In this embodiment, the present invention is applied to an image display apparatus for independently presenting a plurality of images with a parallax to the two eyes of an observer via optical systems and allowing the observer to recognize a stereoscopic image, i.e., to a so-called HMD (head-mounted display).

Referring to FIG. 43, image displays (image display means) $\mathbf{1}_R$ and $\mathbf{1}_L$ (subscripts R and L respectively indicate elements for the right and left eyes; the same applies to elements to be described below) comprise liquid crystal display elements (to be abbreviated as LCDs hereinafter) with backlights in this embodiment. As the image display, a CRT, a plasma display, or the like may be used.

An image signal generating portion 2 generates image signals of display images $\mathbf{4}_R$ and $\mathbf{4}_L$ to be respectively presented to the right and left eyes of an observer, and transmits the image signals of the display images $\mathbf{4}_R$ and $\mathbf{4}_L$ to the image displays $\mathbf{1}_R$ and $\mathbf{1}_L$ via a magnification modulator 7.

Lenses $\mathbf{3}_R'$ and $\mathbf{3}_L$ have a role of forming, in an enlarged scale, virtual images (observation images) $\mathbf{4}_R'$ and $\mathbf{4}_L'$ of the display images $\mathbf{4}_R$ and $\mathbf{4}_L$ displayed on the display portions of the image displays $\mathbf{1}_R$ and $\mathbf{1}_L$ at positions in front of the observer.

Mirrors $\mathbf{5}_R$ and $\mathbf{5}_L$ bend the optical axes of the lenses $\mathbf{3}_R'$ and $\mathbf{3}_L$. On the optical axes bent by the mirrors $\mathbf{5}_R$ and $\mathbf{5}_L$, eyes $\mathbf{6}_R$ and $\mathbf{6}_L$ of the observer who wears the apparatus of this embodiment are located, and the observer can observe the observation images $\mathbf{4}_R'$ and $\mathbf{4}_L'$ enlarged in the optical axis (forward) directions.

In this embodiment, since the mirrors $\mathbf{5}_R$ and $\mathbf{5}_L$ are used, the entire apparatus can be made compact, thus facilitating mounting of this apparatus on the head portion of the observer. When the mirrors 5 themselves have an optical power, a further size reduction and improvement of optical performance can be attained.

When half mirrors are used as the mirrors $\mathbf{5}_R$ and $\mathbf{5}_L$, a background image can be superposed on the observation images $\mathbf{4}_R'$ and $\mathbf{4}_L'$.

In the above-mentioned arrangement when images with a parallax are input from the image signal generating portion 2 to the image displays $1_R$ and $1_L$, the display images $4_R$ and $4_L$ displayed on the image displays $1_R$ and $1_L$ are presented as observation images $4_R'$ and $4_L'$ to the right and left eyes of the observer via optical systems $30_R$ and $30_L$, and the observer can stereoscopically observe the observation images.

In this embodiment, the optical systems $30_R$ and $30_L$ have substantially the symmetrical arrangement about the vertical direction, except that the lens $3_R'$ for the right eye can vary its focal length. Since the focal length can be varied, the size of the observation image $4_R'$ can be adjusted.

In this embodiment, the magnification modulator 7 modulates the size of the display image $4_R$ from the image signal generating portion 2 by coordinate conversion processing.

Figure 44:
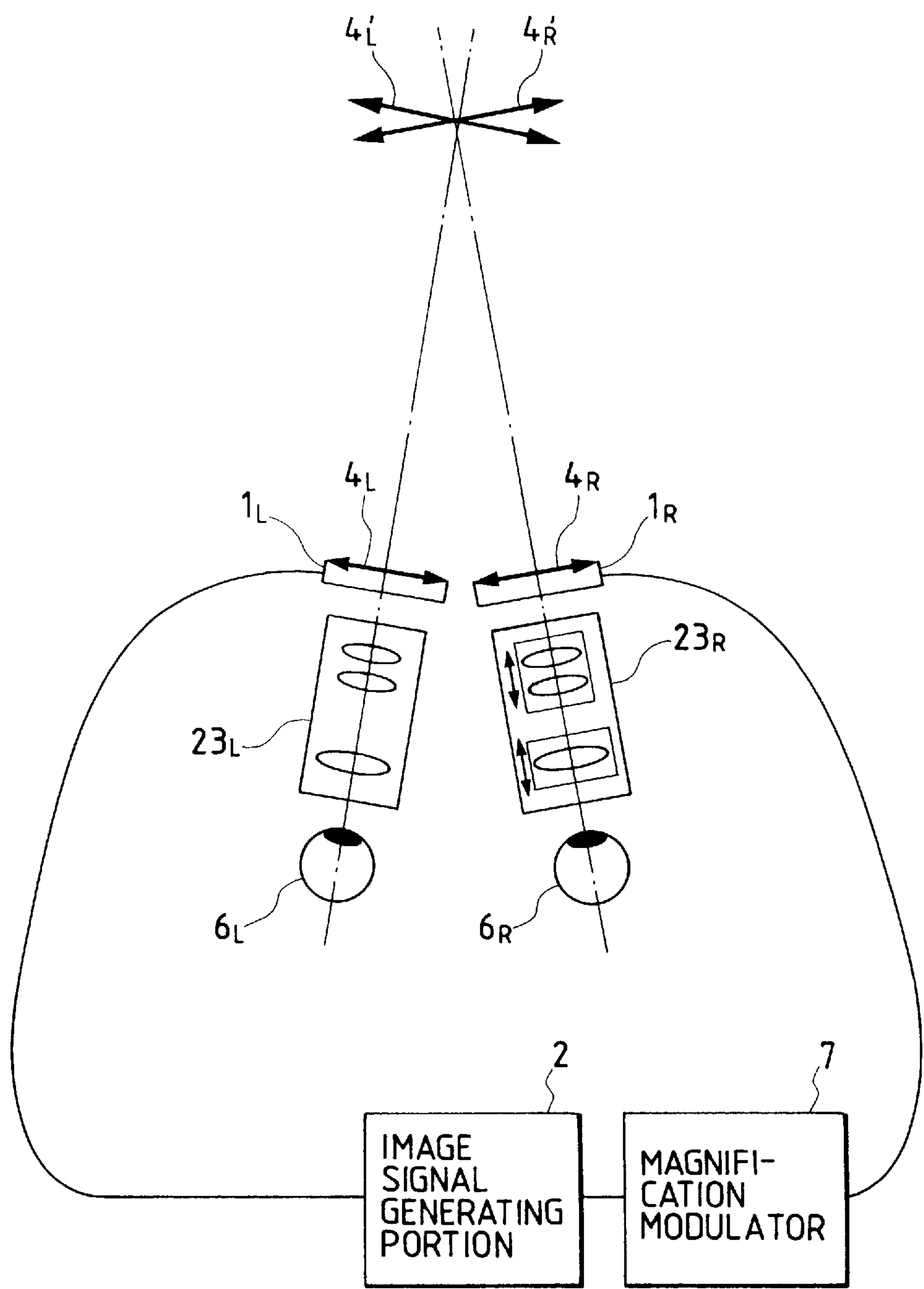
FIG. 44 is a schematic view showing principal part of a modification of FIG. 43.

FIG. 44 is a schematic view showing principal part of a modification of this embodiment. As compared to the arrangement shown in FIG. 43, the mirrors $5_R$ and $5_L$ are omitted.

In this modification, the eyes $6_R$ and $6_L$ of the observer are located on the optical axes of optical systems $23_R$ and $23_L$ and the observer can observe the observation images $4_R'$ and $4_L'$ enlarged in the optical axis directions.

As in the above-mentioned embodiment, the optical systems $23_R$ and $23_L$ and the positions of the eyes $6_R$ and $6_L$ of the observer are set at substantially the symmetrical positions about the vertical direction, and the right and left optical systems $23_R$ and $23_L$ form the observation images $4_R'$ and $4_L'$ at substantially the same position on the space.

For this reason, when the images $4_R$ and $4_L$ for the right and left eyes including a binocular parallax are respectively displayed on the right and left image display, an observer can easily enjoy stereoscopic observation.

In this modification, the right optical system $23_R$ can vary its focal length, thereby changing the size of the observation image $4_R'$. The magnification modulator 7 is inserted between the image signal generating portion 2 and the right image display $1_R$, and changes the size of the display image $4_R$ by coordinate conversion processing.

In the above-mentioned embodiment and modification, the "observability" is improved by changing the images of the right and left eyes to be observed by the observer, i.e., by assigning an appropriate magnification difference to the observation images $4_R'$ and $4_L'$.

Note that the magnification difference is defined by:

$$\text{Magnification Difference} = \frac{\begin{matrix}\text{Size of image for right eye} \\ \text{to be observed by observer}\end{matrix} - \begin{matrix}\text{Size of image for left eye} \\ \text{to be observed by observer}\end{matrix}}{\begin{matrix}\text{Size of image for left eye} \\ \text{to be observed by observer}\end{matrix}} * 100(\%)$$

As a method of assigning the magnification difference, the following two methods are used.

1) Image Coordinate Conversion Method

2) Asymmetrical Optical System Method

In image coordinate conversion method 1), upon displaying a pair of display images on the image displays 1, at least one display image is subjected to coordinate conversion processing of an image to generate a magnification difference between the display images $4_R$ and $4_L$ for the right and left eyes.

On the other hand, in asymmetrical optical system method 2), when the stereoscopic image display apparatus has a pair of optical systems for forming right and left images at predetermined positions, the optical systems are asymmetrically arranged (i.e., to have different magnification factors), thereby finally generating a magnification difference between the right and left images to be displayed.

These methods will be described in detail in embodiments to be described below.

In this embodiment, the "observability" is improved by assigning a magnification difference between the observation images $4_R'$ and $4_L'$, as described above.

Figure 45:
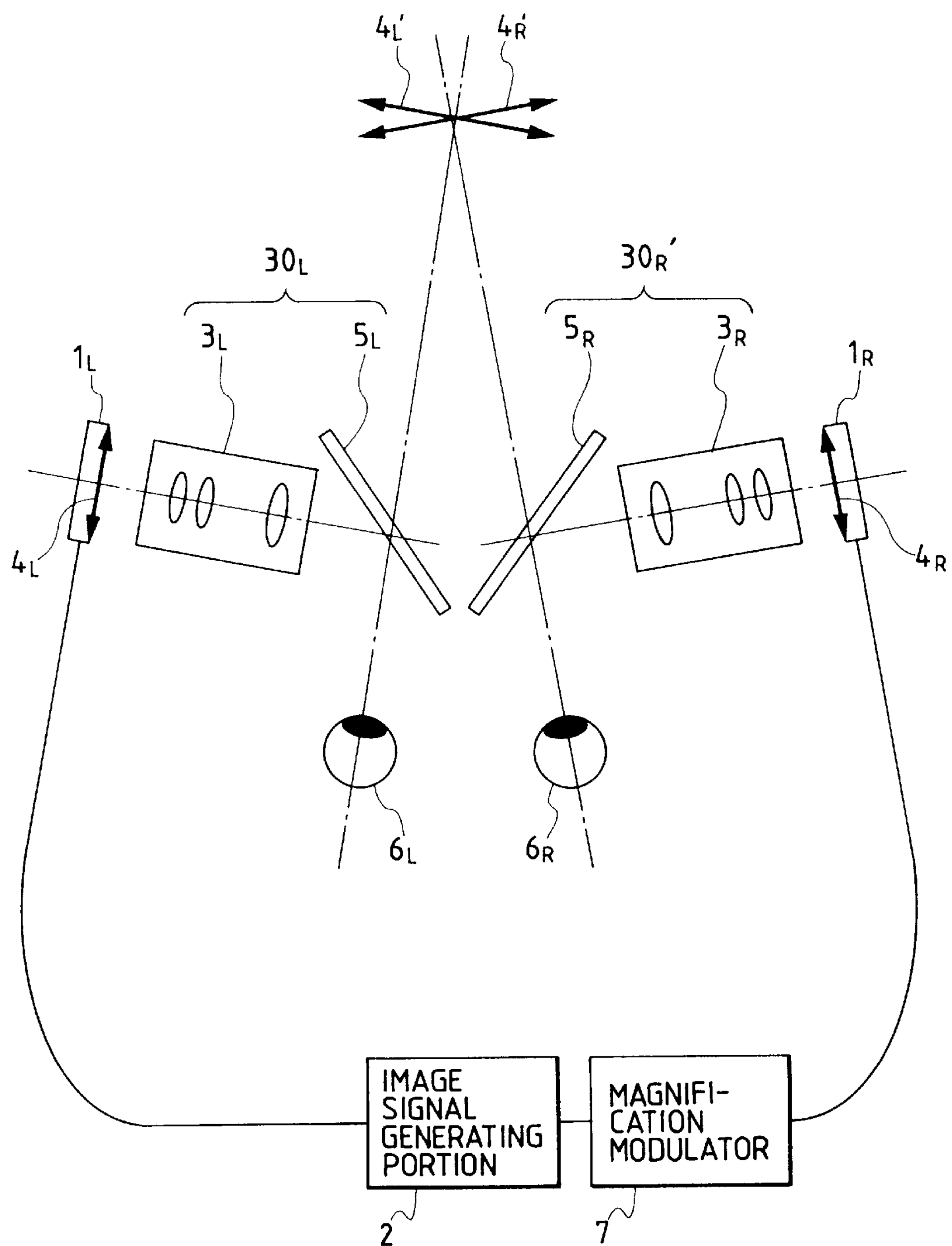
FIG. 45 is a schematic view showing principal part of the 11th embodiment of the present invention.
Figure 46:
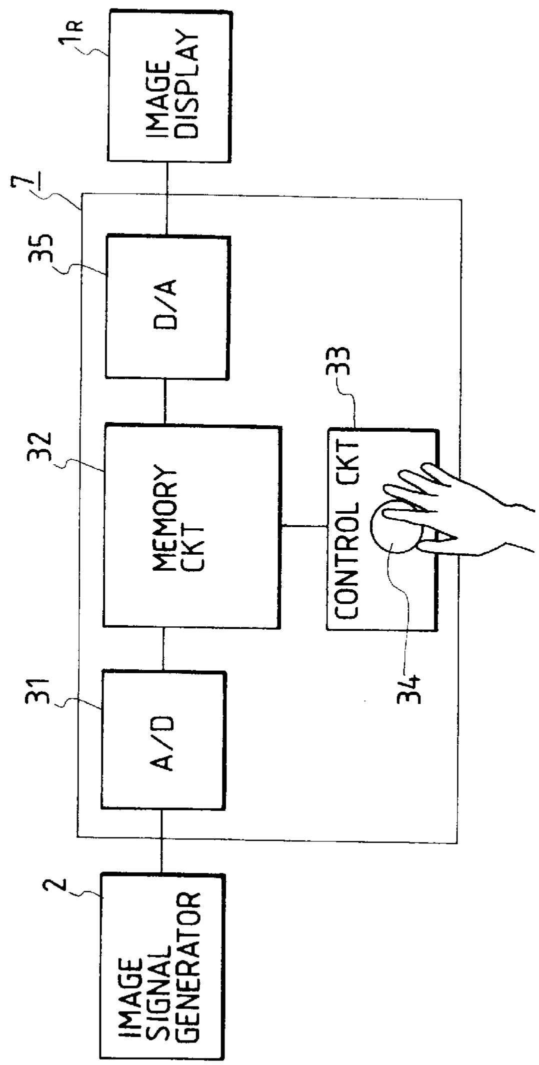
FIG. 46 is an explanatory view of an image signal modulating portion when an image signal is an analog signal.
Figure 47:
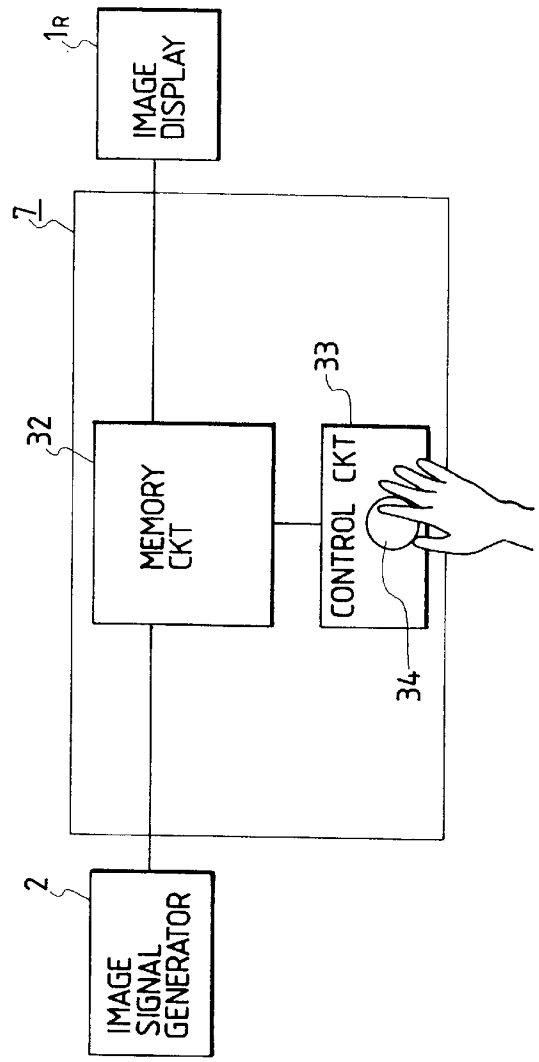
FIG. 47 is an explanatory view of an image signal modulating portion when an image signal is a digital signal.

FIG. 45 is a schematic view showing principal part of the 11th embodiment of the present invention, FIG. 46 shows the arrangement of the magnification modulator 7 when image signals supplied from the image signal generating portion 2 are analog video signals, and FIG. 47 shows the arrangement of the magnification modulator 7 when image signals supplied from the image signal generating portion 2 are digital video signals. The same reference numerals in FIGS. 45 to 47 denote the same parts as in FIG. 43, and a detailed description thereof will be omitted.

In this embodiment, optical systems $30_R'$ and $30_L$ for the right and left eyes have a symmetrical arrangement about the vertical direction, and form the display images $4_R$ and $4_L$ on the image displays $1_R$ and $1_L$ at the same magnification factor, thereby forming the observation images $4_R'$ and $4_L'$.

More specifically, in this embodiment, the magnification difference is generated in such a manner that an image signal from the image signal generating portion 2 is subjected to coordinate conversion processing in the magnification modulator 7 to change the size of the display image $4_R$ to be displayed on the image display $1_R$.

The image coordinate conversion method in the magnification modulator 7 will be described in detail below with reference to FIGS. 46 and 47.

Referring to FIG. 46, an analog image signal generated by the image signal generating portion (or generator) 2 is converted into a digital signal by an A/D converter 31, and the digital signal is supplied to a memory circuit 32. The size of the image is modulated on the memory circuit 32 by performing coordinate conversion processing such as interpolation, thin-out processing, or the like in units of pixels in accordance with a command signal supplied from a control circuit 33.

The control circuit 33 has a knob 34 for adjusting the degree of magnification modulation, and a user can freely adjust the magnification using this knob 34. The digital image signal modulated on the memory circuit 32 is converted into an analog image signal by a D/A converter 35, and the analog signal is supplied to the corresponding image display 1. Of course, if the image display 1 can receive a digital signal, the D/A converter 35 can be omitted.

When an image signal supplied from the image signal generating portion 2 is a digital signal, the magnification modulator 7 has the arrangement shown in FIG. 47.

An image signal generated by the image signal generating portion 2 is directly supplied to the memory circuit 32. On the memory circuit 32, the size of the image is modulated by performing coordinate conversion processing such as movement, interpolation, thin-out processing, or the like in units of pixels in accordance with a command signal supplied from a control circuit 33.

The control circuit 33 has the knob 34 for adjusting the degree of magnification modulation, and a user can freely adjust the magnification using this knob 34.

The image display 1 can receive a digital signal, and the modulated digital image signal is directly transmitted to the image display 1.

As described above, with the above-mentioned arrangements for analog and digital image signals, a desired magnification difference can be assigned to the display images $4_R$ and $4_L$ displayed on the right and left image displays $1_R$ and $1_L$.

In this embodiment, since the optical systems $30_R$' and $30_L$ have a symmetrical arrangement, and are designed to have the same imaging magnification, the magnification difference between the display images $4_R$ and $4_L$ is directly reflected in that between the observation images $4_R$' and $4_L$'.

Figure 48A:
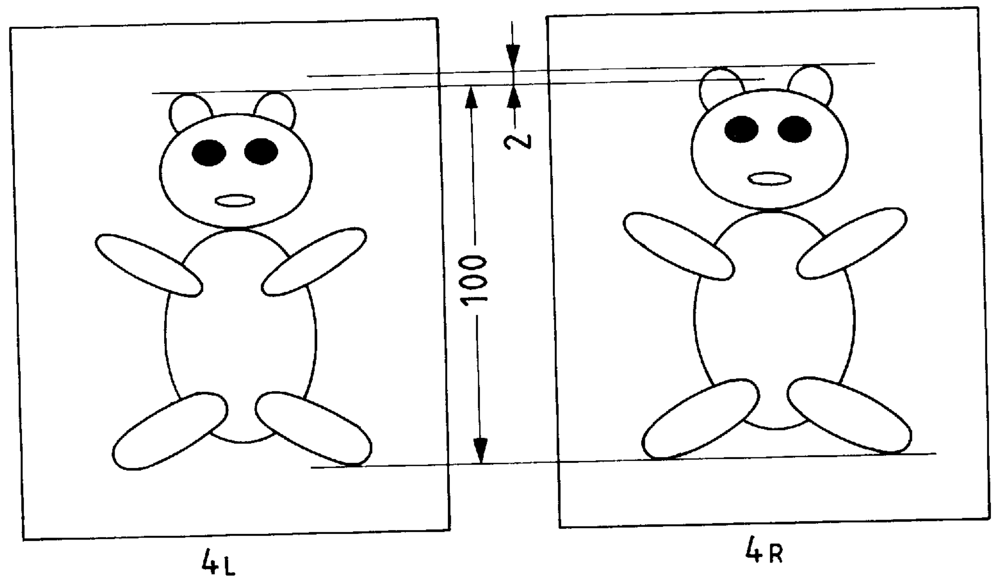
FIGS. 48A and 48B are explanatory views of display images upon setting a magnification difference.
Figure 48B:
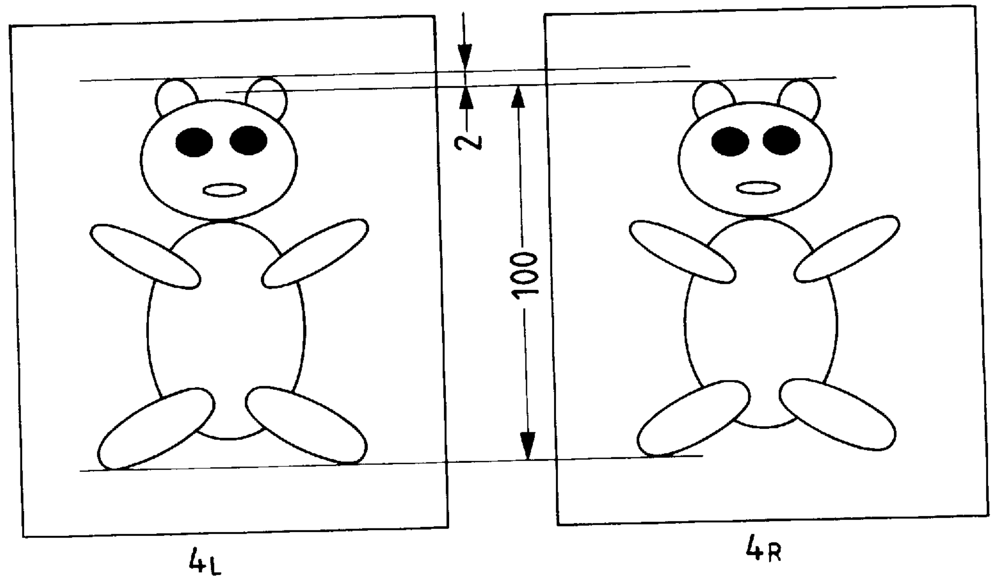

FIGS. 48A and 48B are explanatory views showing the display images $4_R$ and $4_L$ displayed on the image displays $1_R$ and $1_L$ upon generation of the magnification difference in this embodiment.

FIG. 48A shows a case wherein a magnification difference of +2% is generated between the display images $4_R$ and $4_L$.

At this time, if the size of the display image $4_L$ is assumed to be 100, the size of the display image $4_R$ is 102. If both the right and left optical systems $30_R$ and $30_L$ have an enlargement magnification of ×10, the observation images $4_R$' and $4_L$' respectively have sizes of 1000 and 1020, and the magnification difference is +2% as in the original images.

FIG. 48B shows a case wherein a magnification difference of −2% is generated between the display images $4_R$ and $4_L$. At this time, if the size of the display image $4_L$ is assumed to be 102, the size of the display image $4_R$ is 100.

In this embodiment, as described above, the "observability" of a stereoscopic image is improved by image processing (image coordinate conversion method) of the display images $4_R$ and $4_L$.

Figure 49A:
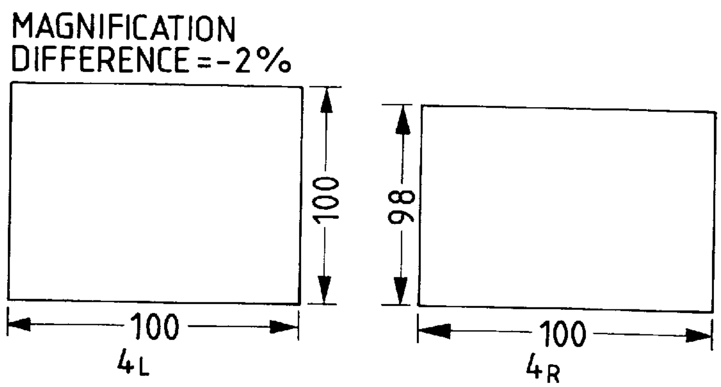
FIGS. 49A to 49D are explanatory views of the size of an image.
Figure 49B:
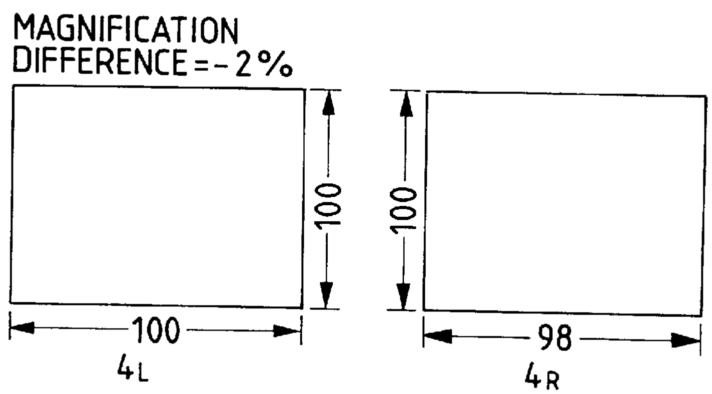
Figure 49C:
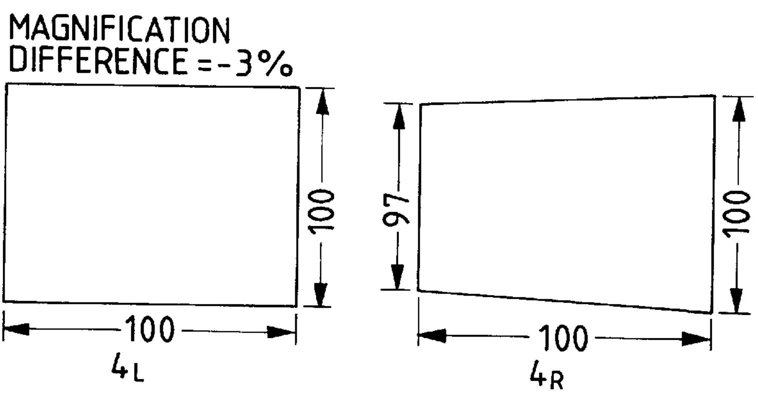
Figure 49D:
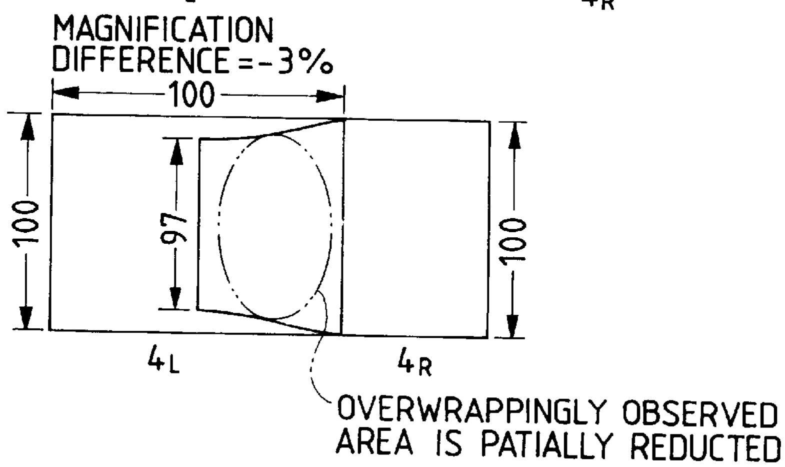

Note that the sizes of the observation images $4_R$' and $4_L$' need not always be changed by evenly changing the entire frames. For example, the horizontal or vertical size may be changed (FIGS. 49A and 49B), or the size may be partially changed (FIGS. 49C and 49D).

Figure 50:
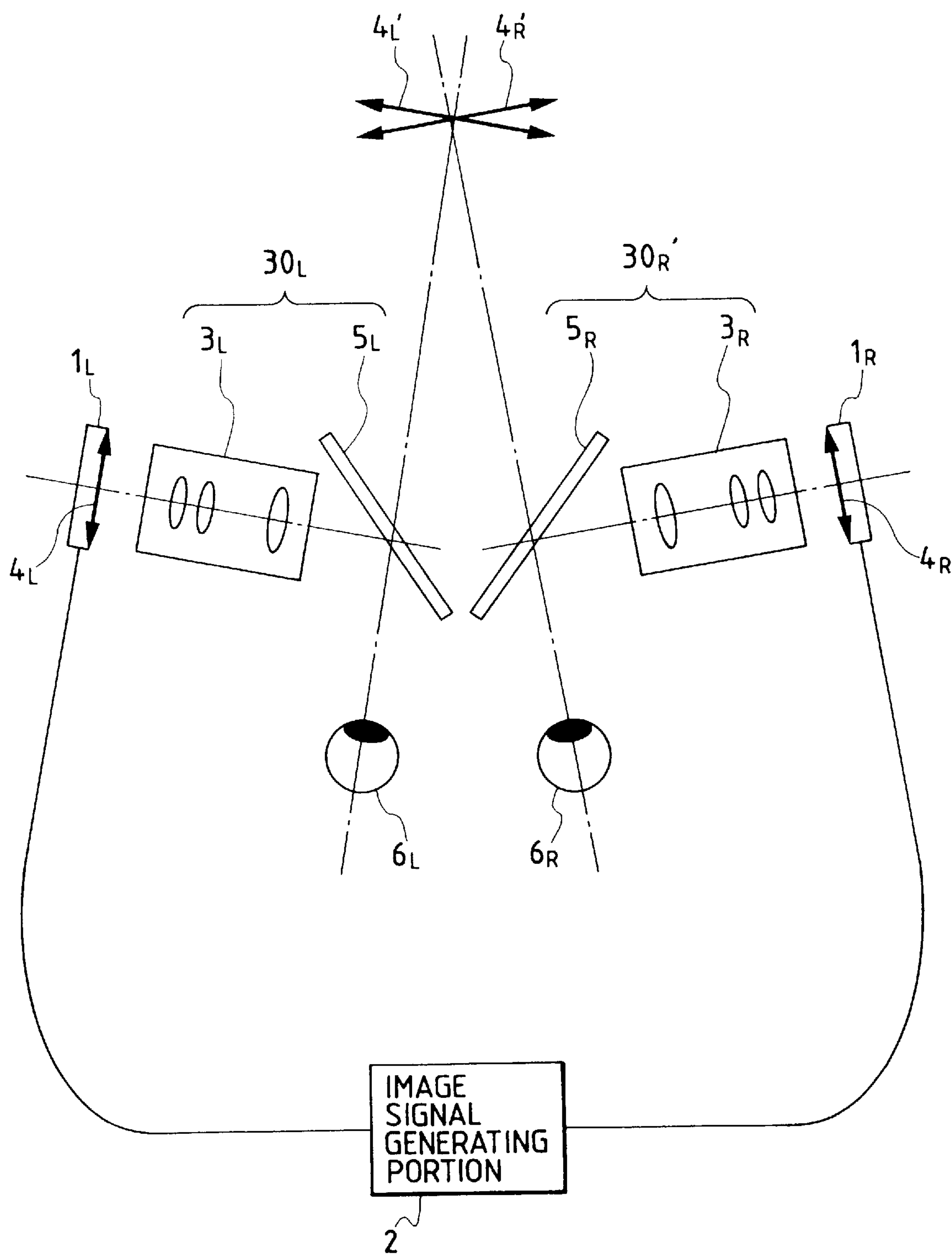
FIG. 50 is a schematic view showing principal part of the 12th embodiment of the present invention.

FIG. 50 is a schematic view showing principal part of the 12th embodiment of the present invention. The same reference numerals in this embodiment denote the same parts as in the 10th embodiment shown in FIG. 43, and a detailed description thereof will be omitted.

In this embodiment, although lenses $3_R$ and $3_L$ for the right and left eyes have the same arrangement, optical systems $30_R$' and $30_L$ for the right and left eyes have asymmetrical positional relationships between the lenses $3_R$ and $3_L$, the display images $4_R$ and $4_L$, and the observation images $4_R$' and $4_L$', thereby generating a magnification difference between the observation images $4_R$' and $4_L$'.

Figure 51:
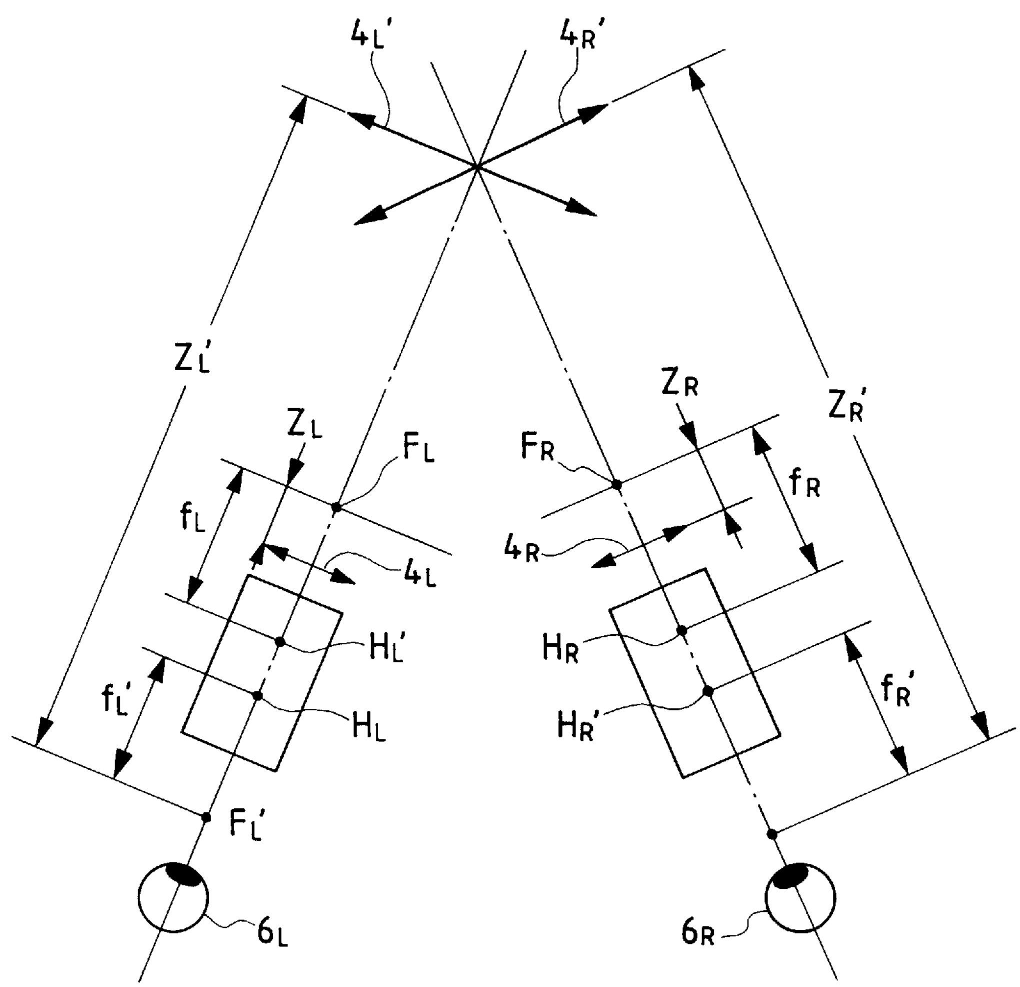
FIG. 51 is an explanatory view of the positional relationship among the respective elements in the 12th embodiment.

At this time, the positional relationships between the respective elements are determined based on an optical paraxial theory, as shown in FIG. 51.

In FIG. 51, $H_L$, $H'_L$: the principal points of the lens $3_L$ $F_L$, $F'_L$: the focal points of the lens $3_L$ $f_L$, $f'_L$: the focal lengths of the lens $3_L$ $z_L$, $z'_L$: the distances from the focal points $F_L$ and $F'_L$ to the display images (observation images) $4_L$ and $4_{L'}$ Similarly, $H_R$, $H'_R$: the principal points of the lens $3_R$ $F_R$, $F'_R$: the focal points of the lens $3_R$ $f_R$, $f'_R$: the focal lengths of the lens $3_R$ $z_R$, $z'_R$: the distances from the focal points $F_R$ and $F'_R$ to the display images (observation images) $4_R$ and $4_{R'}$ From the paraxial imaging formula, the magnifications, $\beta_R$ and $\beta_L$, of the right and left optical systems are respectively given by:

$$\beta_R=-f'_R/z_R=-z'_R/f_R$$

$$\beta_L=-f'_L/z_L=-z'_L/f_L \quad (1)$$

If the sizes of the display images $4_R$ and $4_L$ are equal to each other, as described above, the magnification difference, $\Delta\beta$ (%), is given by:

$$\Delta\beta=\frac{\beta_R-\beta_L}{\beta_L}\times 100=\frac{f_R z_L-f_L z_R}{f_L z_R}\times 100(\%) \quad (2)$$

Since $f_R=f_L$, $$\Delta\beta=\frac{z_L-z_R}{z_R}\times 100(\%) \quad (3)$$

Therefore, the distances between the right and left lenses $3_R$ and $3_L$ and the display images $4_R$ and $4_L$ can be set to satisfy equation (3) within the range of $0<|\Delta\beta|<3(\%)$.

If the distances $z_R$ and $z_L$ are set to be different from each other, the distances $z'_R$ and $z'_L$ also become different from each other, and hence, the observation images $4_R$' and $4_L$' have different positions.

In this case, the imaging positions of the observation images $4_R$' and $4_L$' may be kept equal to each other, so that the distances from the eyes $6_R$ and $6_L$ of the observer to the lenses $3_R$ and $3_L$ have a difference corresponding to that between the distances $z'_R$ and $z'_L$:

$$z'_R-z'_L=f_{R\ 2}(1/z_R-1/z_L)$$

At this time, when a magnification difference of 2% is to be generated between the observation images $4_R$' and $4_L$', if the enlargement magnification is ×10, the enlargement magnification of the optical system for the right eye is ×10.2, and the sizes of the display images $4_R$ and $4_L$ are 100, the sizes of the observation images $4_R$' and $4_L$' respectively become 1020 and 1000, thus obtaining a magnification difference of +2%.

In this embodiment, as described above, the "observability" is improved by modifying the arrangements of the optical systems $30_R$' and $30_L$ for displaying images (by setting different imaging magnifications).

Note that a change in size of the observation images $4_R$' and $4_L$' by means of the asymmetrical arrangement of the optical systems $30_R$ and $30_L$ need not always be attained by evenly changing the entire frame. For example, the horizontal or vertical size may be changed (using, e.g., a cylindrical lens) or the size may be partially changed.

Figure 52:
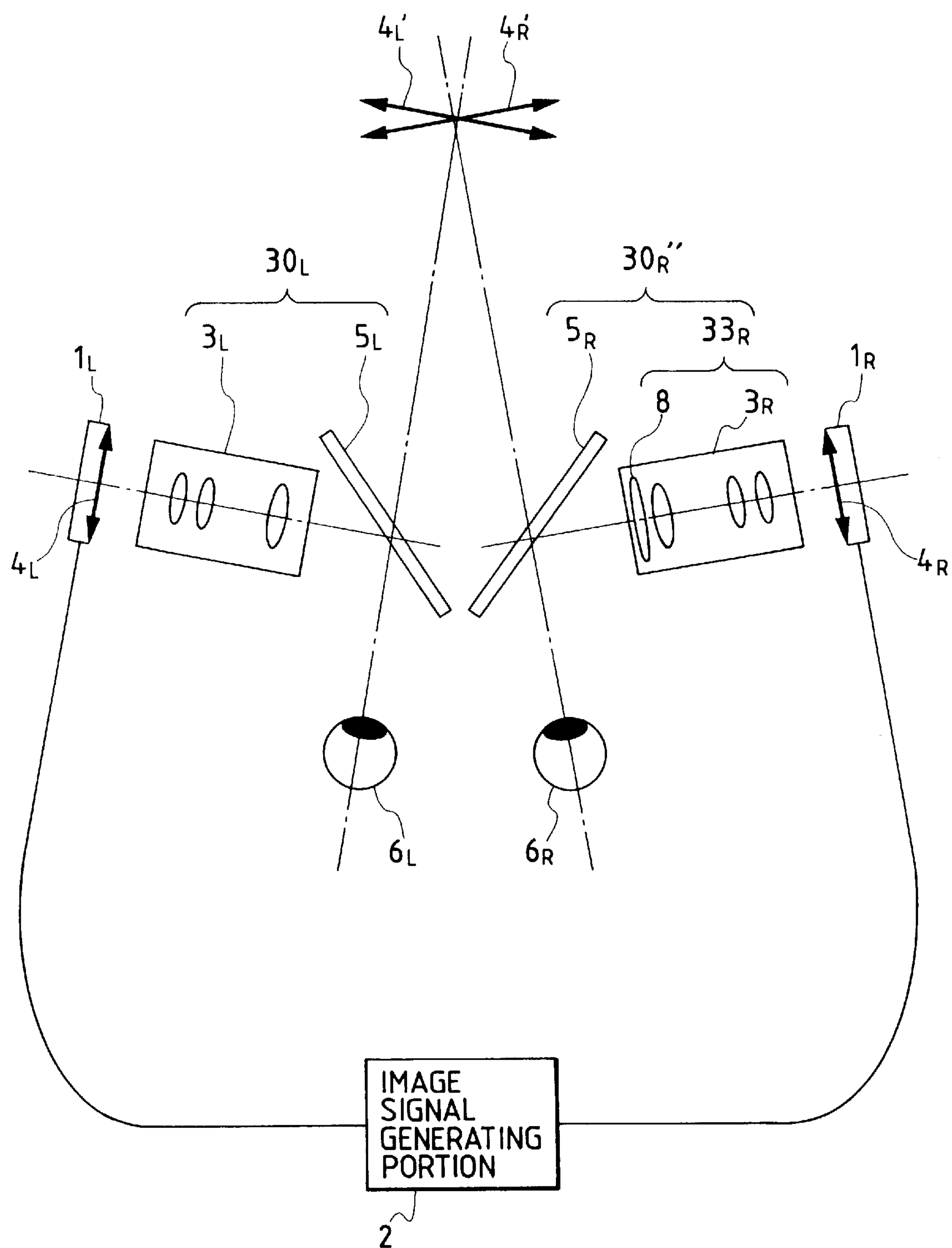
FIG. 52 is a schematic view showing principal part of the 13th embodiment of the present invention.

FIG. 52 is a schematic view showing principal part of the 13th embodiment of the present invention. The arrangement of this embodiment is substantially the same as that of the 12th embodiment shown in FIG. 50, except that a magnification correction lens 8 is added to the lens $3_R$ for the right eye to constitute a lens $33_R$.

In FIG. 52, the lens $33_R$ and the mirror $5_R$ constitute an optical system $30_R$" for the right eye.

In this embodiment, since the magnification correction lens 8 is added, the distance from the display image $4_R$ to the lens $33_R$ is changed, thereby generating a magnification difference between images formed by the lenses $33_R$ and $3_L$.

At this time, the positional relationships between the respective elements are determined based on an optical paraxial theory, as shown in FIG. 51. Note that the lens $3_R$ in FIG. 51 is replaced by the lens $33_R$.

First, from the Newton's equation, $$f_L^2=z_L\cdot z_{L'}$$

$$f_R^2=z_R\cdot z_{R'} \quad (4)$$

However, since the right and left observation images $4_R$' and $4_L$' are formed at the same positions (i.e., $z'_{R=z'L}$)we have:

$$f_L{}^2/z_L = f_R{}^2/z_R. \quad (5)$$

On the other hand, the magnifications, $\beta_R$ and $\beta_L$, of the lenses $\mathbf{33}_R$ and $\mathbf{3}_L$ are:

$$\beta_R = -f'_R/z_R$$

$$\beta_L = -f'_L/z_L \quad (6)$$

If the sizes of the display images $\mathbf{4}_R$ and $\mathbf{4}_L$ are equal to each other, as described above, the magnification difference $\Delta\beta$(%) is given by:

$$\Delta\beta = \frac{\beta_R - \beta_L}{\beta_L} \times 100 = \frac{f_R z_L - f_L z_R}{f_L z_R} \times 100(\%) \quad (7)$$

Simultaneous solution of equations (5) and (7) for the focal length $f_R$ and the distance $z_R$ gives:

$$f_R = \frac{f_L}{1 + 0.01\Delta\beta} \quad (8)$$

$$z_R = \frac{z_L}{(1 + 0.01\Delta\beta)^2} \quad (9)$$

The optical position of the lens $\mathbf{33}_R$ for the right eye is adjusted, so that its focal length $f_R$ and distance $z_R$ satisfy the conditions of equations (8) and (9).

On the other hand, if the focal length of the lens $\mathbf{33}_R$ is equal to the focal length $f_L$ of the lens $\mathbf{3}_L$, and the principal point distance of the lens $\mathbf{33}_R$ is represented by d, the focal length $f_R$ of the lens $\mathbf{33}_R$ is given by:

$$f_R = \frac{f_L \cdot f8}{f_L + f8 - d}$$

From equation (5), we have:

$$f8 = \frac{f_L - d}{0.01\Delta\beta} \quad (10)$$

When the magnification difference $\Delta\beta$ is to be obtained, the magnification correction lens 8 that satisfies the condition of equation (10) can be used.

Like in the 10th embodiment shown in FIG. 43, one of the lenses $\mathbf{3}_L$ and $\mathbf{33}_R$ may constitute a so-called zoom lens system, so that a user can arbitrarily adjust the magnification difference.

In particular, the degree of improvement in "observability" obtainable by generation of a magnification difference largely depends on personal differences (personal favors), and the adjustment range is preferably set to fall within the range from about −3% to +3%.

In this embodiment, the magnification difference is obtained by the asymmetrical arrangement of the optical systems $\mathbf{30}_R$' and $\mathbf{30}_L$. Alternatively, as in the embodiment shown in FIG. 43, the magnification modulator 7 may also be arranged between the image signal generating portion 2 and the image displays $\mathbf{1}_R$ and $\mathbf{1}_L$ to attain the magnification difference by both the means.

At this time, control means (not shown) may be arranged to recognize the magnification difference generated by the optical systems $\mathbf{30}_R$' and $\mathbf{30}_L$' and the magnification difference generated by the magnification modulator 7, and may control the optical systems $\mathbf{30}_R$' and $\mathbf{30}_L$ and/or the magnification modulator 7 to obtain a desired magnification difference.

Let $\Delta\beta1$ (%) be the magnification difference of the display image $\mathbf{4}_R$ with respect to the display image $\mathbf{4}_L$ generated by the image coordinate conversion method, and $\Delta\beta2$ (%) be the magnification difference generated by the asymmetrical optical system method. The magnification difference, $\Delta$, of the observation image $\mathbf{4}_R$' with respect to the observation image $\mathbf{4}_L$' is then given by:

$$\Delta = \Delta\beta2 + \Delta\beta1 + (\Delta\beta * \Delta\beta2/100)\ (\%)$$

Therefore, in this case, $\Delta\beta1$ and $\Delta\beta2$ are adjusted so that $\Delta$ falls within the range from −3% to +3%.

In this manner, the image coordinate conversion method and the asymmetrical optical system method can be combined.

Note that the magnification difference is generated within the range from −3% to +3%. However, since subjective evaluation values for the magnification difference include personal differences, the magnification difference is most preferably set to be about ±2% from the graphs shown in FIGS. 42A and 42B so as to prevent a decrease in evaluation value of "observability" of a stereoscopic image to be observed.

As described above, in this embodiment, the magnification difference is adjustable, so that the observer can select the magnification difference at which an image is most observable.

Figure 53:
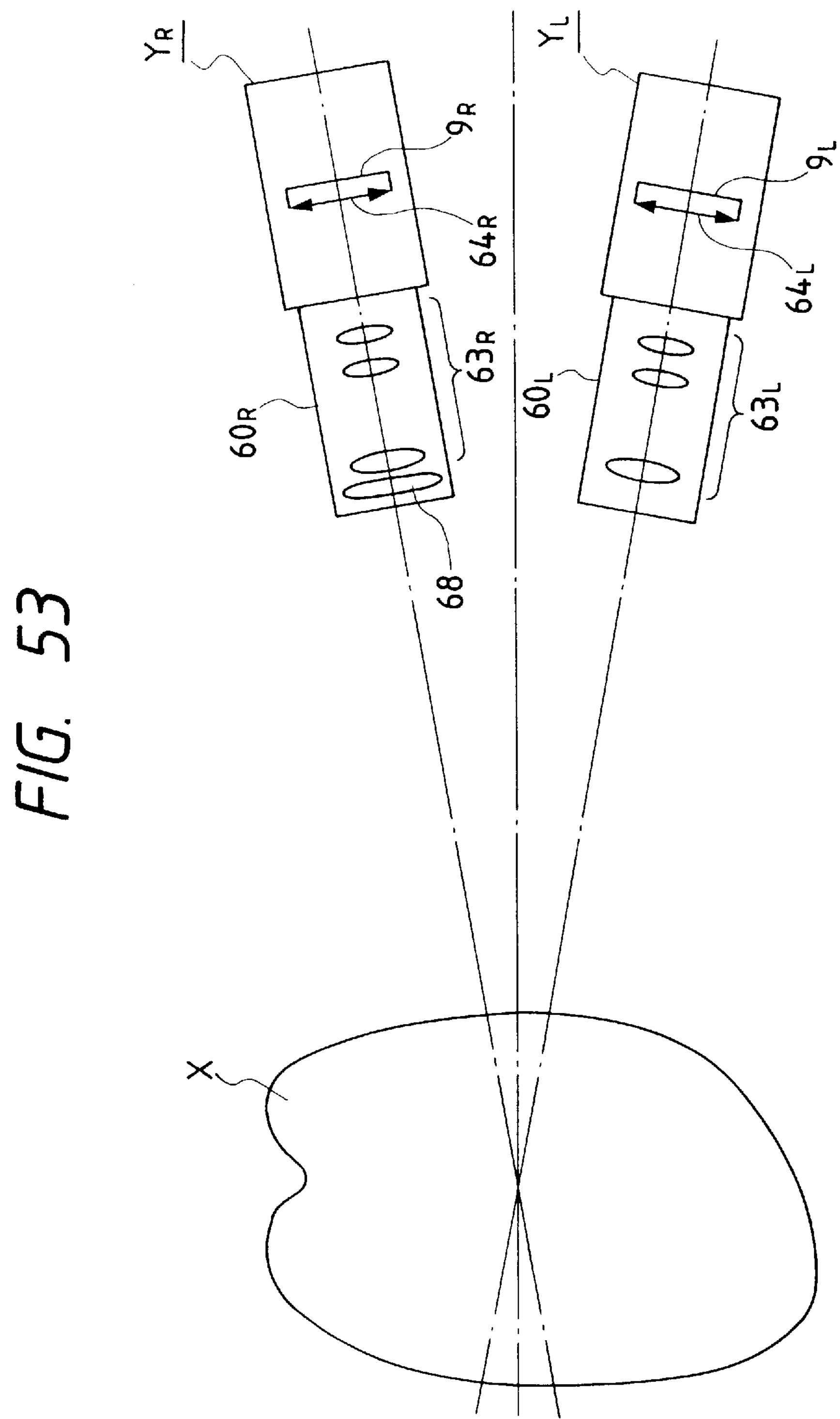
FIG. 53 is a schematic view showing principal part of the 14th embodiment of the present invention.

FIG. 53 is an explanatory view of the 14th embodiment of an image pick-up apparatus according to the present invention.

In this embodiment, the present invention is applied to an image pick-up apparatus for taking parallax images using a double-lens camera system.

This apparatus can improve the "observability" for an observer who observes taken parallax image which are input to an image display apparatus, an image recording apparatus or the like, and is displayed on the image display apparatus, or for an observer who observes parallax images which are reproduced from a recording medium recorded by the image recording apparatus and are displayed on the image display apparatus.

In FIG. 53, an image of an object X is taken by right and left cameras $Y_R$ and $Y_L$ constituting the double-lens camera system.

The cameras $Y_R$ and $Y_L$ respectively comprise image pick-up optical systems $\mathbf{60}_R$ and $\mathbf{60}_L$ including image pick-up lenses $\mathbf{63}_R$ and $\mathbf{63}_L$. These image pick-up lenses $\mathbf{63}_R$ and $\mathbf{63}_L$ respectively form the image (taken images $\mathbf{64}_R$ and $\mathbf{64}_L$) of the object X on the image taking surfaces of image taking means $\mathbf{9}_R$ and $\mathbf{9}_L$. The image taking means $\mathbf{9}_R$ and $\mathbf{9}_L$ take the taken images $\mathbf{64}_R$ and $\mathbf{64}_L$ formed on their image taking surfaces, thus obtaining corresponding image signals.

A magnification correction lens 68 is arranged in the optical path of at least one of the right and left image pick-up optical systems $\mathbf{60}_R$ and $\mathbf{60}_L$ (in the right image pick-up optical system $\mathbf{60}_R$ in FIG. 53).

In this embodiment, the magnification difference between the taken images $\mathbf{64}_R$ and $\mathbf{64}_L$ is obtained by adjusting the focal length of the image pick-up optical system $\mathbf{60}_R$ (i.e., the synthesized focal length of the magnification correction lens 68 and the right lens system $\mathbf{63}_R$), and the distance from the image pick-up optical system $\mathbf{60}_R$ to the image taking surface of the image taking means $\mathbf{9}_R$ so as to change the size of the taken image $\mathbf{64}_R$ obtained on the image taking surface of the means $\mathbf{9}_R$.

Note that the magnification difference is defined by:

$$\text{Magnification Difference } \Delta i = \frac{\text{Size of taken image } 64_R - \text{Size of taken image } 64_L}{\text{Size of taken image } 64_L} * 100(\%)$$

In this embodiment, the "observability" upon displaying the taken images $64_R$ and $64_L$ on an image display apparatus or the like is improved by generating a magnification difference between the taken images $64_R$ and $64_L$.

In particular, the "observability" is improved by modifying the arrangement of the image pick-up optical systems $60_R$ and $60_L$ (by setting different imaging magnifications).

Figure 54:
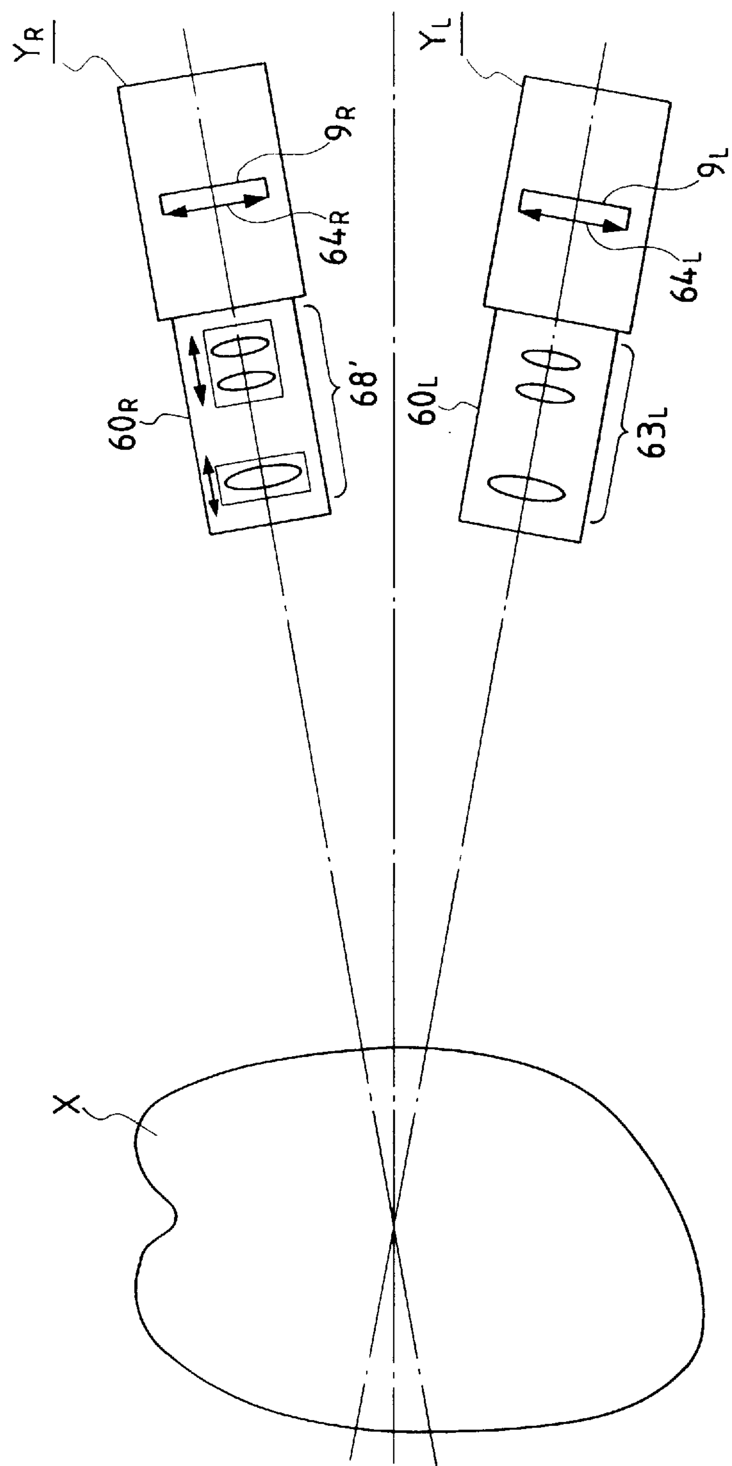
FIG. 54 is a schematic view showing principal part of the 14th embodiment of the present invention.

Alternatively, as shown in FIG. 54, one image pick-up optical system (the right image pick-up optical system $60_R$ in FIG. 54) may comprise a zoom lens system 68' which can vary its focal length, to allow adjustment of the size of the taken image $64_R$, so that the magnification difference Δi is adjustable within the range from −3% to +3%.

With this arrangement, the effect of improving the "observability" can be adjusted, and the photographer can select a most desirable magnification difference Δi.

Figure 55:
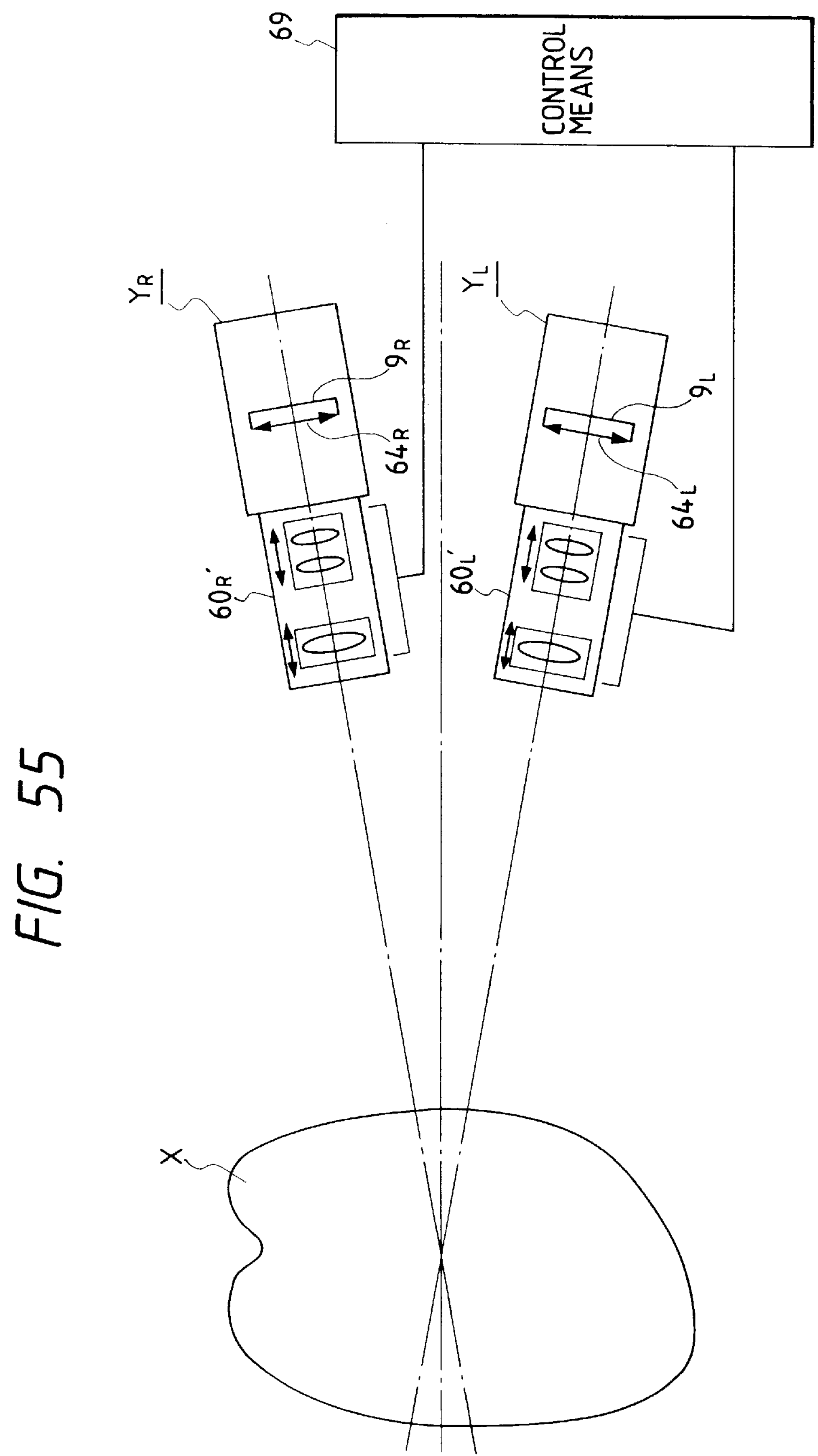
FIG. 55 is a schematic view showing principal part of the 14th embodiment of the present invention.

Furthermore, as shown in FIG. 55, both image pickup optical systems $60_R$' and $60_L$' may allow to vary their focal lengths, and control means 69 may be arranged, so as to allow a change in image pick-up magnifications while maintaining a desired magnification difference Δi.

In this arrangement, the control means 69 detects the focal lengths (zoom positions) of the image pick-up optical systems $60_R$' and $60_L$', and controls to maintain the magnification difference Δi within the range of $0<|\text{magnification difference } \Delta i|<3$.

Figure 56:
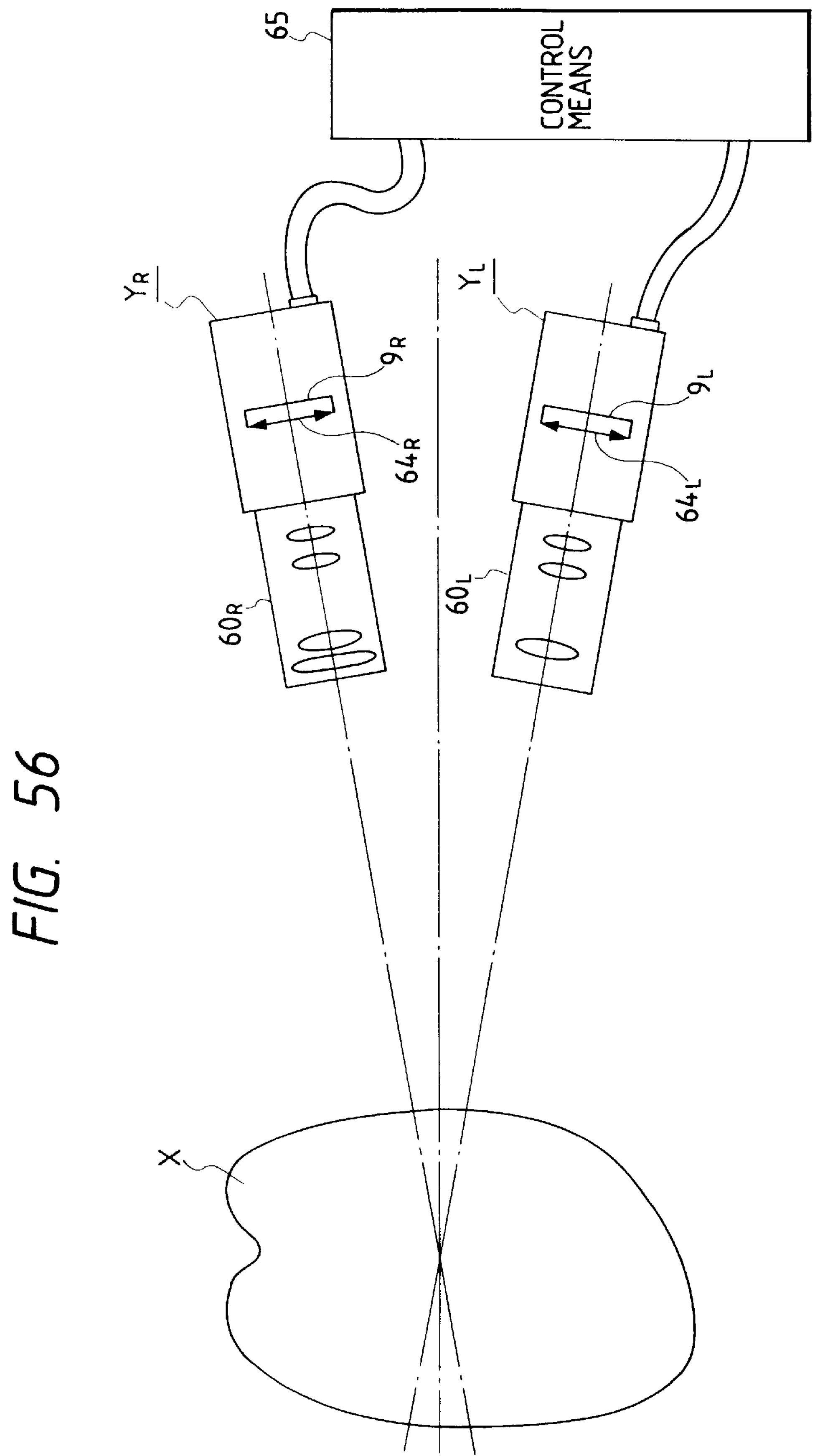
FIG. 56 is a schematic view showing principal part of the 14th embodiment of the present invention.

As shown in FIG. 56, a magnification modulator 65 may be arranged, and may perform image processing of the taken images $64_R$ and $64_L$ from the cameras $Y_R$ and $Y_L$ by the image coordinate conversion method so as to generate a magnification difference. With this arrangement, the "observability" upon displaying the taken images $64_R$ and $64_L$ on, e.g., an image display apparatus, can be improved.

Figure 57:
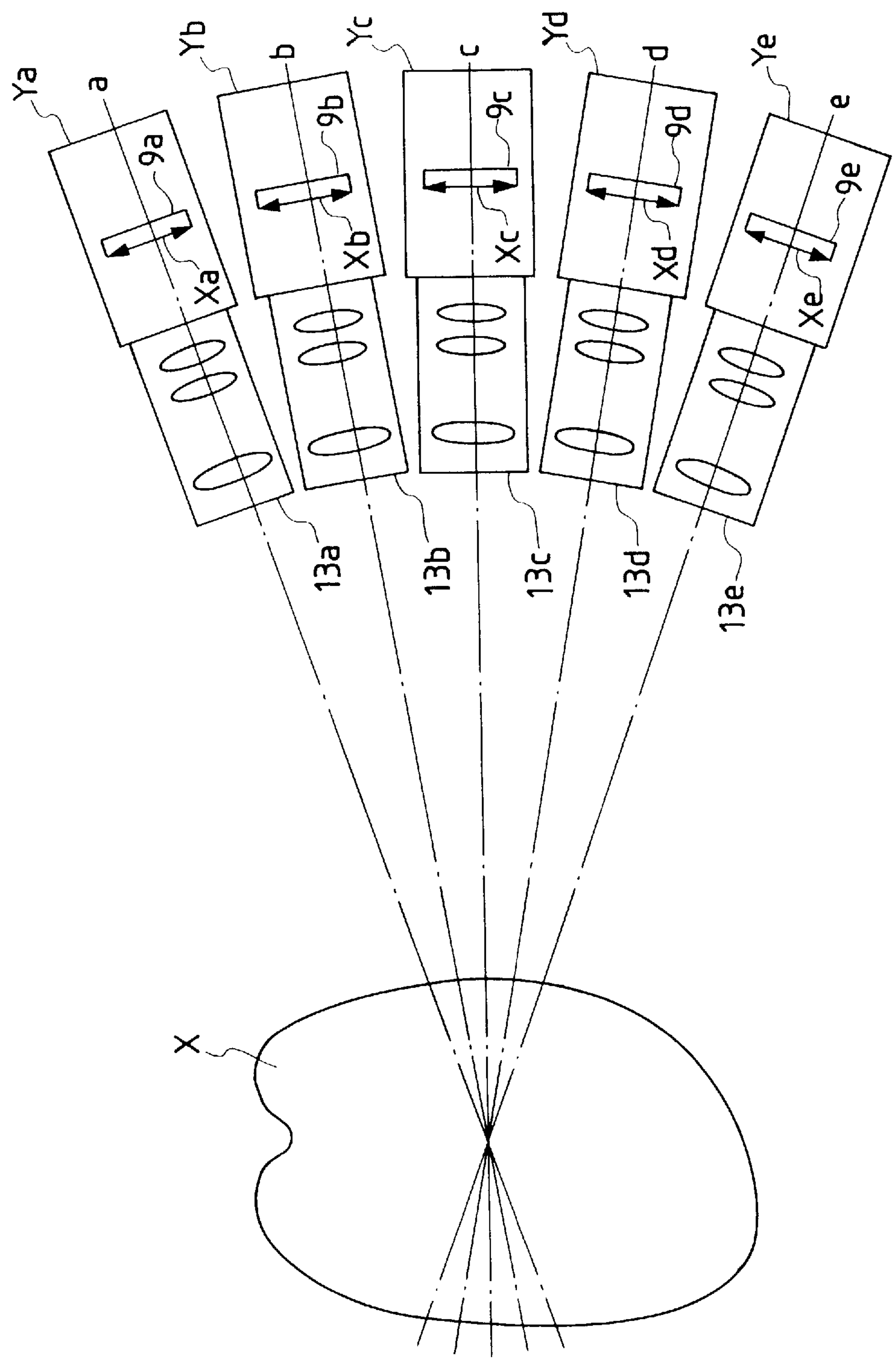
FIG. 57 is a schematic view showing principal part of the 15th embodiment of the present invention.

FIG. 57 is a schematic view showing principal part of the 15th embodiment of the present invention. In this embodiment, the present invention is applied to an image pick-up apparatus for taking parallax images using a multi-lens camera system. This apparatus takes parallax images, so that a magnification difference is generated between those for the right and left eyes of the parallax images.

In FIG. 57, an image of an object X is taken by cameras Ya to Ye. The image of the object X is formed on the image taking surfaces of image taking means 9*a* to 9*e* by image pick-up optical systems 13*a* to 13*e*, thus obtaining taken images Xa to Xe with a parallax.

Of these taken images Xa to Xe, only one taken image is observed by the right eye of an observer upon observation, and only one taken image is observed by his or her left eye.

Therefore, when the taken images Xa to Xe have appropriately set sizes and are taken to have a magnification difference, the "observability" upon displaying the taken images Xa to Xe on an image display apparatus can be improved.

Figure 58:
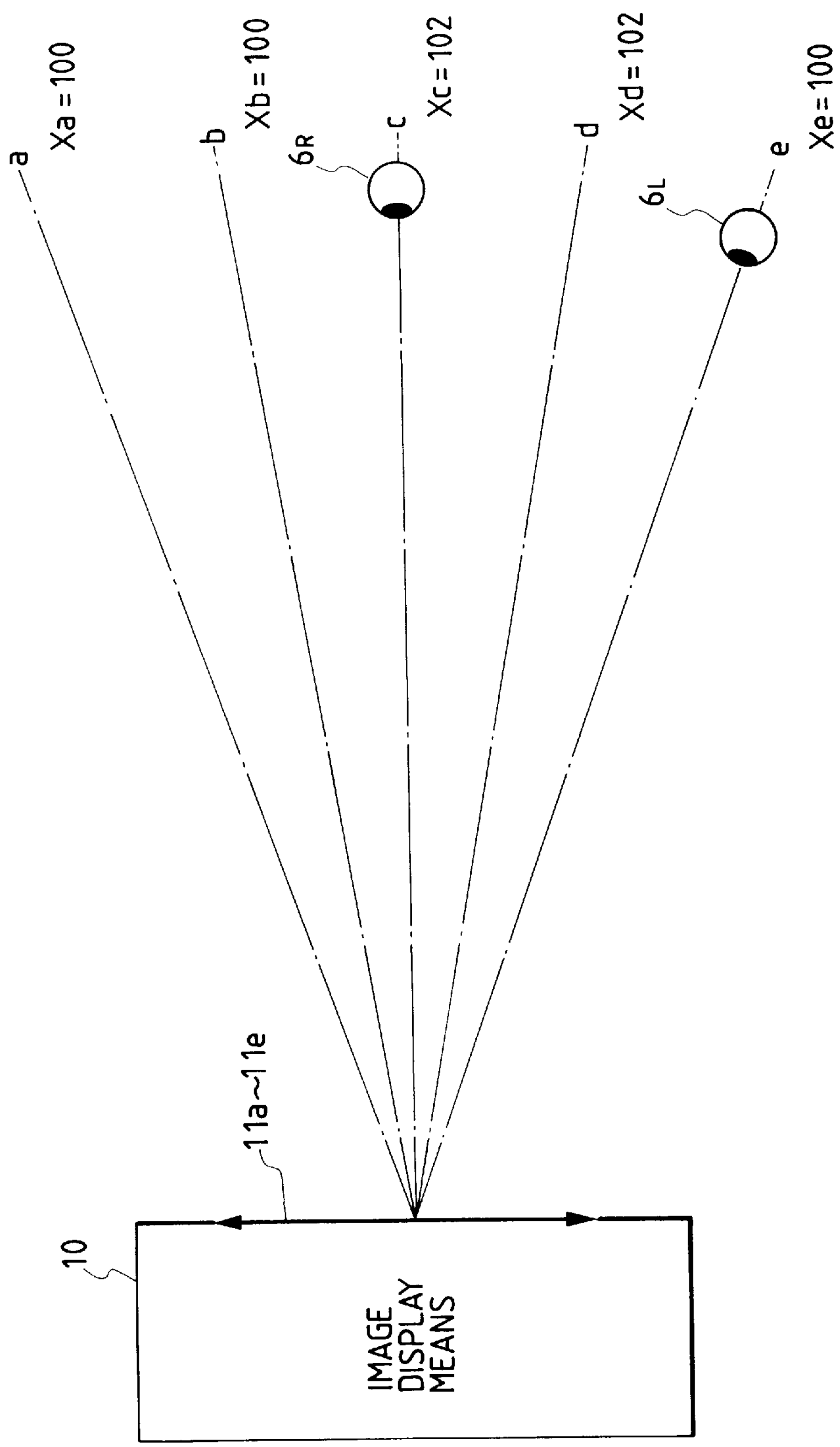
FIG. 58 is an explanatory view upon displaying taken images obtained in the 15th embodiment on an image display apparatus.

FIG. 58 is an explanatory view upon displaying images on the basis of the taken images Xa to Xe in an image display apparatus for performing stereoscopic display by utilizing a binocular parallax.

In FIG. 58, image display means 10 allows to independently observe five display images with a parallax from the same directions as those in the image pick-up operation. For example, the image display means 10 adopts the lenticular method, large convex lens/large concave mirror method, parallax barrier method, or the like. Display images 11*a* to 11*e* are displayed on the image display means 10.

The image display means displays the display images 11*a* to 11*e* corresponding to the taken images Xa to Xe, so that the images can be observed from positions on axes a to e.

The positional relationship between the image display means and the observer is set so that a left eye $6_L$ of the observer is located on the axis e when his or her right eye $6_R$ is located on the axis c upon observation of the display images 11*a* to 11*e*. More specifically, the taken images Xc and Xe are observed as a stereoscopic pair of images, and similarly, the taken images Xb and Xd, and Xa and Xc are observed as stereoscopic pairs of images.

Therefore, in this embodiment, the taken images Xa to Xe are taken to generate a magnification difference between each stereoscopic pair of images.

For example, when the size of the taken image Xa is assumed to be 100, the sizes of the taken images Xb, Xc, Xd, and Xe are respectively set to be 100, 102, 102, and 100, thus obtaining a magnification difference of 2% between each stereoscopic pair of images.

Figure 59:
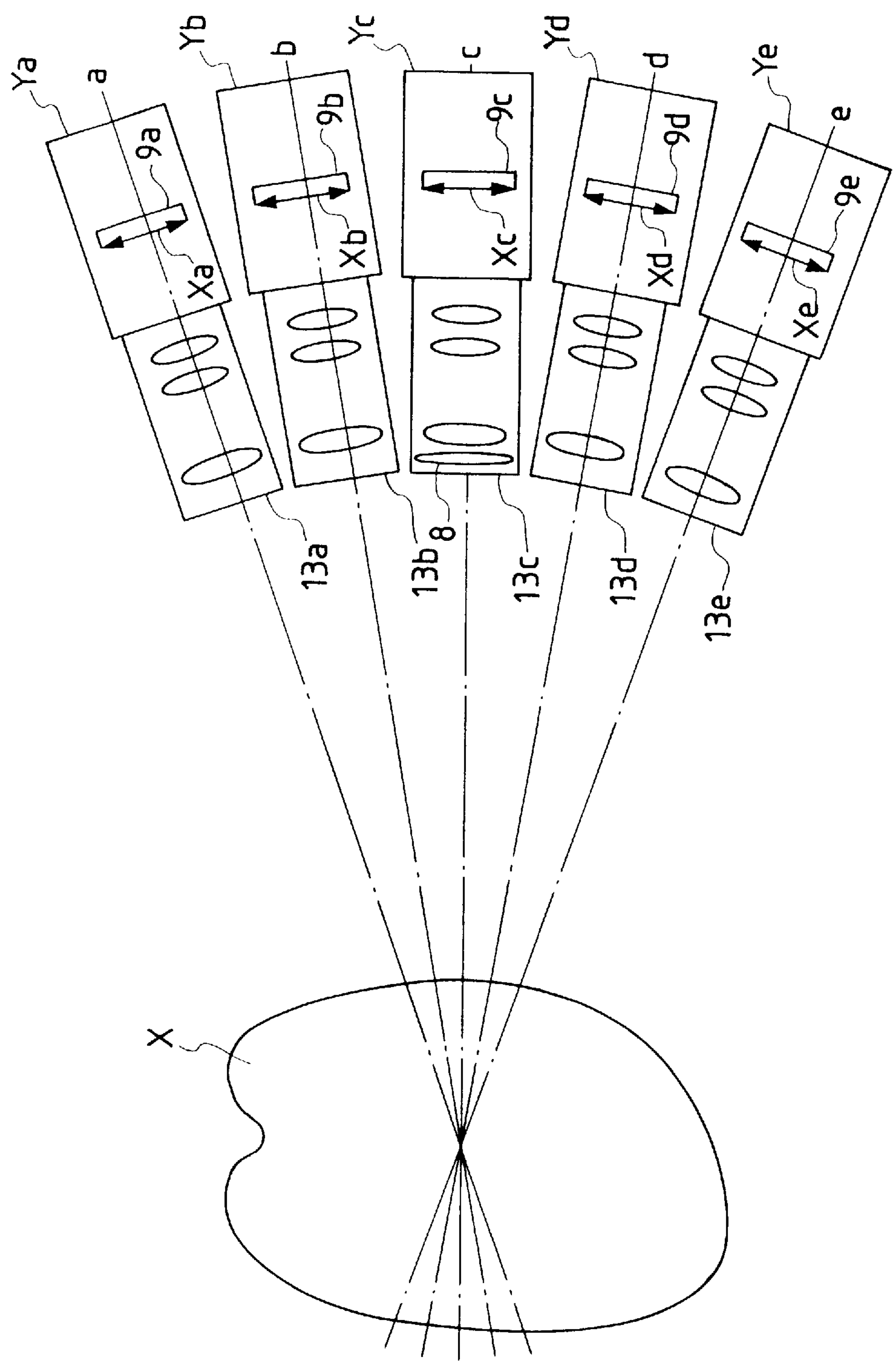
FIG. 59 is a schematic view showing principal part of the 15th embodiment of the present invention.

As practical means for generating the magnification difference, the same means as in the 14th embodiment shown in FIGS. 53 and 54 is adopted. For example, as shown in FIG. 59, the magnification correction lens 8 is inserted in the optical path of at least one (the image pick-up optical system 13*c* in FIG. 59) of the image pick-up optical systems 13*a* to 13*e*, thereby appropriately adjusting the synthesized focal length of the image pick-up optical system (13*c*) and the magnification correction lens 8, and the distance from the image pick-up optical system (13*c*) and the magnification correction lens 8 to the image taking means (9*c*).

Figure 60:
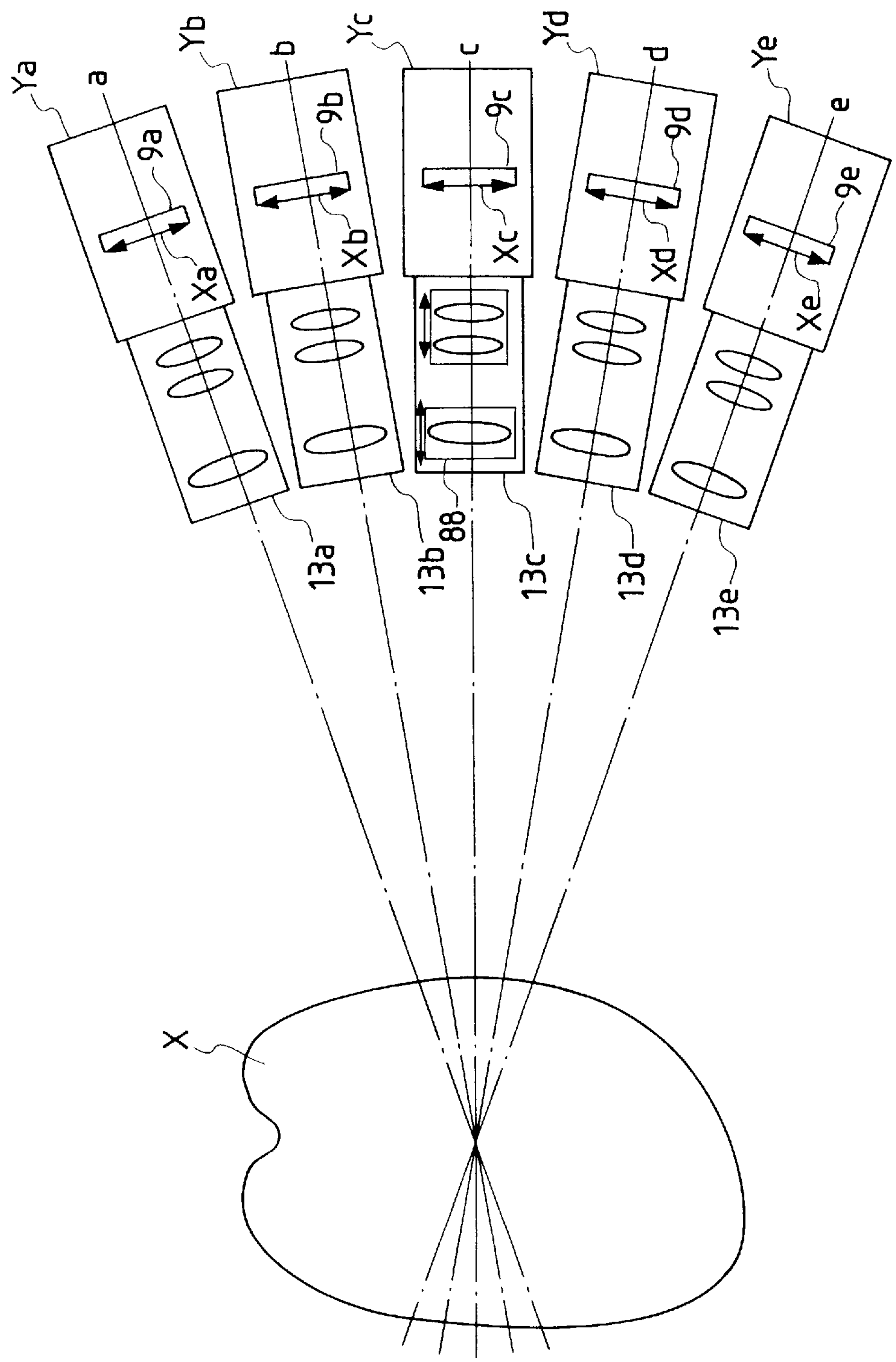
FIG. 60 is a schematic view showing principal part of the 15th embodiment of the present invention.

Alternatively, as shown in FIG. 60, at least one (the image pick-up optical system 13*c* in FIG. 60) of the image pick-up optical systems 13*a* to 13*e* is constituted as a zoom optical system 88, and the focal length of the zoom optical system 88 and the distance from the zoom optical system 88 to the image taking surface of the image taking means (9*c*) are appropriately adjusted to adjust the magnification difference within the range from −3% to +3%.

These arrangements allow any stereoscopic pair of taken images to have a desired magnification difference therebetween.

Figure 61:
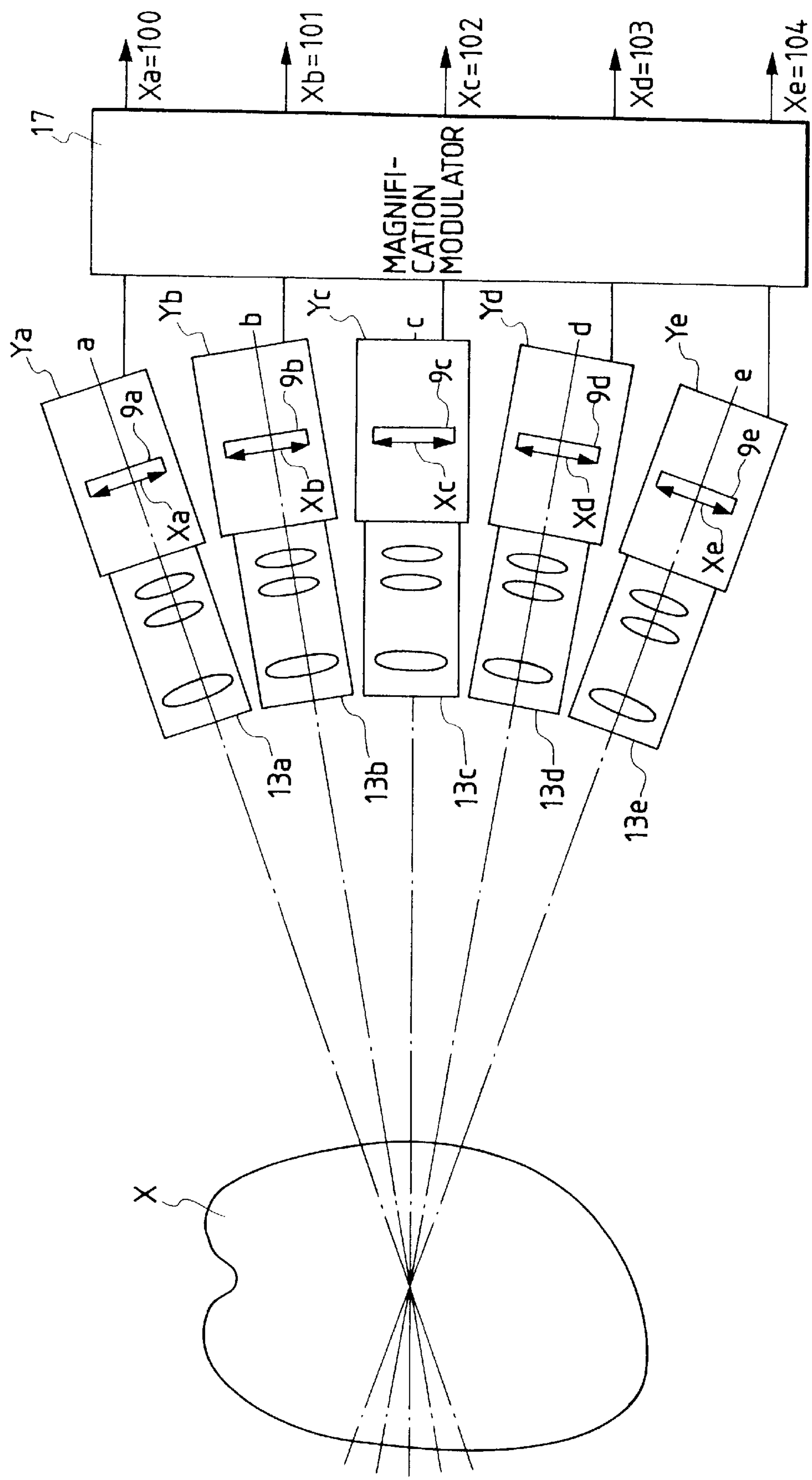
FIG. 61 is a schematic view showing principal part of the 16th embodiment of the present invention.

FIG. 61 is a schematic view showing principal part of the 16th embodiment of the present invention. In this embodiment, the present invention is applied to an image pick-up apparatus for taking parallax images using a multi-lens camera system. The apparatus takes images so that a magnification difference is generated between taken images for the right and left eyes of the parallax images.

In FIG. 61, an image of an object X is taken by cameras Ya to Ye. The image of the object X is formed on the image taking surfaces of image taking means 9*a*to 9*e* via image pick-up optical systems 13*a* to 13*e*, thus obtaining taken images Xa to Xe with a parallax.

A magnification modulator 17 generates a magnification difference by changing the sizes of the taken images Xa to Xe by coordinate conversion processing.

In the coordinate conversion processing of the magnification modulator 17, the sizes of the taken images Xa to Xe a re appropriately varied in such a manner that, if the size of the take n image Xa is assumed to be 100, the size s of the taken images Xb, Xc, Xd, and Xe are respectively set to be 101, 102, 103, and 104, thereby generating magnification differences among the taken images Xa to Xe.

On the other hand, as in the 15th embodiment shown in FIGS. 57 and 58, if the display position of an image display apparatus and the observation position of an observer is known, a magnification difference can be generated between corresponding pairs of the taken images Xa to Xe.

Figure 62:
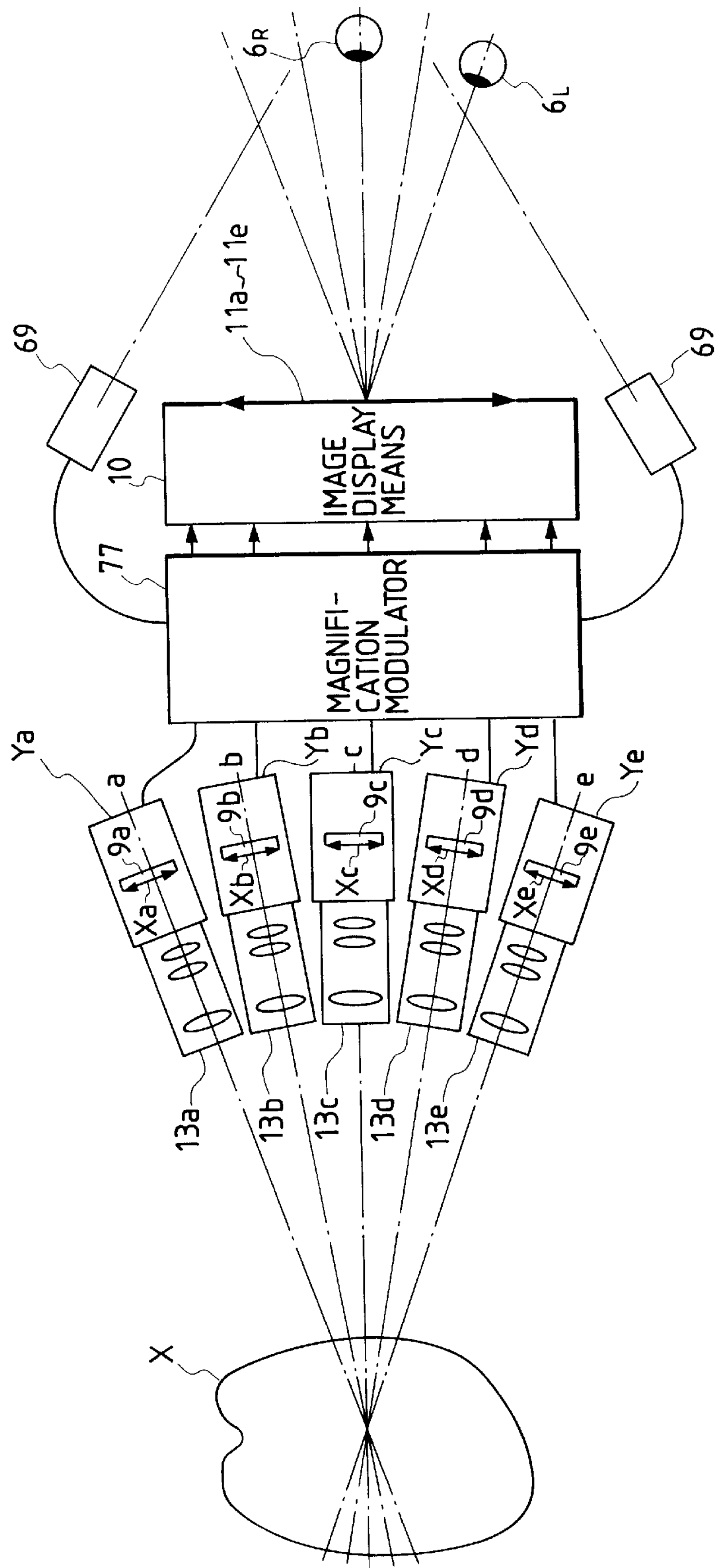
FIG. 62 is a schematic view showing principal part of the 16th embodiment of the present invention.

Furthermore, when the apparatus comprises image display means 10 and position detection means 69, as shown in FIG. 62, the positions of the eyes, $\mathbf{6}_R$ and $\mathbf{6}_L$. of the observer are detected in real time, and a corresponding pair (taken images Xe and Xc in FIG. 62) of taken images Xa to Xe corresponding to display images to be observed are selected on the basis of the detected positions of the two eyes $\mathbf{6}_R$ and $\mathbf{6}_L$, and a magnification modulator 77 can generate a magnification difference between the selected taken images (Xe and Xc).

Note that the coordinate conversion processing can be attained by the same signal processing as in the 11th embodiment.

Figure 63:
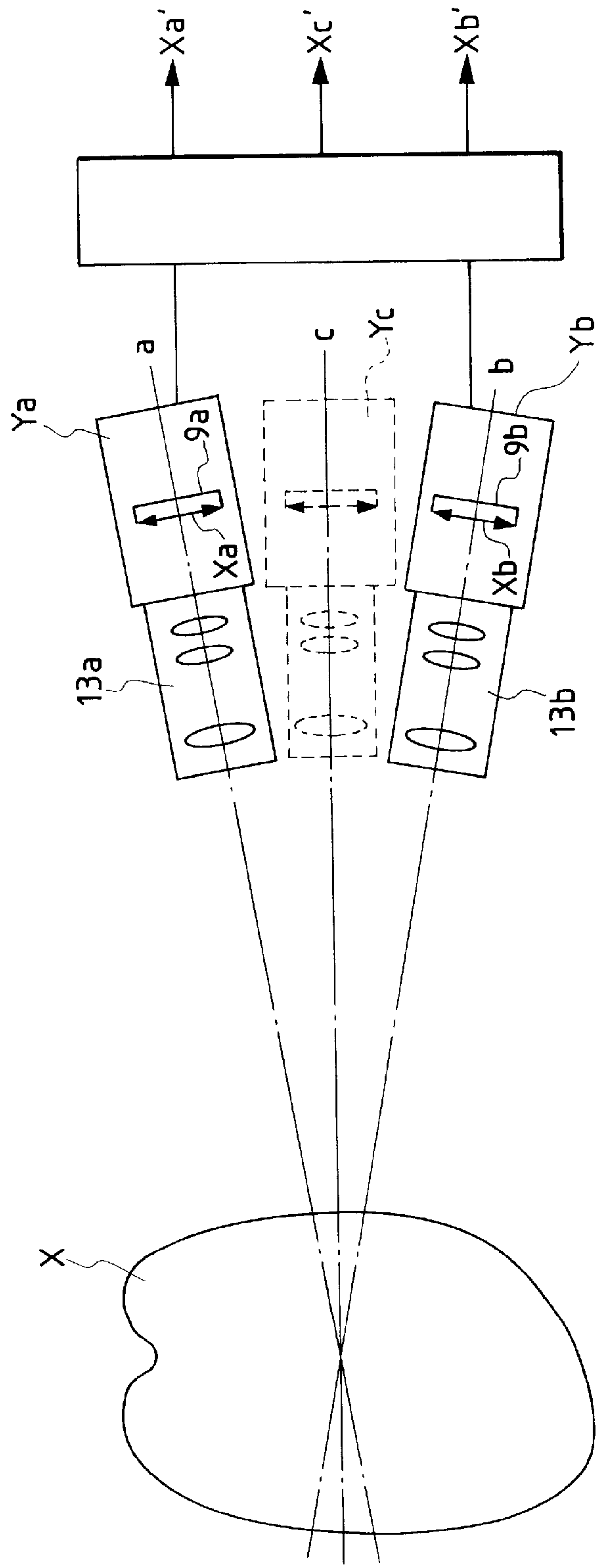
FIG. 63 is a schematic view showing principal part of the 17th embodiment of the present invention.

FIG. 63 is a schematic view showing principal part of the 17th embodiment of the present invention. In this embodiment, input images are generated by synthesis•processing of an image, and generation of input images from many virtual view points is allowed using a smaller number of cameras.

In this embodiment, a large number of input images with a parallax are generated as in the image pick-up apparatus using a multi-lens camera system of the 15th embodiment shown in FIG. 57, which obtains a large number of taken images with a parallax, and the generated input images are input to an image display apparatus, an image recording apparatus, or the like.

In this embodiment, since all the pieces of image information are converted into signals, and synthesis•processing of images is performed by arithmetic operations on a computer, a magnification difference is generated between right and left input images mainly by the coordinate conversion processing.

In FIG. 63, an image of an object X is taken by cameras Ya and Yb. The image of the object X is formed on the image taking surfaces of image taking means 9*a* and 9*b* via image pick-up optical systems 13*a* and 13*b*, thus obtaining taken images Xa and Xb with a parallax.

Arithmetic means 70 performs coordinate conversion processing of the taken images Xa and Xb from the cameras Ya and Yb as needed to obtain input images Xa' and Xb', and generates an input image Xc'.

The arithmetic means 70 generates a taken image Xc, as if it were taken by a virtual camera Yc from the direction of a view point c, on the basis of the taken images which are respectively obtained by taking the image of the object X by the cameras Ya and Yb from the directions of view points a and b.

When the three input images Xa' to Xc' obtained as described above are input to the image display apparatus, and are displayed as display images 20*a* to 20*c*, the observer observes only a pair of images for the right and left eyes $\mathbf{6}_R$ and $\mathbf{6}_L$ of the display images 20*a* to 20*c* at one time. The display images 20*a* to 20*c* to be observed at this time will be explained below with reference to FIG. 64.

Figure 64:
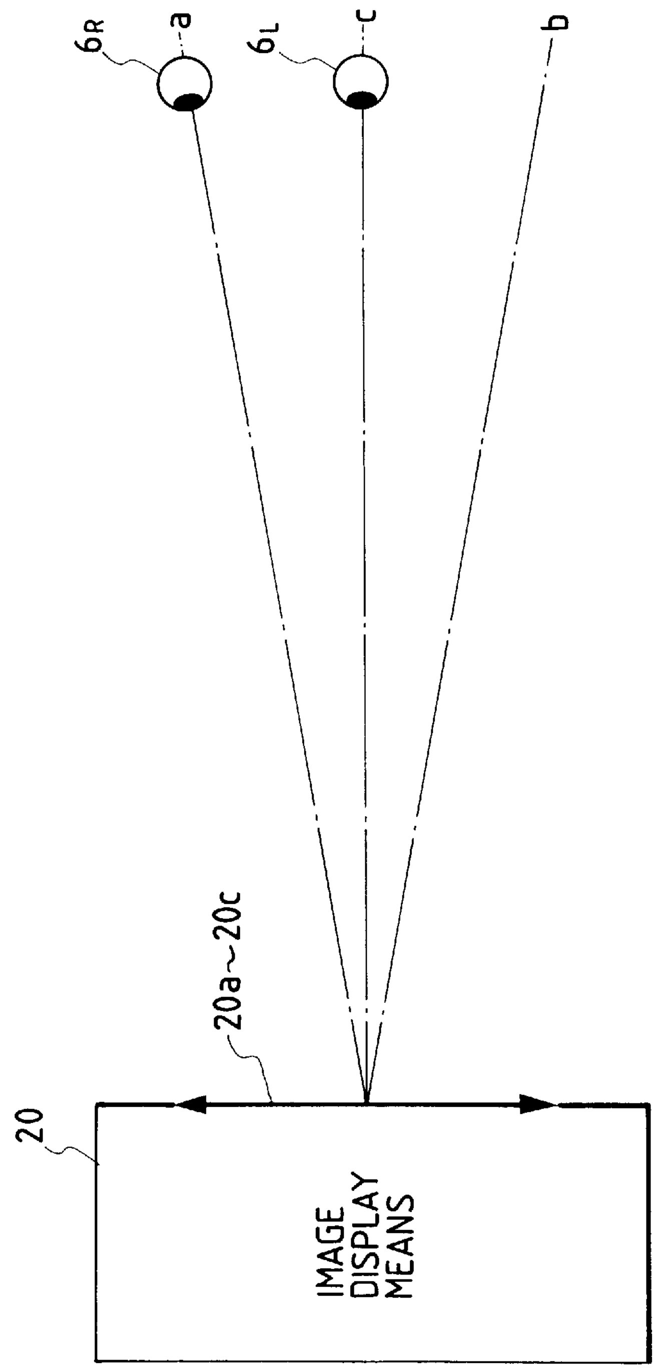
FIG. 64 is an explanatory view upon displaying taken images obtained in the 17th embodiment on an image display apparatus.

FIG. 64 is an explanatory view when the input images Xa' to Xc' obtained in this embodiment are input to and displayed by the image display means.

In FIG. 64, image display means 20 allows to independently observe three display images from the same directions as those in the image pick-up operation. For example, the image display means 20 adopts the lenticular method, large convex lens/large concave mirror method, parallax barrier method, or the like.

The image display means 20 displays the display images 20*a* to 20*c* corresponding to the input images Xa' to Xc' so that the images 20*a* to 20*c* can be observed on axes a to c. The image display means 20 sets the positions of these images, so that the left eye $\mathbf{6}_L$ of the observer is located on the axis c when the right eye $\mathbf{6}_R$ is located on the axis a.

More specifically, the observer observes the display images Xa and Xc, and the display images Xc and Xb as stereoscopic pairs of images.

Therefore, when such an image display apparatus is used, a magnification difference can be generated between the stereoscopic pair of images 20*a* and 20*c*, or 20*c* and 20*b*.

When the positional relationship between the two eyes $\mathbf{6}_R$ and $\mathbf{6}_L$ of the observer and the image display apparatus is unknown, the positions of the two eyes of the observer are detected in real time, and a magnification difference is generated between two input images corresponding to the positions of the two eyes of the observer by the image coordinate conversion processing on a computer (arithmetic means 70) in correspondence with the positional relationship relative to the image display apparatus, thus practicing the present invention.

Figure 65A:
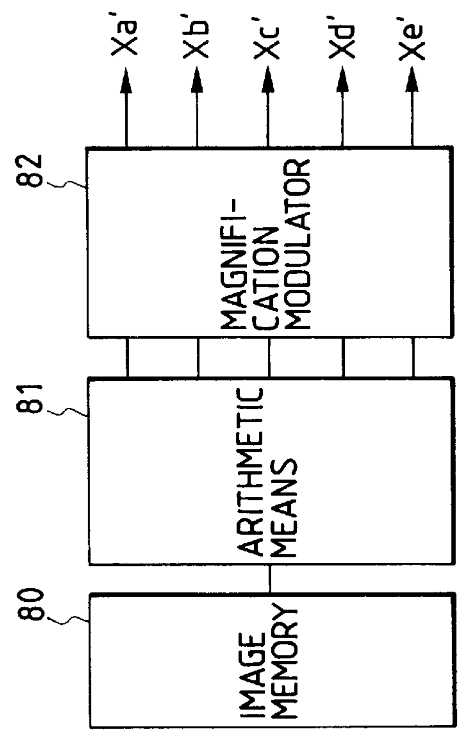
FIGS. 65A and 65B are schematic views showing principal part of the 18th embodiment of the present invention.
Figure 65B:
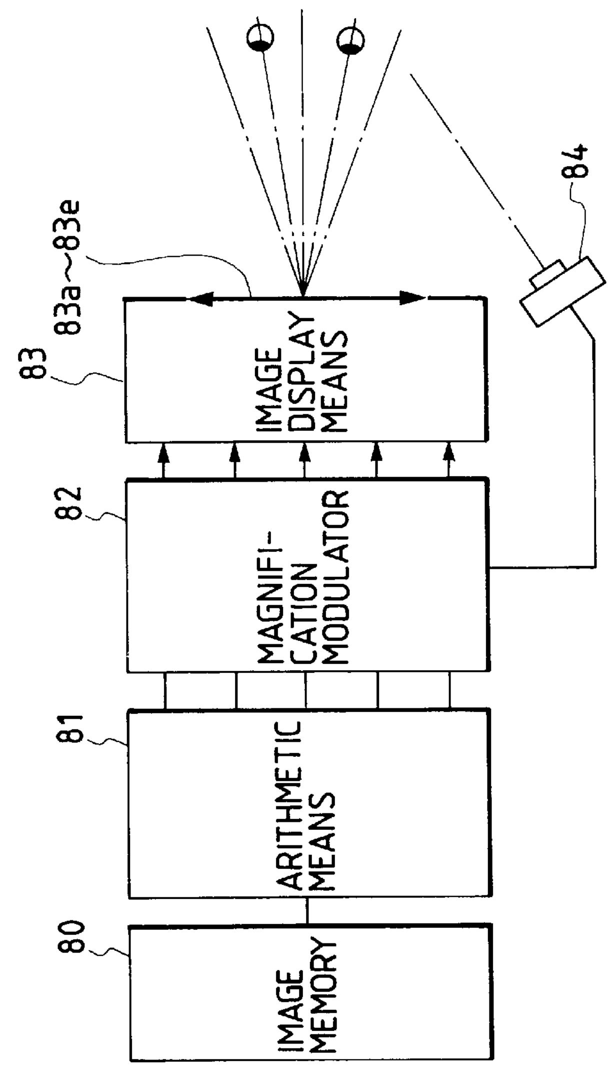

FIGS. 65A and 65B are schematic views showing principal part of the 18th embodiment of the present invention. In this embodiment, input images having a parallax from arbitrary view points are generated on the basis of single three-dimensional information by a CG (computer graphics) technique, and are input to an image display apparatus. In this apparatus, a magnification difference is generated between input images to be presented to the right and left eyes of the input images having a parallax.

In FIG. 65A, an image memory 80 stores three-dimensional information. Arithmetic means 81 generates a plurality of input images having a parallax on the basis of the three-dimensional information in the image memory 80.

A magnification modulator 82 performs coordinate conversion processing of an input image from the arithmetic means 81 to generate a magnification difference.

In FIG. 65A, the arithmetic means 81 obtains input images Xa" to Xe" corresponding to taken images Xa to Xe with a parallax, which are taken by a multi-lens camera system shown in, e.g., FIG. 56 from five directions a to e.

When the positional relationship between the right and left eyes $\mathbf{6}_R$ and $\mathbf{6}_L$ of the observer and the image display means is known, at least one of two input images, corresponding to the right and left eyes of the observer, of the input images Xa" to Xe" is subjected to coordinate conversion processing, thereby generating a magnification difference.

On the other hand, when the positional relationship between the two eyes of the observer and the image display means is unknown, a detector 84 is arranged, as shown in FIG. 65B to detect the positions of the right and left eyes $\mathbf{6}_R$ and $\mathbf{6}_L$ of the observer with respect to image display means 83 in real time, and a magnification difference is generated between the two input images corresponding to the right and left eyes $\mathbf{6}_R$ and $\mathbf{6}_L$ of the observer, thus practicing the present invention.

In this embodiment, as described above, since a magnification difference is generated between images to be presented to the right and left eyes of the observer of a plurality of input images with a parallax, the "observability" upon displaying images on the image display apparatus is improved.

Note that the magnification difference is preferably set to fall within the range of $0<|\text{magnification difference}|<3$ from FIGS. 42A and 42B.

Furthermore, in order to set a value effective for many users, the magnification is preferably set to be about 2%.

Figure 66:
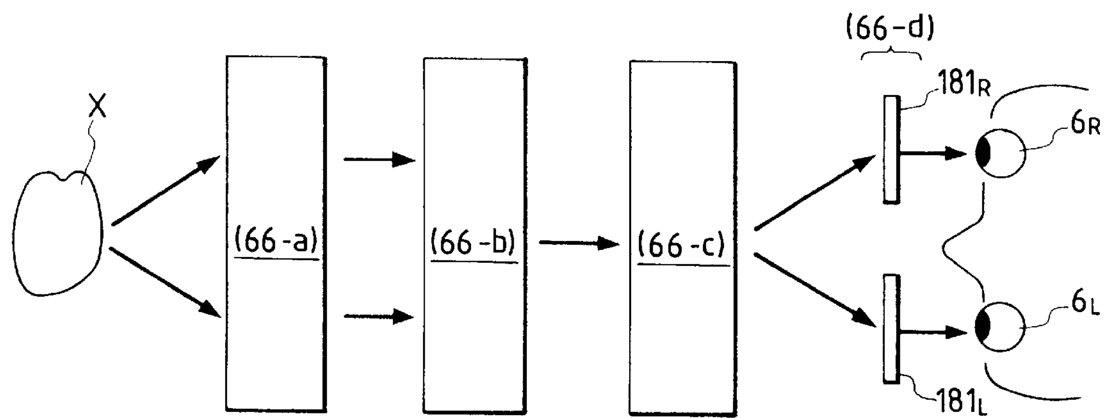
FIG. 66 is an explanatory view of the 19th embodiment of the present invention.
Figure 67:
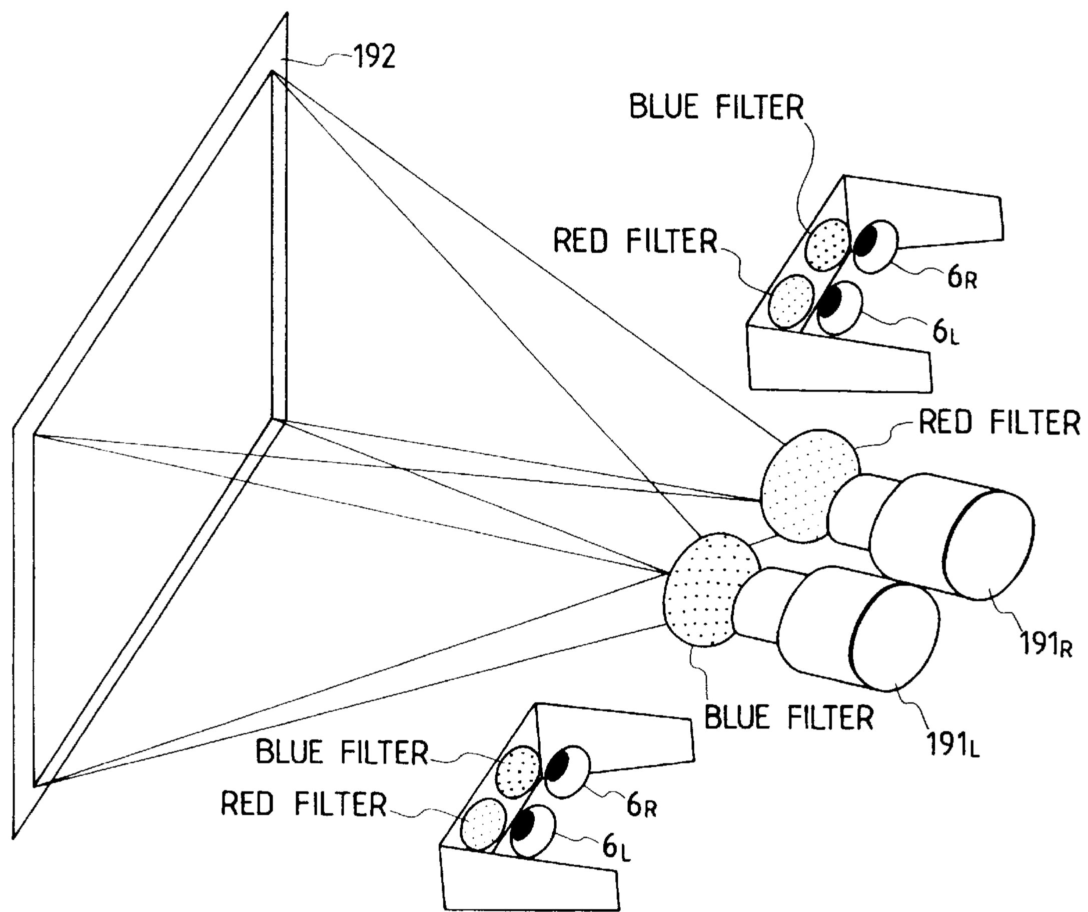
FIG. 67 is a schematic view showing principal part of the 19th embodiment of the present invention.

FIG. 66 is an explanatory view of the 19th embodiment of the present invention, and FIG. 67 is a schematic view showing principal part of this embodiment.

FIG. 66 illustrates an object X, color filters $\mathbf{181}_R$ and $\mathbf{181}_L$ for the right and left eyes, and eyes $\mathbf{6}_R$ and $\mathbf{6}_L$ of the observer. Steps (66-a) to (66-d) will be described below.

(66-a) Two input images with a parallax are obtained by the double-lens camera method, image synthesis•processing method, CG method, or the like.

(66-b) Two input images are synthesized to one (display image).

(66-c) The display image is displayed in two colors.

(66-d) The display image is observed via the color filters $\mathbf{181}_R$ and $\mathbf{181}_L$ for the right and left eyes.

In order to give a magnification difference to the display image for the right or left eye, one of the following methods is used.

(1) The asymmetrical optical system method or electronic image coordinate conversion processing is executed in step (66-a).

(2) The image coordinate conversion processing is executed in step (66-b).

(3) The color filters $\mathbf{181}_R$ and $\mathbf{181}_L$ are asymmetrically arranged in step (66-d).

Figure 68:
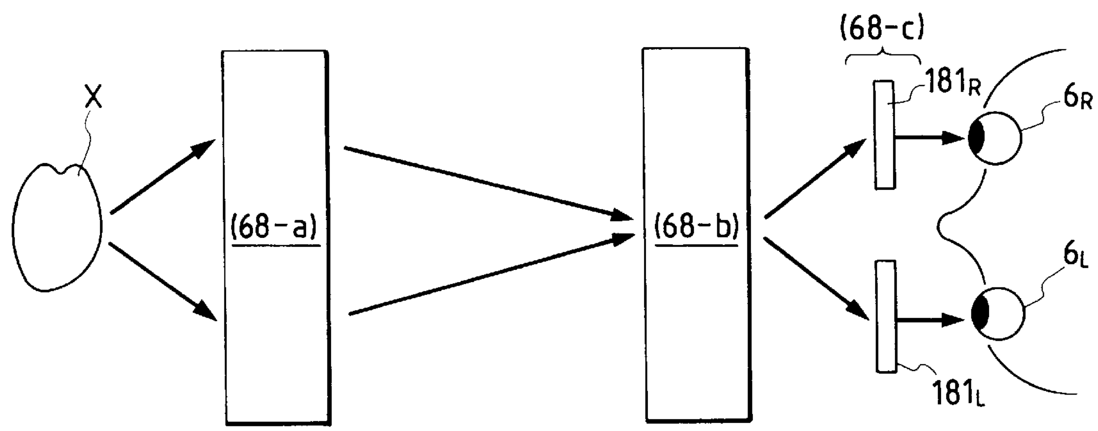
FIG. 68 is an explanatory view of the 19th embodiment of the present invention.

When two input images with a parallax are projected onto a single screen 192 using two projectors $\mathbf{191}_R$ and $\mathbf{191}_L$ with color filters, as shown in FIG. 67, the input images need not be synthesized to one image in advance, and the procedure can be modified to the one shown in FIG. 68. This procedure will be described below.

(68-a) Two input images with a parallax are obtained by the double-lens camera method, image synthesis•processing method, CG method, or the like.

(68-b) Two images are projected using the two projectors $\mathbf{191}_R$ and $\mathbf{191}_L$ onto the screen 192 via the color filters on the basis of the two images, thus superimpose-displaying the images as display images.

(68-c) The display images are observed via the color filters $\mathbf{181}_R$ and $\mathbf{181}_L$ for the right and left eyes.

In this case, in addition to the above-mentioned methods, the projection optical systems of the two projectors for projecting the display images may be asymmetrically set to generate a magnification difference.

Figure 69:
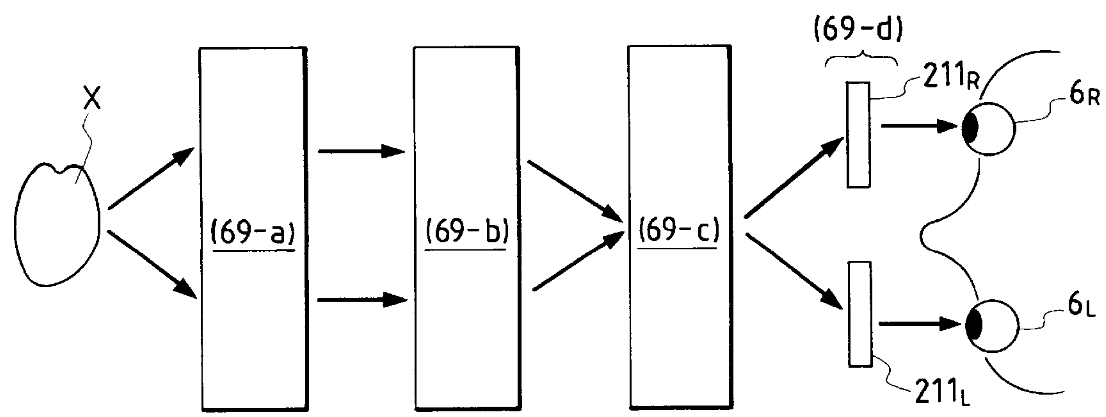
FIG. 69 is a schematic view showing principal part of the 20th embodiment of the present invention.

FIG. 69 is a schematic view showing principal part of the 20th embodiment of the present invention. This embodiment is based on the polarizing glass method in which display images for the right and left eyes are displayed in different polarizing states, and are observed via polarizing glasses.

In FIG. 69, lenses $\mathbf{211}_R$ and $\mathbf{211}_L$ for the right and left eyes of polarizing glasses 211 have polarizing filters with different polarizing directions.

The general procedure of stereoscopic image display by the polarizing glass method will be explained below.

(69-a) Two input images with a parallax are obtained by the double-lens camera method, image synthesis•processing method, CG method, or the like.

(69-b) The two input images are displayed as display images on two image display means.

(69-c) Polarizing plates are arranged on the respective image display means, and the two display images are superimpose-displayed using a half mirror.

(69-d) The display images are observed via the polarizing glasses.

In this embodiment, in order to generate a magnification difference between the display images for the right and left eyes, one of the following methods is used.

(1) The asymmetrical optical system method or electronic image coordinate conversion processing is used in step (69-a).

(2) The image coordinate conversion processing is used in step (69-b).

(3) The optical systems for projecting the display images for the right and left eyes are asymmetrically set in step (69-c).

(4) The lenses $\mathbf{211}_R$ and $\mathbf{211}_L$ for the right and left eyes of the polarizing glasses 211 are asymmetrically set in step (69-d).

Figure 70:
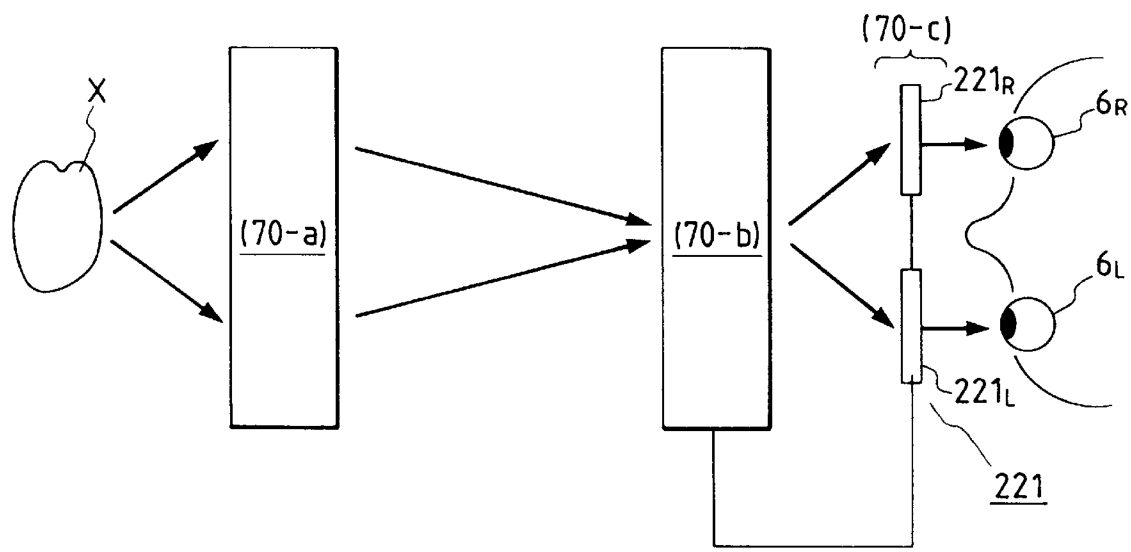
FIG. 70 is an explanatory view of the 21st embodiment of the present invention.

FIG. 70 is an explanatory view of the 21st embodiment of the present invention. This embodiment is based on the time sharing shutter method in which display images for the right and left eyes are displayed in a time sharing manner, and are observed via time sharing shutter glasses.

In FIG. 70, time sharing shutter glasses 221 have lenses $\mathbf{221}_R$ and $\mathbf{221}_L$ for the right and left eyes, which are synchronized with the time sharing display operations of the display images.

The generation procedure of stereoscopic image display by the time sharing shutter method will be described below.

(70-a) Two input images with a parallax are obtained by the double-lens camera method, image synthesis•processing method, CG method, or the like.

(70-b) The two input images are displayed as display images on image display means in a time sharing manner.

(70-c) The display images are observed via the time sharing shutter glasses.

In this embodiment, in order to generate a magnification difference between the display images for the right and left eyes, at least one of the following methods is used.

(1) The asymmetrical optical system method or electronic image coordinate conversion method is used in step (70-a).

(2) The image coordinate conversion method is used in step (70-b).

(3) The lenses $\mathbf{221}_R$ and $\mathbf{221}_L$ for the right and left eyes are asymmetrically set in step (70-c).

Figure 71:
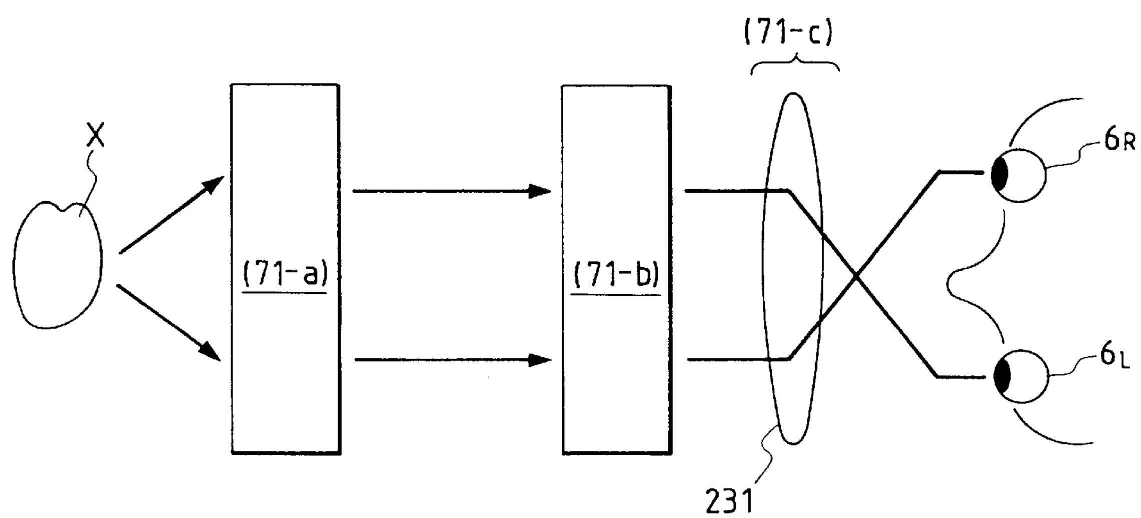
FIG. 71 is an explanatory view of the 22nd embodiment of the present invention.

FIG. 71 is an explanatory view of the 22nd embodiment of the present invention. In this embodiment, the present invention is applied to an image display apparatus of the large convex lens/large concave mirror method.

The general procedure of the large convex lens/large concave mirror method will be described below.

(71-a) n input images with a parallax are input by the multi-lens camera method, image synthesis•processing method, CG method, or the like.

(71-b) The n input images are simultaneously projected as display images at positions near the large convex lens or large concave mirror using n projectors.

(71-c) Two out of the plurality of display images projected to the positions near the large convex lens or the large concave mirror are observed as a stereoscopic pair of images (n is a natural number).

In this embodiment, the position where the observer observes with respect to the large convex lens or the large concave mirror (to be simply referred to as an observation position hereinafter) is specified in advance, and a magnification difference is generated between a stereoscopic pair of images observed from the observation position.

On the other hand, the actual observation positions of the observer may be assumed without specifying the observation position, and the sizes of the display images may be appropriately set as in the 17th embodiment shown in FIG. 61.

Furthermore, as shown in FIG. 62 of the 17th embodiment, the detector 69 may be arranged to detect the positions of the right and left eyes $\mathbf{6}_R$ and $\mathbf{6}_L$ of the observer, and a stereoscopic pair of images to be observed may be selected in correspondence with the detected positions, thus generating a magnification difference therebetween.

In this embodiment, in order to generate a magnification difference between the stereoscopic pair of images, at least one of the following methods is used.

(1) The asymmetrical optical system method or electronic image coordinate conversion method is used in step (71-a).

(2) The image coordinate conversion method is used in step (71-b).

Figure 72:
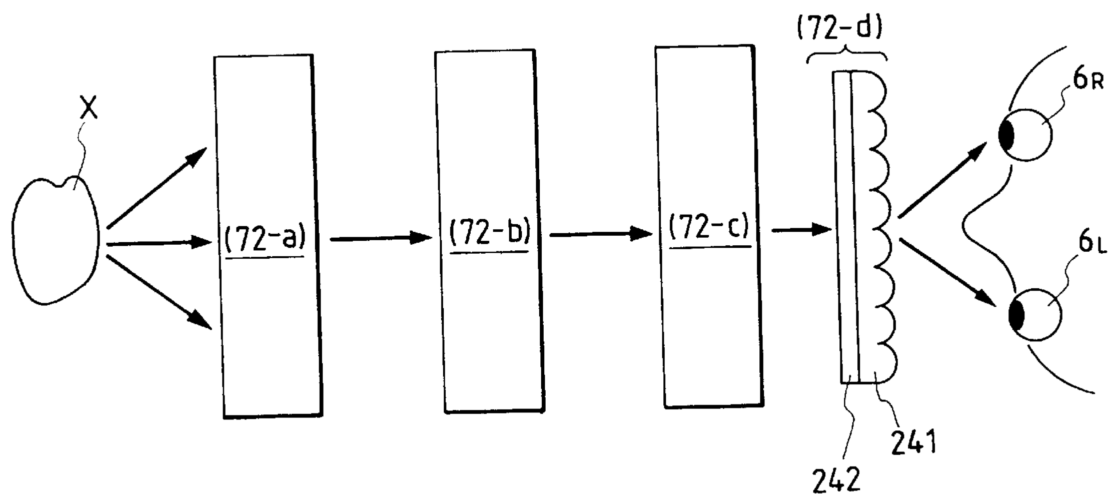
FIG. 72 is an explanatory view of the 23rd embodiment of the present invention.

FIG. 72 is an explanatory view of the 23rd embodiment of the present invention. In this embodiment, the present invention is applied to an image display apparatus of the lenticular method.

The general procedure of the lenticular method will be explained below.

FIG. 72 illustrates a lenticular lens 241. A display device 242 comprises, e.g., a liquid crystal panel or a CRT.

The procedure of the lenticular method will be described below.

(72-a) n input images with a parallax are input by the multi-lens camera method, image synthesis•processing method, CG method, or the like.

(72-b) The width of each input image is compressed to 1/n, the compressed image is horizontally divided into n portions, and divided pixels are picked up and arranged (synthesized) one by one from the n input images, thus obtaining n synthesized display images.

(72-c) The n display images are displayed on the display surface of the display device 242.

(72-d) Two out of the n display images are observed as a stereoscopic pair of images via the lenticular lens 241 (n is a natural number).

In this embodiment, in order to generate a magnification difference between the stereoscopic pair of images, at least one of the following methods is used.

(1) The asymmetrical optical system method or electronic image coordinate conversion method is used in step (72-a).

(2) The image coordinate conversion method is used in step (72-b).

Figure 73:
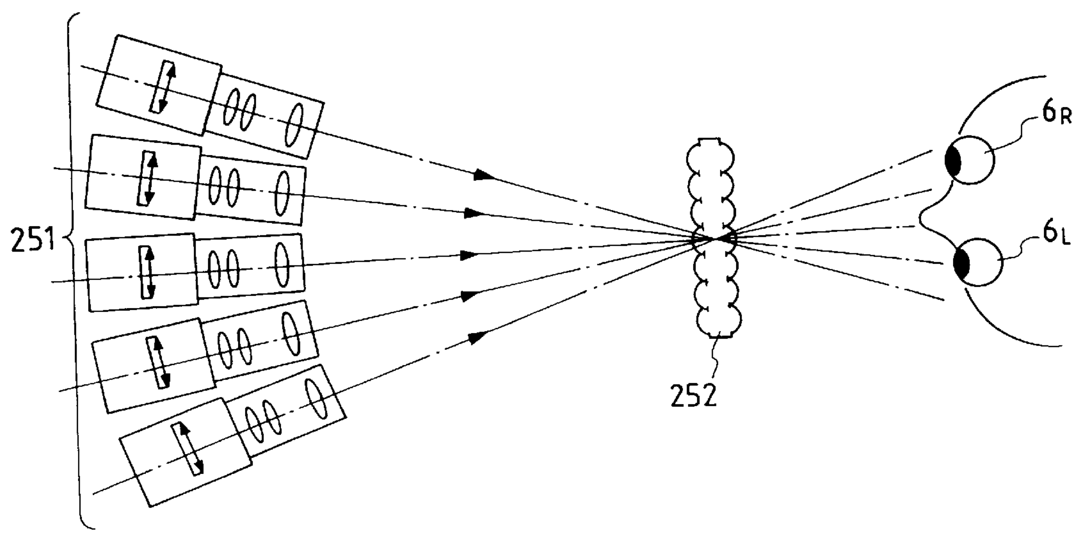
FIG. 73 is a schematic view showing principal part of the 23rd embodiment of the present invention.

In an image display apparatus shown in FIG. 73, n display images are projected onto a transmission type double lenticular screen 252 using n projectors 251, and an observer observes the images via the double lenticular screen 252.

Figure 74:
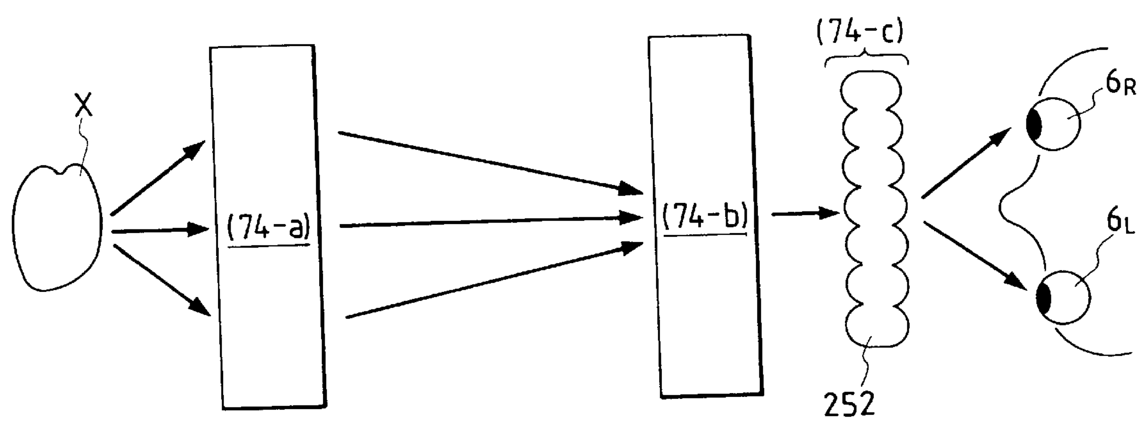
FIG. 74 is an explanatory view of the 23rd embodiment of the present invention.

FIG. 74 shows the procedure in this case. The procedure will be explained below.

(74-a) n input images with a parallax are input by the multi-lens camera method, image synthesis•processing method, CG method, or the like.

(74-b) The n input images are projected as n display images onto the double lenticular screen 252 using the n projectors.

(74-c) Two out of the n display images are observed as a stereoscopic pair of images via the double lenticular screen 252 (n is a natural number).

Therefore, in this case, in order to generate a magnification difference between the stereoscopic pair of images, at least one of the following methods is used.

(1) The asymmetrical optical system method or electronic image coordinate conversion method is used in step (74-a).

(2) The asymmetrical optical system method or the image coordinate conversion method is used in step (74-b).

Figure 75:
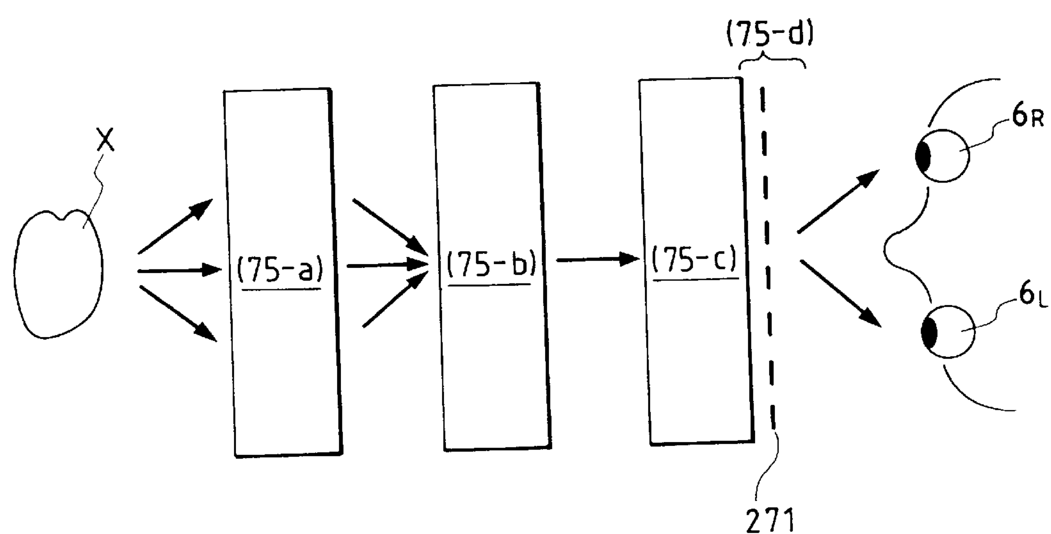
FIG. 75 is an explanatory view of the 24th embodiment of the present invention.

FIG. 75 is an explanatory view of the 24th embodiment of the present invention. In this embodiment, the present invention is applied to an image display apparatus of the parallax barrier method. FIG. 75 illustrates a parallax barrier 271.

The general procedure of the parallax barrier method will be described below.

(75-a) n input images with a parallax are input by the multi-lens camera method, image synthesis•processing method, CG method, or the like.

(75-b) The width of each input image is compressed to 1/n, the compressed image is horizontally divided into n portions, and divided pixels are picked up and arranged (synthesized) one by one from the n input images, thus obtaining n synthesized display images.

(75-c) The n display images are displayed on the display surface of the display device.

(72-d) Two out of the n display images are observed as a stereoscopic pair of images via the parallax barrier (n is a natural number).

In this embodiment, in order to generate a magnification difference between the stereoscopic pair of images, at least one of the following methods is used.

(1) The asymmetrical optical system method or electronic image coordinate conversion method is used in step (75-a).

(2) The image coordinate conversion method is used in step (75-b).

Figure 76:
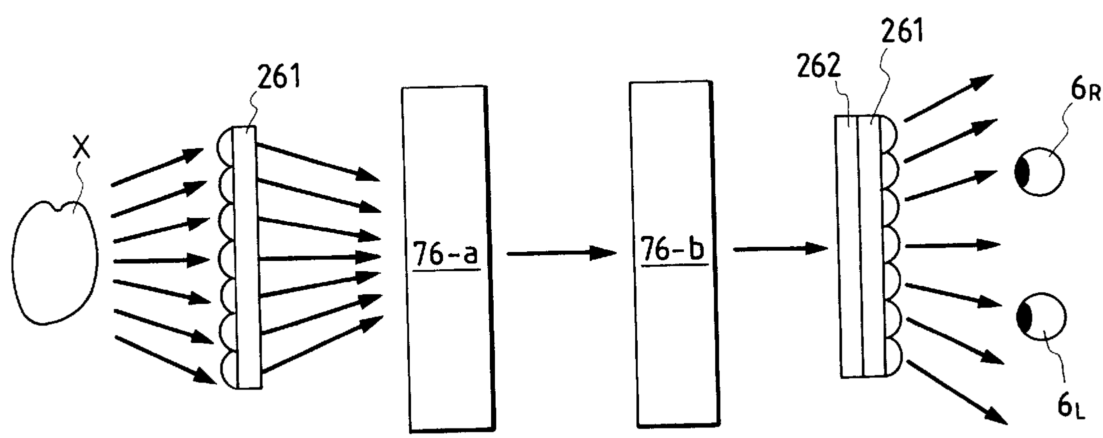
FIG. 76 is an explanatory view of the 25th embodiment of the present invention.

FIG. 76 is an explanatory view of the 25th embodiment of the present invention. In this embodiment, the present invention is applied to an image display apparatus of the integral method.

The general procedure of the integral method will be explained below.

FIG. 76 illustrates a fly eye lens 261. A display device 262 comprises, e.g., a liquid crystal panel or a CRT.

The procedure of the integral method will be described below.

(76-a) n parallax images are input via n portions of the fly eye lens 261.

(76-b) The n parallax images are displayed on the display surface of the display device 262.

(76-c) The displayed n parallax images are spatially formed and output via the fly eye lens 261 (n is a natural number).

In this embodiment, in order to generate a magnification difference between the display images for the right and left eyes, at least one of the following methods is used.

(1) The asymmetrical optical system method or electronic image coordinate conversion method is used in step (76-a).

(2) The image coordinate conversion method is used in step (76-b).

(3) The asymmetrical optical system method is used in optical systems (the respective lens portions of the fly eye lens 261) in step (76-c).

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A stereoscopic image display apparatus which allows an observer to recognize a stereoscopic image, comprising:

right eye image display means for displaying an image for a right eye by irradiating light;

left eye image display means for displaying an image for a left eye by irradiating light; and tilt means for relatively tilting an observation image of said right eye image by said right eye of said observer and an observation image of said left eye image by said left eye of said observer in the observation image displaying plane, wherein the tilt angle between both of said observation images by said tilt means is an angle being larger than 0 degree and equal to or smaller than 3 degree.

2. An apparatus according to claim 1, wherein said tilt means comprises means for rotating at least one of said right and left eye image display means in a display surface of the image display means.

3. An apparatus according to claim 1, wherein said tilt means comprises an image rotator arranged in an optical path of at least one of said right and left eye image display means.

4. An apparatus according to claim 1, wherein said tilt means comprises means for rotating a display image of at least one of said right and left eye image display means by coordinate conversion processing, and displaying the rotated image on the image display means.

5. An apparatus according to claim 1, wherein said tilt means comprises one of means for rotating clockwise the central line, in the vertical direction, of the observation image to be observed by the right eye of the observer and means for rotating counterclockwise the central line, in the vertical direction, of the observation image to be observed by the left eye of the observer.

6. An image pick-up apparatus for taking an image which is used to allow an observer to recognize a stereoscopic image, comprising:

right eye image pick-up means for taking an input image for a right eye of the observer, and taking the input image;

left eye image pick-up means for taking an input image for a left eye of the observer, and taking the input image; and rotation means for rotating at least one of said right and left eye image pick-up means in a pick-up plane of the image pick-up means so as to tilt and take the input images for the right and left eyes relative to each other, so that a tilt angle between said input images is an angle which is larger than 0 degree and equal to or smaller than 3 degree.

7. An apparatus according to claim 6, wherein said rotation means comprises an image rotator arranged in an optical path upon taking one of the input images for the right and left eyes.

8. A stereoscopic image display apparatus which allows an observer to recognize a stereoscopic image, comprising:

right eye image display means for displaying an image for a right eye by irradiating light;

left eye image display means for displaying an image for a left eye by irradiating light; and means for setting a size of an observation image which is formed based on the image for the right eye and is to be observed by the right eye of the observer, and a size of an observation image which is formed based on the image for the left eye and is to be observed by the left eye of the observer to be relatively different from each other, and wherein the apparatus satisfies $$\Delta V=(R_v-L_v)/L_v*100; \text{ and}$$

$$0<|\Delta V|<3$$

where $R_v$ and $L_v$ are the sizes of the observation images to be observed by the right and left eyes of the observer, and $\Delta V$ is a derived magnification difference between the right and left eyes.

9. An apparatus according to claim 8, wherein said means for setting the sizes of the observation images to be relatively different from each other comprises means for changing a size of a display image of at least one of said right and left eye image display means by coordinate conversion means, and displaying the image of the changed size on the image display means.

10. An apparatus according to claim 8, further comprising:

a right eye optical system for forming the observation image to be observed by the right eye of the observer on the basis of the image for the right eye; and a left eye optical system for forming the observation image to be observed by the left eye of the observer on the basis of the image for the left eye, and wherein a focal length of said right eye optical system is different from a focal length of said left eye optical system.

11. An apparatus according to claim 10, wherein the focal length of at least one of said right and left eye optical systems is variable.

12. An image pick-up apparatus for taking an image which is used to allow an observer to recognize a stereoscopic image, comprising:

a right eye image pick-up optical system for taking an image for a right eye of the observer; and a left eye image pick-up optical system for taking an image for a left eye of the observer, wherein the right and left eye image pick-up optical systems have different magnification factors, and wherein the apparatus satisfies $$0<|\Delta V|<3$$

where $\Delta V$ is the magnification difference between said right and left image pick-up optical systems.

13. An apparatus according to claim 12, wherein the magnification factor of at least one of said right left eye image pick-up optical systems is variable, and said apparatus is controlled so that the condition of $0<|\Delta V|<3$ is always satisfied.

* * * * *

UNITED STATES PATENT AND TRADEMARK OFFICE

CERTIFICATE OF CORRECTION

PATENT NO. : 5,880,883

DATED : March 9, 1999

INVENTOR(S) : Toshiyuki Sudo

It is certified that error appears in the above-indentified patent and that said Letters Patent is hereby corrected as shown below:

Fig. 31, input means 118, please delete "double reflex camera input portion" and insert therefor -- double-lens camera input portion --.

Column 27, line 58, delete "$4_L$," and insert therefor -- $4_L$' --.

Column 27, line 64, delete "$4_n$" and insert therefor -- $4_r$' --.

Column 28, line 27, delete "$z'_R-z'_L=f_{R2}(1/z_R-1/z_L)$" and insert therefor -- $z'_R-z'_L=f_R^2(1/z_R- \ 1/z_L)$ --

Column 28, line 64, equation (4), delete "$f_L^2=z_L \cdot z_L$." and insert therefor-- $f_L^2=z_L \cdot z_L'$ --;

Column 28, line 64, equation (4), delete "$f_R^2=z_R \cdot z_R$." and insert therefore -- $f_R^2=z_R \cdot z_R'$ --

Column 28, line 67, delete "(i.e., $z'_{R=z'L}$)" and insert therefor-- (i.e., $z'_R=z'_L$) --

Column 29, line 1, equation (5), delete "$f_L^2/z_L=f_R^2/z_R$." and insert therefor -- $f_L^2/z_L=f_R^2/z_R$ --

Column 29, line 60, delete "$30_L$" and insert therefor -- $30_L$, --.

Column 30, line 6, delete "$\Delta=\Delta\beta2+\Delta\beta1+(\Delta\beta*\Delta\beta2/100)$ (%)" and insert therefor --$\Delta=\Delta\beta2+\Delta\beta1+(\Delta\beta1*\Delta\beta2/100)$ (%)--

UNITED STATES PATENT AND TRADEMARK OFFICE

CERTIFICATE OF CORRECTION

PATENT NO. : 5,880,883

DATED : March 9, 1999

INVENTOR(S) : Toshiyuki Sudo

It is certified that error appears in the above-indentified patent and that said Letters Patent is hereby corrected as shown below:

Column 32, line 53, delete "9ato 9e" and insert therefor -- 9a to 9e --.

Column 32, line 61, delete "a re appropriately" and insert therefor -- are appropriately --.

Column 32, line 62, delete "take n image" and insert therefor -- taken image --.

Column 32, line 62, delete "size s of" and insert therefor -- sizes of --.

Signed and Sealed this

Twenty-sixth Day of October, 1999

Attest:

Q. TODD DICKINSON

Attesting Officer

*Acting Commissioner of Patents and Trademarks*